(12) United States Patent
Buer

(10) Patent No.: US 12,388,523 B2
(45) Date of Patent: Aug. 12, 2025

(54) TECHNIQUES FOR SWITCHING BETWEEN OPERATING MODES OF BEAMFORMING SYSTEMS AND SATELLITES

(71) Applicant: Viasat Inc., Carlsbad, CA (US)

(72) Inventor: Kenneth V. Buer, Bluff City, TN (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/245,937

(22) PCT Filed: Sep. 22, 2020

(86) PCT No.: PCT/US2020/052037
§ 371 (c)(1),
(2) Date: Mar. 20, 2023

(87) PCT Pub. No.: WO2022/066147
PCT Pub. Date: Mar. 31, 2022

(65) Prior Publication Data
US 2023/0388009 A1 Nov. 30, 2023

(51) Int. Cl.
*H04B 7/185* (2006.01)
*H04B 7/06* (2006.01)
(Continued)

(52) U.S. Cl.
CPC ....... *H04B 7/18543* (2013.01); *H04B 7/0617* (2013.01); *H04B 7/10* (2013.01); *H04B 7/2041* (2013.01)

(58) Field of Classification Search
CPC .... H04B 7/18543; H04B 7/0617; H04B 7/10; H04B 7/2041
See application file for complete search history.

(56) References Cited

U.S. PATENT DOCUMENTS

| 5,802,445 A | 9/1998 | Wiedeman et al. |
| 8,107,875 B2 * | 1/2012 | Miller ............ H04B 7/2041 |
| | | 455/12.1 |

(Continued)

FOREIGN PATENT DOCUMENTS

| EP | 3444970 A1 | 2/2019 |
| JP | 2002016535 | 1/2002 |
| JP | 2003273789 | 9/2003 |

OTHER PUBLICATIONS

Kawai et al., "ETS-VI Multibeam Satellte Communications Systems", https://doi.org/10.1016/0091-5765(91)90021-V, dated Feb. 20, 1991.

(Continued)

*Primary Examiner* — David S Huang
(74) *Attorney, Agent, or Firm* — Holland & Hart LLP

(57) ABSTRACT

Systems and methods for communications satellites to switch operating modes are described. A communications satellite may operate according to a first operating mode to provide communications services for user terminals in a first coverage area (e.g., providing the user terminals with forward link communications services using a first communication link with a first polarization) The communications satellite may receive correspondingly polarized forward uplink signals from access node terminals in a second coverage area, and the communications satellite may relay respective forward downlink signals to the user terminals in the first coverage area. In some cases, the first coverage area may geographically overlap the second coverage area. The communications satellite may determine a second operating mode (e.g., to optimize the communications services based on dynamic conditions), and the communications satellite may switch to the second operating mode to provide communications services for the user terminals.

26 Claims, 35 Drawing Sheets

(51) Int. Cl.
   *H04B 7/10*     (2017.01)
   *H04B 7/204*    (2006.01)

(56) References Cited

U.S. PATENT DOCUMENTS

| | | | |
|---|---|---|---|
| 8,340,015 | B1 | 12/2012 | Miller et al. |
| 8,712,321 | B1 | 4/2014 | Dankberg |
| 11,283,514 | B2 * | 3/2022 | Krause ................. H04B 7/1851 |
| 2009/0291633 | A1 * | 11/2009 | Dankberg .......... H04B 7/18513 |
| | | | 455/12.1 |
| 2017/0215176 | A1 | 7/2017 | Chan |

OTHER PUBLICATIONS

International Search Report and Written Opinion Date Jun. 16, 2021, PCT/US2020/052037, 11 pages.

* cited by examiner

TECHNIQUES FOR SWITCHING BETWEEN OPERATING MODES OF BEAMFORMING SYSTEMS AND SATELLITES

CROSS REFERENCE

The present application for patent is a 371 National Stage filing of International Patent Application No. PCT/US2020/052037 by BUER, entitled "TECHNIQUES FOR SWITCHING BETWEEN OPERATING MODES OF BEAMFORMING SYSTEMS AND SATELLITES," filed Sep. 22, 2020, assigned to the assignee hereof, and expressly incorporated by reference in its entirety herein.

BACKGROUND

Wireless communications systems, such as satellite communications systems, provide a means by which information, including audio, video, and various other sorts of data, may be communicated from one location to another using a communications satellite. Communications satellites typically include one or more antenna assemblies for communicating with various terrestrial target devices, which may include ground-based access node terminals or user terminals, any of which may be stationary (e.g., installed at a permanent installation site, moved from one fixed installation site to another, etc.) or mobile (e.g., installed at a vehicle, a boat, a plane, handheld etc.). An antenna assembly of a communications satellite may be configured for transmitting downlink signals (e.g., forward link signals to user terminals and return link signals to access nodes) and/or receiving uplink signals (e.g., forward link signals from access nodes and return link signals from user terminals). The antenna assembly may be associated with a service coverage area within which devices may be provided communications services via the antenna assembly. In some cases, a communications satellite may be a geostationary satellite, in which case the communications satellite's orbit may be synchronized with the rotation of the Earth to maintain the service coverage area to be essentially stationary with respect to the Earth. In other cases, the communications satellite may use a different orbit (e.g., about the Earth) that causes the service coverage area to move over the surface of the Earth as the communications satellite traverses its orbital path.

Some communications satellites may place spot beam coverage areas in fixed locations. However, these communications satellites may not have the ability to move the spot beams to accommodate changes to a service coverage area. Moreover, such satellite communications architectures essentially provide uniformly distributed capacity over the service coverage area. Capacity per spot beam, for example, is strongly related to the allocated bandwidth per spot beam, which may be predetermined for every spot beam and thus allow for little to no flexibility or configurability.

Although these satellite communications architectures may be valuable when a desired service coverage area is well-known and the demand for capacity is uniformly distributed over the service coverage area, the inflexibility of the aforementioned architectures may be limiting for certain applications. For example, a communications satellite may be retasked or deployment conditions (e.g., orbital slot, etc.) may change. Additionally, satellite communications services may see changes in user demands (e.g., fixed vs. mobile users, etc.). Although signal processing techniques such as beamforming may provide some ability to adapt the arrangement of spot beams or service coverage area, additional flexibility in adaptation of service coverage area and spot beam arrangement may be desired. For example, it may be desirable for a satellite communications system and, correspondingly, a communications satellite to flexibly and dynamically adjust locations and sizes of service coverage areas based on factors such as locations of user terminals and access node terminals, a spatial distribution of the communications service capacity, and a capacity allocation of the communications service. Additionally, it may be desirable for a satellite communications system and, correspondingly, a communications satellite to flexibly and dynamically allocate communications resources between different service coverage areas, for example, to shift higher throughput services to different coverage areas based on dynamically changing conditions.

SUMMARY

Methods, systems, and devices are described for switching between operating modes of beamforming systems and satellites.

The antenna assembly of the communications satellite may include a set of antennas that the communications satellite may use to provide communications services to the devices within the coverage areas. In some cases, the communications satellite may assign each of its antennas to a corresponding coverage area, such that the communications satellite may transmit and receive signals to devices within the coverage areas using a communication link between each of the antennas and the corresponding coverage areas. In many cases, conditions and demands associated with each of the different coverage areas may change over time. Accordingly, the communications satellite may be configured with a number of different operating modes that may differently provide communications services for each of the coverage areas. For example, a first operating mode may provide forward link and return link (or uplink and downlink) communications services to the user terminals of one coverage area, whereas a second operating mode may only provide forward link (or downlink) communications services, but may provide the forward link services to the user terminals of multiple coverage areas. Additionally, in some cases, the first coverage area and the second coverage area may at least partially overlap. To differentiate communication links for, for example, a forward downlink communication link for the first coverage area and for a separate forward downlink communication link for the second coverage area, the communications satellite may communicate with the user terminals of the respective coverage areas using different antenna polarizations (e.g., orthogonal linear polarizations, orthogonal circular polarizations such as right-hand circular polarization (RHCP) and left-hand circular polarization (LHCP), or other like polarization techniques).

Accordingly, in an example, the communications satellite may operate according to a first operating mode to provide communications services for user terminals in the first coverage area but not for the user terminals in the second coverage area. According to the first operating mode, the communications satellite may provide forward link communications services for the user terminals in the first coverage area over a first communication link using a first polarization. In some cases, according to the first operating mode, the communications satellite may also provide return link communications services for the user terminals in the first coverage area over an additional communication link, for example, using a second polarization (e.g., orthogonal to the first polarization).

In this example, the communications satellite may determine (e.g., according to an instruction received from a controller) a second operating mode (e.g., from a set of numerous operating modes) that may be different from the first operating mode. For example, the communications satellite may be switched to an operating mode that provides communications services to a different set of user terminals (e.g., to the user terminals in the second coverage area only or in addition to the user terminals in the first coverage area). Additionally or alternatively, the communications satellite may determine the second operating mode, for example to provide a particular resource allocation between the user terminals of the first and second coverage areas and/or based on performance characteristics associated with the communication links.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
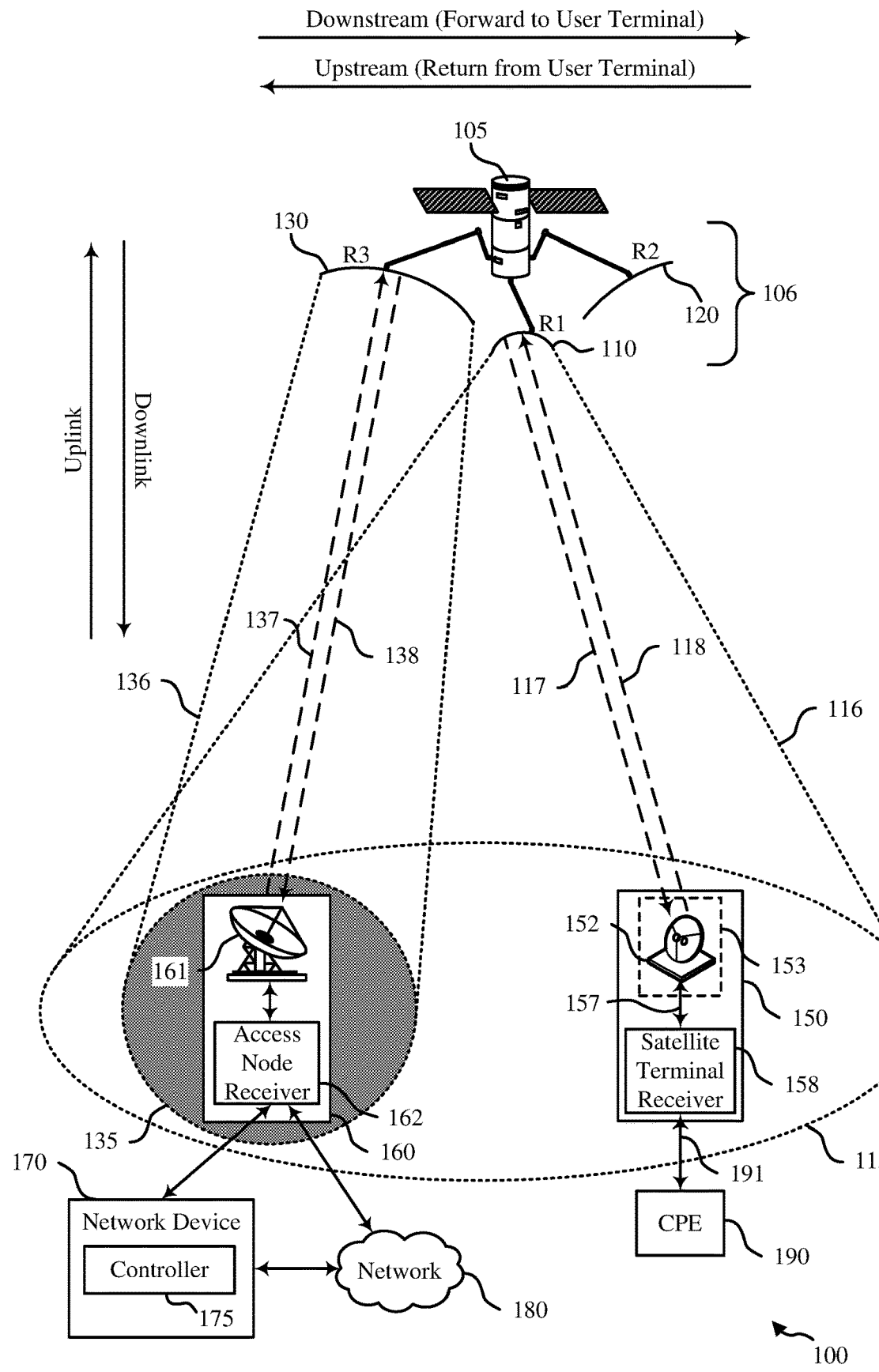
FIG. 1 illustrates a satellite communications system that supports switching between operating modes of beamforming systems and satellites in accordance with aspects of the present disclosure.

The described features generally relate to techniques for switching between operating modes in a satellite communications system and other beamforming systems. A communications satellite in a satellite communications system may be configured to provide communications services between terrestrial target devices (e.g., terminals), which may be stationary (e.g., installed at a permanent installation site, moved from one fixed installation site to another, etc.) or mobile (e.g., installed at a vehicle, a boat, a plane, handheld, etc.). The communications services may include, for example, bidirectional network access services between devices such as access node terminals and user terminals. In some examples, to support the communications service, one or more antenna assemblies of the communications satellite may be configured to transmit downlink communications (e.g., to user terminals and/or access node terminals), to receive uplink communications (e.g., from user terminals and/or access node terminals), or both transmitting downlink communications and receiving uplink communications (e.g., operating as a transponder).

In some examples, an antenna assembly of the communications satellite may include a feed array assembly, such as phased arrays of antenna feed elements, which may be used to target beamformed spot beams on desired spot beam coverage areas (e.g., cells) across a given system coverage geography (e.g., North America). Beamformed spot beams may be formed from transmissions and/or receptions via multiple antenna feed elements, and use phase and amplitude characteristics of the transmissions and/or receptions to provide the directional transmission and reception associated with each of the beamformed spot beams. In some examples, the communications satellite may employ beamforming to electronically steer an array of antenna elements of one or more antennas of the antenna assembly. In some examples, the communications satellite may employ an end-to-end beamforming system to form end-to-end beams through an end-to-end relay, where signals within the end-to-end beams may be transmitted and received at multiple access node terminals to communicate with large numbers of user terminals.

Accordingly, to support communications services using end-to-end beamforming, one or more antenna assemblies of the communications satellite may be configured to receive forward link communications (e.g., uplink signals from user terminals and/or access node terminals) and to relay the forward link communications (e.g., corresponding downlink signals to user terminals and/or access node terminals). Similarly, for the end-to-end beamforming services, the one or more antenna assemblies of the communications satellite may also be configured to receive return link communications (e.g., return uplink signals from user terminals and/or access node terminals) and to relay the return link communications (e.g., corresponding return downlink signals to user terminals and/or access node terminals).

The access node terminals and the user terminals may be distributed between one or more coverage areas. In one example, an antenna assembly may include three antennas (e.g., three antennas referred to herein as R1, R2, and R3), which the communications satellite may use to provide communications services to devices (e.g., access node terminals and user terminals) located within one or more of the respective coverage areas (e.g., one of three coverage areas) via signals transmitted over respective communication links associated with each of the antennas. Each of the antennas may be, for example, a direct radiating array (DRA) of feed elements, or may include a reflector to reflect signal energy to a feed array.

In some cases, each of the antennas may be associated with a corresponding coverage area, such that the communications satellite may transmit and receive signals to devices within the coverage areas using a respective one the antennas. For example, the communications satellite may communicate signals via a first antenna to provide communications services to devices (e.g., user terminals) located in a first coverage area using a first communication link, where communicating the signals using the first communication link may include transmitting forward downlink signals to the devices and receiving return uplink signals from the devices. Additionally, the communications satellite may communicate signals via a second antenna to provide communications services to devices (e.g., user terminals) located in a second coverage area using a second communication link, where communicating the signals using the second communication link may include transmitting forward downlink signals to the devices and receiving return uplink signals from the devices. Additionally, the communications satellite may communicate signals via a third antenna to provide communications services to devices (e.g., access node terminals) located in a third coverage area using a third communication link, where communicating the signals using the third communication link may include receiving forward uplink signals from the devices and transmitting return downlink signals to the devices.

In some cases, conditions (e.g., physical locations network conditions, environmental conditions related to interference, for example, etc.) and demands (e.g., from user terminals) associated with communications with each of the different coverage areas may change over time. According to the techniques described herein, the communications satellite may be configured with a number of different operating modes with different characteristics that may provide associated advantages and disadvantages relative to other modes. For example, one operating mode may provide forward link and return link (or uplink and downlink) communications services to the user terminals of one coverage area, whereas another operating mode may only provide forward link (or downlink) communications services, but may provide the forward link services to the user terminals of multiple coverage areas. Additionally or alternatively, some operating modes may provide a greater bandwidth for certain coverage areas, while other operating modes may offer greater reliability, for example. By selecting different ones of these operating modes for different situations, the techniques described herein may allow a communications satellite to dynamically and flexibly adapt its operations to more efficiently provide communications services based on dynamically (e.g., rapidly) changing conditions and demands. Thus, the communications satellite may provide service over an aggregate area of the multiple coverage areas according to a combination of modes, where a pattern of modes may be repeated periodically or varied dynamically.

Additionally, in some cases, the first coverage area and the second coverage area may at least partially overlap. To differentiate signals communicated over communication links for, for example, a forward downlink communication link for the first coverage area and for a separate forward downlink communication link for the second coverage area, the communications satellite may communicate with the user terminals of the respective coverage areas using different antenna polarizations (e.g., different polarization states). For example, the communications satellite may communicate over one communication link using a first polarization and over another communication link using a second polarization that may be orthogonal to the first polarization (e.g., orthogonal linear polarizations, orthogonal circular polarizations such as right-hand circular polarization (RHCP) and left-hand circular polarization (LHCP), or other like polarization techniques). Different operating modes may also provide for the use of different polarizations for different respective combinations of communication links.

According to the techniques described herein, the communications satellite may operate according to a first operating mode, and after a duration of time (e.g., a number of slots and/or frames of a configured frame structure) the communications satellite may operate according to a second operating mode (e.g., which may, or may not, be different from the first operating mode). For example, a controller for the communications satellite (e.g., which may be on-board the communications satellite or ground-based, providing commands to the communications satellite via a control link) may determine to switch to a second operating mode for providing communications services via the communications satellite to a different set of user terminals (e.g., to the user terminals in the second coverage area only or in addition to the user terminals in the first coverage area). Additionally or alternatively, the second operating mode may provide a particular resource allocation between the user terminals of the first and second coverage areas (e.g., to provide greater throughput to the user terminals of one coverage area relative to the other). Additionally or alternatively, the second operating mode may be selected based on performance characteristics associated with the communication links (e.g., an operating mode may be selected that may increase throughput while introducing interference that may reduce signal quality (or vice versa)).

In some cases, the communications satellite may operate according to one operating mode for a certain duration, for example, according to a configured pattern or number of slots or frames of a configured frame structure. In some examples, the communications satellite may determine (e.g., according to an instruction received from the controller) a number of slots during which to operate according to a given frame structure, for example, according to any of the considerations described herein. In other examples, the communications satellite may determine a sequence including several operating modes and corresponding durations of numbers of slots for each of the operating modes in the sequence. In some cases, the sequence may be configured or preconfigured to provide communications services according to certain known conditions, and/or the sequence may be indicated to the communications satellite in control signaling.

In some cases, the controller may identify a dynamic switching event for switching operating modes and may correspondingly determine an occurrence of the dynamic switching event. For example, the controller may determine that a performance characteristic, such as a particular signal quality metric (e.g., signal-to-noise ratio (SNR), signal-to-interference-plus-noise ratio (SINR), effective isotropic radiated power (EIRP), etc.), meets a corresponding threshold for performing such a switch. In some cases, various thresholds corresponding to different signal quality metrics may be configured or preconfigured, may be indicated to the communications satellite (e.g., via control signaling), or the controller may determine the thresholds according to other situational factors (e.g., based on factors such as a time of day, user demand, or as may be determined according to a formula, etc.). For example, the controller may determine that the signal quality metric has fallen beneath a desired signal quality target and the controller may accordingly switch the communications satellite to the second operating mode, for example, to provide communications services with a higher signal quality but which may have a lower ceiling for throughput.

According to the techniques described herein, the communications satellite may operate according to different operating modes for different situations according to the situations' respective characteristics. For example, certain operating modes may provide relatively higher channel capacity to a certain coverage area, and thus may be used to provide relatively higher throughput to that coverage area in certain situations. In other situations, it may be desirable to provide lower throughput with greater channel diversity between different coverage areas, and/or to concurrently provide communications services to more or fewer coverage areas. Accordingly, the communications satellite may be configured to switch between operating modes, for example, to optimize these characteristics in different situations. In some cases, the controller may determine a timing or frequency of operating mode switches as well as the particular operating mode to be used in manner that may maximize throughput to devices of each in the first coverage area, the second coverage area, and the third coverage area, based on, for example, a demand for services from each of the coverage areas, a power gain (and/or other performance metrics) associated with the antennas corresponding to each of the coverage areas, fixed and/or dynamic interference conditions (e.g., weather and environmental conditions, a location of the communications satellite, etc.), and the other like techniques and considerations provided herein.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, where other procedures may take precedence over or otherwise modify their application.

FIG. 1 illustrates a satellite communications system 100 that supports switching between operating modes of beamforming systems and satellites in accordance with aspects of the present disclosure. The satellite communications system 100 may use a number of network architectures including a space segment and a ground segment. The space segment may include one or more communications satellites 105. The ground segment may include one or more user terminals 150, one or more access node terminals 160 (including, e.g., gateway terminals, or as may alternatively be referred to simply as "gateways"), and one or more network devices 170 (including, e.g., network operations centers (NOCs) and satellite and gateway terminal command centers). Network devices 170 may include a controller 175, which may determine commands for control of satellites 105. The devices of the ground segment may, in some cases, be referred to as Earth stations. While only one user terminal 150, one access node terminal 160, etc., are shown in the example satellite communications system 100 of FIG. 1 for the sake of simplicity, there are typically many such devices in the satellite communications system 100. One or more terminals of the satellite communications system 100 (e.g., access node terminals 160) may be connected to each other and/or to one or more networks 180, for example. via a mesh network, a star network, or the like.

The communications satellite 105 may be any suitable type of communications satellite configured for wireless communication with the one or more access node terminals 160 and the one or more user terminals 150. In some examples the communications satellite 105 may be deployed in a geostationary orbit, such that its orbital position with respect to terrestrial devices is relatively fixed, or fixed within an operational tolerance or other orbital window (e.g., within an orbital slot). In other examples, the communications satellite 105 may operate in any appropriate orbit (e.g., low Earth orbit (LEO), medium Earth orbit (MEO), etc.). In some examples the communications satellite 105 may have an uncertain orbital position, such as in cases in which the communications satellite 105 is designed before an orbital slot deployment has been determined; in cases in which the communications satellite 105 may be deployed to different positions in a range of possible orbital positions (e.g., being deployed to an orbital slot that has a range of orbital positions, to one of a set of different orbital slots, etc.) and/or to a range of different orbital paths; and/or in cases in which the communications satellite 105 may, over time, drift after deployment to a previously uncertain or unintended orbital position and/or orbital path. In various examples, the communications satellite 105 may be retasked (e.g., moved to a different geostationary orbital slot, adjusted to a different LEO or MEO orbital path, etc.). Additionally or alternatively, the communications satellite 105 may receive (e.g., from controller 175) commands to perform orbit modification or retasking. Though many examples are described throughout this disclosure in context of a satellite, such as the satellite communications system 100, such examples are not intended to be limited to satellites. In other implementations, any other suitable wireless device may be used and operate in a similar manner.

User terminals 150 may include any number of devices configured to communicate signals with the communications satellite 105, including, for example, fixed terminals (e.g., ground-based stationary terminals) and mobile terminals such as terminals on boats, aircraft, ground-based vehicles, handheld terminals, and the like. The user terminal 150 (or any number of user terminals 150) may communicate data and information via the communications satellite 105, which may include communicating via one or more access node terminals 160, to a destination device, such as one or more network device 170 or some other device or distributed server associated with one or more networks 180. User terminals 150 may communicate signals according to a variety of physical layer transmission modulation and coding techniques, including, for example, those defined with the Digital Video Broadcasting by Satellite (DVB-S2), GEO Mobile Radio (GMR), Broadband Satellite Multimedia (BSM), Satellite Universal Mobile Telecommunications Service (S-UMTS), Satellite Digital Radio (SDR), and Data Over Cable Service Interface Specification (DOCSIS) standards.

The user terminal 150 may include a user terminal antenna 152 configured for receiving forward downlink signals 117 from the communications satellite 105 and/or transmitting return uplink signals 118 to the communications satellite 105. Thus, the user terminal 150 may be configured for unidirectional and/or bidirectional communications with the communications satellite 105. In some examples, the user terminal antenna 152 may be directional. For example, the user terminal antenna 152 may have a peak gain along a primary axis (e.g., an antenna boresight direction), which may be provided by way of a fixed configuration of focusing and/or reflecting elements and/or by way of electronically configurable beamforming.

The user terminal antenna 152 of the user terminal 150 may be part of a user terminal antenna assembly 153, which may also include various hardware for mounting the satellite terminal antennas. The user terminal antenna assembly 153 may also include circuits and/or processors for converting (e.g., performing frequency conversion, modulating/demodulating, multiplexing/demultiplexing, filtering, forwarding, etc.) between radio frequency (RF) satellite communication signals (e.g., the forward downlink signals 117 and/or the return uplink signals 118) and user terminal communications signals 157 communicated between the user terminal antenna 152 and a user terminal receiver 158 of the user terminal 150. Such circuitry, processors, and/or other components may be included in an antenna communication assembly, which may also be referred to as a transmit and receive integrated assembly (TRIA).

Additionally or alternatively, the user terminal receiver 158 may include circuits and/or processors for performing various RF, intermediate frequency (IF), and/or baseband signal operations (e.g., receiving, performing frequency conversion, modulating/demodulating, multiplexing/demultiplexing, etc.). The user terminal antenna assembly 153 may also be known as a satellite outdoor unit (ODU), and the user terminal receiver 158 may be known as a satellite indoor unit (IDU). In some examples, the user terminal antenna 152 and user terminal receiver 158 (e.g., together) of the user terminal 150 may be a very small aperture terminal (VSAT), where, for example, the user terminal antenna 152 may measure approximately 0.6 meters in diameter and may have a capability of communicating using approximately 2 watts (W) of power. In other embodiments, a variety of other types of user terminal antennas 152 may be used at the user terminal 150 to communicate the forward downlink signals 117 and the return uplink signals 118 with the communications satellite 105. In some cases, each of the user terminals 150 in the coverage area 115 may be a single user terminal or, alternatively, may be a hub or router (not shown) that is coupled to multiple user terminals 150.

A user terminal 150 may be connected with a consumer premises equipment (CPE) 190 (or multiple CPEs 190) via a wired or wireless connection 191, and the user terminal 150 may provide network access services (e.g., Internet access, etc.) and/or other communication services (e.g., broadcast media, etc.) to CPEs 190 via the satellite communications system 100. The CPE(s) 190 may include user devices such as, but not limited to, computers, local area networks, internet appliances, wireless networks, mobile phones, personal digital assistants (PDAs), other handheld devices, netbooks, notebook computers, tablet computers, laptops, display devices (e.g., TVs, computer monitors, etc.), printers, and the like. The CPE(s) 190 may also include any equipment located at a premises of a subscriber, including routers, firewalls, switches, private branch exchanges (PBXs), Voice over Internet Protocol (VoIP) gateways, and the like. In some examples, the user terminal 150 may provide two-way communications between the CPE(s) 190 and the network(s) 180 via the communications satellite 105 and the access node terminal(s) 160.

In some examples, the communications satellite 105 may include an antenna assembly 106, which may be a phased array antenna assembly, a phased array fed reflector (PAFR) antenna, or any other mechanism used for transmission and/or reception of signals of a communications service. Alternatively, the communications satellites 105 may employ on-board beamforming (OBBF) to electronically steer an array of antenna elements, for example a communications satellite 105 with phased array multi-feed per beam (MFPB) OBBF capability. In other examples, the satellite communications system 100 may employ end-to-end beamforming to form end-to-end beams through an end-to-end relay (e.g., communications satellite 105), where signals within the end-to-end beams may be transmitted and received at multiple access node terminals 160 to communicate with large numbers of user terminals 150.

As shown in the example satellite communications system 100 of FIG. 1, the antenna assembly 106 includes three antennas (e.g., reflector antennas) to provide communications services to respective coverage areas via signals transmitted over respective beams (e.g., communication links, as generally referred to herein). For example, the communications satellite 105 may communicate signals via a first antenna 110, which may illuminate a first coverage area 115, a second antenna 120, which may illuminate a second coverage area (not shown), and a third antenna 130, which may illuminate a third coverage area 135. The communications satellite 105 may provide communications services to devices located in the first coverage area 115 using a first communication link 116 (e.g., for one or more user terminals 150), where the signals communicated using the first communication link 116 may include forward downlink signals 117 transmitted to the devices in the first coverage area 115 and return uplink signals 118 received from the devices in the first coverage area 115. Additionally, the communications satellite 105 may communicate signals via the second antenna 120 to provide communications services to devices located in the second coverage area using a second communication link (not shown) (e.g., for one or more user terminals 150), where the signals communicated using the second communication link may include forward downlink signals transmitted to the devices in the second coverage area and return uplink signals received from the devices in the second coverage area. Likewise, the communications satellite 105 may communicate signals via the third antenna 130 to provide communications services to devices located in a third coverage area 135 using a third communication link 136 (e.g., for one or more access node terminals 160), where the signals communicated using the third communication link 136 may include forward uplink signals 137 received from the devices in the third coverage area 135 and return downlink signals 138 transmitted to the devices in the third coverage area 135.

A satellite coverage area may be broadly defined as an area from which, and/or to which, either an Earth transmission source, or an Earth receiver, such as a ground-based Earth station or a user terminal 150, may communicate through the communications satellite 105. In some satellite communications system 100, coverage areas for each respective link (e.g., forward uplink coverage area, forward downlink coverage area, return uplink coverage area, and return downlink coverage area) may be different from one another.

While the satellite coverage area may be active only for a communications satellite 105 that is in service (e.g., in a service orbit), the communications satellite 105 may be considered to have a corresponding satellite antenna pattern that is independent of the relative location of the satellite with respect to the Earth. That is, the satellite antenna pattern is a pattern of distribution of energy transmitted from an antenna of a satellite, for example, either transmitted from or received by the antenna of the satellite (e.g., via each of the reflectors of the communications satellite 105, with reference to FIG. 1). The antenna of the satellite may illuminate (i.e., transmits to and/or receives from) a particular satellite coverage area according to the satellite antenna pattern, for example, when the satellite is in a service orbit. The satellite coverage area may be defined by the satellite antenna pattern, an orbital position and attitude for which the satellite is designed, a given antenna gain threshold, and/or other like parameters. In general, the intersection of an antenna pattern (at a particular effective antenna gain, e.g., 3 decibels (dB), 4 dB, 6 dB 10 dB from peak gain) with a particular physical region of interest (e.g., an area on or near the Earth surface) defines the coverage area for the antenna. Antennas may be designed to provide a particular antenna pattern (and/or coverage area), where, for example, the antenna pattern may be determined computationally (e.g., by analysis or simulation) and/or measured experimentally (e.g., on an antenna test range or in actual use).

As described herein, the first antenna 110 of the communications satellite 105 may provide communications services to user terminals 150 or other devices located within the first coverage area 115. In some cases, the first coverage area 115 may be relatively large, for example, covering portions of one or more continents or up to the entirety of the visible portion of the Earth from the perspective of the communications satellite 105. The second antenna 120 of the communications satellite 105 may provide communications services to user terminals 150 or other devices located within the second coverage area (not shown). In some cases, the second coverage area may be an area that is smaller than the first coverage area, but which, for example, covers a region of the Earth that has a relatively high demand (e.g., a geographic area of densely populated user terminals 150). The third antenna 130 of the communications satellite 105 may provide communications services to access node terminals 160, user terminals 150, and/or other devices located within the third coverage area 135. In some cases, the third coverage area 135 may be an area designated for a relatively large number of access node terminals 160, as is further described herein. In some cases, the communications satellite 105 may include additional antennas (e.g., reflectors) that may provide communications services to devices located within additional coverage areas, for which the techniques described herein may be similarly implemented. In an alternative implementation, the antenna assembly 106 of the communications satellite 105 may include only two antennas, and the techniques described herein may be implemented similarly to switch between operating modes for the two antennas.

In some examples, there may be some overlap between different coverage areas. For example, as shown in the example satellite communications system 100 of FIG. 1, the first coverage area 115 fully overlaps the third coverage area 135. Likewise, in some examples, the first coverage area 115 may partially or fully overlap a second coverage area (not shown). In some cases, a multi-color pattern (e.g., two, three or four-color re-use pattern) may be used. In an example of a four-color pattern, a coverage area may be divided up into multiple user beam coverage areas, with each user beam coverage area associated with a user beam. Each user beam may be individually allocated a unique combination of frequency (e.g., a frequency range or ranges or one or more channels) and/or antenna polarization (e.g., orthogonal linear polarizations, RHCP, LHCP, or other like polarization techniques). Accordingly, these techniques may relatively reduce an amount of mutual interference between signals transmitted on different user beams. These combinations of frequency and antenna polarization may then be re-used in a repeating "four-color" re-use pattern, where user beam coverage areas associated with a combination of a frequency range and polarization may be non-overlapping. In some situations, a desired communication capacity may be achieved by using a single color. In some cases, time sharing among communication links and/or other interference mitigation techniques can be used for similar purposes.

The access node terminal 160 (or any number of access node terminals 160 in the third coverage area 135) may transmit forward uplink signals 137 and receive return downlink signals 183 to and from the communications satellite 105, respectively, for example, via the third antenna 130. Access node terminals 160 may also be known as ground stations, gateways, gateway terminals, satellite access nodes, or hubs. The access node terminal 160 may include an access node terminal antenna system 161 and an access node receiver 162. The access node terminal antenna system 161 may be two-way capable and designed with adequate transmit power and receive sensitivity to reliably communicate with the communications satellite 105. In one embodiment, the access node terminal antenna system 161 may include a parabolic reflector with relatively higher directivity in the direction of the communications satellite 105 and relatively lower directivity in other directions. The access node terminal antenna system 161 may be configured (e.g., via one or more configurations) to support features such as high isolation between orthogonal polarizations, high efficiency in the operational frequency bands, low noise, and the like.

In some cases, the access node terminal 160 may schedule communications traffic to the user terminal 150 or user terminals 150 in the first coverage area 115. Alternatively, other devices of the satellite communications system 100 may perform this scheduling (e.g., at one or more network devices 170, which may include one or more NOCs and/or one or more gateway command centers, etc.). Although the example satellite communications system 100 of FIG. 1 shows one access node terminal 160, alternative embodiments may include any number of access node terminals 160, and each access node terminal 160 may be coupled to each of the others and/or the network 180 (or one or more of the networks 180).

Some satellite communications systems 100 may use and/or have access to a relatively limited amount of available frequency spectrum for communications. In some cases, communication links between access node terminals 160 and the communications satellite 105 may use overlapping (e.g., the same), partially overlapping, or non-overlapping (e.g., different) sets of frequency resources for communicating signals between the communications satellite 105 and user terminals 150. In some cases, access node terminals 160 may be located in a coverage area that at least partially overlaps (or, e.g., fully overlaps) with a coverage area for the user terminals 150. For example, as shown in FIG. 1, the first coverage area 115 including the user terminals 150 may fully overlap the third coverage area including the access node terminals 160. Additionally or alternatively, access node terminals 160 may be located remotely from the user terminals 150, for example, to facilitate reusing the same or partially the same frequency resources for communicating with the communications satellite 105.

The access node terminals 160 may provide an interface between the network 180 (or networks 180) and the communications satellite 105. The access node terminals 160 may be configured to receive data and information directed between the network 180 and the user terminals 150 in the first coverage area 115 and may format the data and information to be delivered to respective user terminals 150. Similarly, the access node terminals 160 may be configured to receive signals from the communications satellite 105 (e.g., from one or more respective user terminals 150) via the communications satellite for the access node terminals 160 to direct to a destination accessible via one or more networks 180, for example. The access node terminals 160 may also format the received signals for transmission on network 180.

In different implementations, the network(s) 180 may be any type of network and may include, for example, the Internet, an Internet Protocol (IP) network, an intranet, a wide-area network (WAN), a metropolitan area network (MAN), a local area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. The network(s) 180 may include wired and/or wireless connections, as well as optical links, and may connect the access node terminals 160 in the third coverage area 135 with each other to facilitate communications between the access node terminals 160 and the communications satellite 105.

In some cases, one or more network devices 170 may be coupled with the access node terminals 160 and may control aspects of the satellite communications system 100. In some cases, one or more of the network devices 170 may be co-located or otherwise located in relatively near physical proximity to the access node terminals 160. Alternatively, one or more of the network devices 170 may be located at a remote installation, for example, that communicates with the access node terminals 160 and/or network(s) 180 via wired and/or wireless communications links. In some cases, the network devices may include the controller 175.

The access node terminals 160 may receive forward data from one or more network devices 170 and/or one or more networks 180, modulate the received data (e.g., using a modem), and transmit forward uplink signals 137 including the modulated data to the communications satellite 105 using the third communication link 136 (this may also be referred to as using a feeder link, forward feeder uplink, etc.). The communications satellite 105 may relay this forward data to user terminals 150 using the first communication link 116 (this may also be referred to as using a forward user downlink, a forward service downlink, etc.). In some cases, the forward direction communication from the access node terminals 160 is intended for several of the user terminals 150 (e.g., information is multicast to the user terminals 150). In some cases, the forward communication from the access node terminals 160 may be intended for only one user terminal 150 (e.g., unicast to a particular user terminal 150) or a subset of the user terminals 150 within the first coverage area 115.

The user terminals 150 may transmit return data to the communications satellite 105 on a return user uplink (sometimes called a return service uplink), for example, via the return uplink signals 118 using the first communication link 116 (e.g., illuminating the first coverage area 115). The communications satellite 105 may relay the return data to the access node terminals 160 on a return feeder downlink, for example, via the return downlink signals 138 using the third communication link 136. In some cases, a feeder-link modem in proximity with or co-located with one or more of the access node terminals 160 may demodulate the return data, which may then be forwarded to one or more network devices 170 and/or one or more networks 180. This return-link capability may generally be shared by a number of user terminals 150.

The communications satellite 105 may receive forward uplink signals 137 from one or more access node terminals 160 located in the third coverage area 135 and provide corresponding forward downlink signals 117 to one or more user terminals 150 located in the first coverage area 115. The communications satellite 105 may also receive return uplink signals 118 from one or more user terminals 150 located in the first coverage area 115 and forward corresponding return downlink signals 138 to one or more access node terminals 160 located in the third coverage area 135. The communications satellite 105 may use a variety of physical layer transmission modulation and coding techniques to communicate signals between the access node terminals 160 and the user terminals 150 (e.g., adaptive coding and modulation (ACM), etc.).

In some embodiments, a Multi-Frequency Time-Division Multiple Access (MF-TDMA) scheme may be used for forward uplink signals 137 and return uplink signals 118, allowing efficient streaming of traffic while maintaining flexibility in allocating capacity among user terminals 150. In these embodiments, a number of frequency channels may be allocated in a fixed manner or, alternatively, may be allocated in a dynamic fashion. A Time Division Multiple Access (TDMA) scheme may also be employed in each frequency channel. In this scheme, each frequency channel may be divided into several timeslots that can be assigned to a connection (e.g., to a particular user terminal 150). In other embodiments, one or more of the forward uplink signals 137 and return uplink signals 118 may be configured using other schemes, such as Frequency Division Multiple Access (FDMA), Orthogonal Frequency Division Multiple Access (OFDMA), Code Division Multiple Access (CDMA), or any number of hybrid or other schemes known in the art. In various embodiments, physical layer techniques may be the same for each of the signals 117, 118, 137, and 138, or some of the signals may use different physical layer techniques than other signals.

Within some limits, focusing beams into smaller areas and thus increasing a number of beams, may relatively increase a data capacity of the communications satellite 105 by allowing greater opportunity to reuse partially or fully overlapping sets of frequency resources. However, increasing the number of beams may relatively increase a complexity of the satellite communications system 100, and correspondingly, in many cases, a complexity of the communications satellite 105.

Complexity in the design of the communications satellite 105 may result in a relatively larger size, a relatively greater weight, and a relatively greater power consumption. Communications satellites 105 may be relatively expensive to launch into orbit, and the cost of launching communications satellites 105 may be determined, at least in part, according to the weight and size of the satellite. In addition, there may be relatively absolute limits on the weight and size of communications satellites 105 that may be launched into orbit using available rocket technology. Further, the amount of power that may be provided to components of communications satellites 105 may be limited in orbit. Therefore, techniques to relatively improve the weight, size, and/or power consumption of the communications satellite 105 may be beneficial.

As described herein, the term receive antenna element may refer to a physical transducer that converts an electro-magnetic signal to an electrical signal, and the term transmit antenna element may refer to a physical transducer that emits an electro-magnetic signal when excited by an electrical signal. The antenna element can include a horn, septum polarized horn (e.g., which may function as two combined elements with different polarizations), multi-port multi-band horn (e.g., dual-band 20 gigahertz (GHz)/30 GHz with LHCP/RHCP dual polarization), cavity-backed slot, inverted-F, slotted waveguide, Vivaldi, Helical, loop, patch, or any other configuration of antenna element or combination of interconnected sub-elements. An antenna element may have a corresponding antenna pattern that describes how the antenna gain varies as a function of direction (or angle). An antenna element may also a coverage area which corresponds to an area (e.g., a portion of the Earth surface) or volume (e.g., a portion of the Earth surface plus airspace above the surface) over which the antenna element provides a desired level of gain (e.g., within 3 dB, 6 dB, 10 dB, or other value relative to a peak gain of the antenna element). The coverage area of the antenna element may be modified by various structures such as a reflector, frequency selective surface, lens, radome, and the like. Some communications satellites 105, including those described herein, may include several transponders, each able to independently receive and transmit signals. Each transponder is coupled to antenna elements (e.g., a receive element and a transmit element) to form a receive/transmit signal path that has a different radiation pattern (antenna pattern) from the other receive/transmit signal paths to create unique beams that may be allocated to the same or different beam coverage areas. In some cases, a single receive/transmit signal path may be shared across multiple beams using input and/or output multiplexers. In such cases, the number of simultaneous beams that may be formed may generally be limited by the number of receive/transmit signal paths deployed on the satellite.

Beamforming for a communication link may be performed by adjusting the signal phase (or time delay), and sometimes signal amplitude, of signals transmitted and/or received by multiple elements of one or more antenna arrays. In some cases, some or all antenna elements are arranged as an array of constituent receive and/or transmit elements that cooperate to enable end-to-end beamforming, as described below. For transmissions (from transmit elements of the one or more antenna arrays), the relative phases, and sometimes amplitudes, of the transmitted signals are adjusted, so that the energy transmitted by transmit antenna elements will constructively superpose at a desired location. This phase/amplitude adjustment is commonly referred to as applying "beam weights" or "beam coefficients" to the transmitted signals. For reception (by receive elements of the one or more antenna arrays), the relative phases, and sometimes amplitudes, of the received signals are adjusted (e.g., the same or different beam weights are applied) so that the energy received from a desired location by multiple receive antenna elements will constructively superpose. In some cases, a beamformer may compute antenna element beam weights to be applied. The term beamforming may refer in some cases to the application of the beam weights. Adaptive beamformers include the function of dynamically computing the beam weights. Computing the beam weights may require direct or indirect discovery of the communication channel characteristics. The processes of beam weight computation and beam weight application may be performed in the same or different system elements.

With reference to the satellite communications system of FIG. 1, the antenna beams (e.g., the first communication link 116, the second communication link (not shown), and the third communication link 136) may be steered, selectively formed, and/or otherwise reconfigured by applying different beam weights to illuminate (i.e., transmit signals to and/or receive signals from) a particular satellite coverage area according to the satellite antenna pattern, for example, when the satellite is in a service orbit. For example, a number of active beams, coverage area of beams, size of beams, relative gain of beams, and other parameters may be varied over time. Beamforming antennas may generally form relatively narrow beams, where relatively narrow beams may allow the signals transmitted on one beam to be distinguished from signals transmitted on the other beams (e.g., to avoid interference). Accordingly, narrow beams may facilitate frequency and polarization to be re-used to a greater extent than when larger beams are formed. For example, beams that are narrowly formed can service two noncontiguous coverage areas that are non-overlapping. Beams focused to noncontiguous coverage areas can both use the same frequency and polarization. Greater reuse can increase the amount of data transmitted and/or received.

Some communications satellites 105 may employ OBBF to electronically steer an array of antenna elements, for example a communications satellite 105 with phased array MFPB OBBF capability. In this example, the beam weights may be computed at a ground-based computation center and then transmitted to the communications satellite 105 or pre-stored in the communications satellite 105 for application (e.g., via one or more network devices 170 and/or networks 180).

Beamforming (e.g., OBBF) may be employed on the user link (e.g., the first communication link 116 for the user terminals 150), the feeder link (e.g., the third communication link 136 for the access node terminals 160), or both. In some examples, the communications satellite 105 may form beams (e.g., communication links) on both the feeder link and the user link. In some cases, each of L elements of a receive array of the communications satellite 105 may receive K signals from K access node terminals 160 (e.g., in some cases, co-located, or not co-located, with one or more gateways). For one or more, or each, of the K feeder link beams that are to be created (e.g., one beam per gateway), a different beam weight may be applied (e.g., a phase/amplitude adjustment is made) by a receive beamformer (e.g., of the communications satellite 105) to each signal received by each of L receive antenna array elements of a receive antenna array. Accordingly, for K beams to be formed using a receive antenna array having L receive antenna elements, K different beam weight vectors of length L may be applied to the L signals received by the L receive antenna array elements. The receive beamformer within the communications satellite 105 (e.g., included as part of, or in communication with an interconnect subsystem of the communications satellite 105) may adjust the phase/amplitude of the signals received by the L receive antenna array elements to create K receive beam signals. Each of the K receive beams may be focused to receive a signal from one respective gateway. Accordingly, the receive beamformer may output K receive beam signals, and one such receive beam signal may be formed for the signal received from each transmitting gateway.

In some examples, circuitry of the communications satellite 105 (e.g., included as part of, or in communication with an interconnect subsystem of the communications satellite 105) may down-convert each of the K receive beam signals and adjust a gain appropriately. K signals may be output from the circuitry and coupled to a transmit beamformer (e.g., of the communications satellite 105). The transmit beamformer may apply a vector of L weights to each of the K signals for a total of L×K transmit beam weights to form K beams on the user downlink.

In some cases, a relatively significant processing capability of the communications satellite 105 may be used to control the phase and gain of each antenna element that may be used to form these beams. Such processing power may increase the complexity of the communications satellite 105. In some cases, communications satellites 105 may operate with ground-based beamforming (GBBF) to reduce the complexity of the satellite while still providing the advantage of electronically forming narrow beams. GBBF may be performed on the forward user link via an L element array. For GBBF, the phases and/or amplitudes of signals transmitted on the user link may be weighted such that beams are formed. The feeder link may use a Single Feed per Beam (SFPB) scheme in which each receive and transmit antenna element of an antenna are dedicated to one feeder link beam.

Prior to transmission from one or more gateways, for each of K forward feeder link beams, a transmit beamformer (e.g., in communication with, included at, and/or located within a physical proximity to one or more access node terminals 160) may apply a respective one of K beam weight vectors, each of length L, to each of K signals to be transmitted. Determining the K vectors of L weights and applying them to the signals enables K forward beams to be formed on the ground for the forward user downlink. On the feeder uplink, each of the L different signals may be multiplexed into a frequency division multiplexed (FDM) signal by a multiplexer or the like. Each FDM signal may be transmitted by the gateways to one of the receive antenna elements in an antenna on the feeder link. An FDM receiver on the communications satellite 105 may receive the signals from the antenna (e.g., via the third antenna 130). In some cases, circuitry of the communications satellite 105 (e.g., an analog to digital converter (A/D) 326, etc., included as part of, or in communication with an interconnect subsystem of the communications satellite 105) may convert the received analog signals to digital signals. A digital channel processor, for example, may demultiplex the FDM signals, each of which may have been appropriately weighted by the beamformer for transmission through one of L elements of an array of transmit antenna elements of a transmit antenna. The digital channel processor may output the signals to, for example, a digital to analog converter (D/A) (or other like circuitry, e.g., included as part of, or in communication with an interconnect subsystem of the communications satellite 105) to be converted back to analog form. The analog outputs of the D/A may be up-converted and amplified by an up-converter (U/C) and gain stage (or other like circuitry, e.g., included as part of, or in communication with an interconnect subsystem of the communications satellite 105) and transmitted by the associated element of the transmit antenna. A complimentary process may occur in reverse for return beams. Note that in this type of system the FDM feeder link may use a factor L times as much bandwidth as the user beams, and thus may be relatively less efficient for making a practical satellite communications systems 100 with wide data bandwidths and/or satellite communications systems 100 that have a large number of elements L.

In some examples, end-to-end beamforming systems may be employed to form end-to-end beams through an end-to-end relay (e.g., included as part of, or in communication with an interconnect subsystem of the communications satellite 105). An end-to-end beamforming system may connect user terminals 150 with data sources/sinks, where beam weights may be computed at a central processing system (CPS) and end-to-end beam weights may be applied within the ground network (rather than at the communications satellite 105). Signals within the end-to-end beams may be transmitted and received at an array of access node terminals 160, which may, in some cases, be referred to as satellite access node (SANs). As described above, any suitable type of end-to-end relays may be used in an end-to-end beamforming system, and different types of access node terminals 160 may be used to communicate with different types of end-to-end relays. The term "central" refers to the fact that the CPS is accessible to the access node terminals 160 that are involved in signal transmission and/or reception, and does not refer to a particular geographic location at which the CPS resides. A beamformer within a CPS (or multiple beamformers at one or more CPSs) may compute a set of end-to-end beam weights that accounts for: (1) the wireless signal uplink paths up to the end-to-end relay; (2) the receive/transmit signal paths through the end-to-end relay; and (3) the wireless signal downlink paths down from the end-to-end relay. The beam weights can be represented mathematically as a matrix. As similarly discussed herein, OBBF and GBBF satellite communications systems 100 may have beam weight vector dimensions set by a number of antenna elements on the communications satellite 105. In contrast, end-to-end beam weight vectors may have dimensions set by a number of the access node terminals 160 rather than a number of elements on the end-to-end relay. In some examples, the number of the access node terminals 160 may not be the same as the number of antenna elements on the end-to-end relay. Further, the formed end-to-end beams may not be terminated at either transmit or receive antenna elements of the end-to-end relay. Rather, the formed end-to-end beams may be effectively relayed, since the end-to-end beams have uplink signal paths, relay signal paths (via a satellite or other suitable end-to-end relay), and downlink signal paths.

Because end-to-end beamforming may account for the user link and the feeder link (as well as the end-to-end relay), a single set of beam weights may be used to form the end-to-end user beams for a particular direction (e.g., forward user beams or return user beams). Thus, one set of end-to-end forward beam weights (which may be referred to simply as forward beam weights) may cause the signals transmitted from the access node terminals 160, through the forward uplink, through the end-to-end relay (e.g., at the communications satellite 105), and through the forward downlink to combine to form the end-to-end forward user beams (hereafter referred to as forward user beams). Conversely, signals transmitted from return users through the return uplink, through the end-to-end relay (e.g., at the communications satellite 105), and the return downlink have end-to-end return beam weights (hereafter referred to as return beam weights) applied to form the end-to-end return user beams (hereafter referred to as return user beams).

In some examples, the access node terminals 160 may cooperate in transmitting forward uplink signals to form user beams and receiving return downlink signals, which may be collectively processed to recover return uplink transmissions. A set of access node terminals 160 that are within a distinct area (e.g., within the service area of an antenna) and cooperate to perform end-to-end beamforming for forward and/or return user beams is referred to herein as an "access node cluster" (e.g., within the third coverage area 135). In some examples, multiple access node clusters in different areas may also cooperate. Access node clusters may, in some cases, be referred to as "SAN farms." In some cases, access node terminals 160 and user terminals 150 may collectively be referred to as Earth receivers, Earth transmitters, or Earth transceivers, depending upon the particular functionality at issue, since they are located on, or near, the Earth and both transmit and receive signals. In some cases, user terminals 150 and/or access node terminals 160 can be mounted on aircraft, watercraft, or landcraft, or handheld, etc. In some cases, the user terminals 150 and/or the access node terminals 160 may be geographically distributed. In some cases, the access node terminals 160 may exchange signals with a CPS within the ground segment, for example, via a distribution network. In some examples, user terminals 150 may be grouped with other nearby user terminals 150 (e.g., in respective beam coverage areas within the first coverage area 115). In some cases, such groups of user terminals 150 may be serviced by the same communication link and so reside within the same beam coverage area.

The end-to-end relay (e.g., included as part of, or in communication with an interconnect subsystem of the communications satellite 105) may, for example, relay signals wirelessly between the user terminals 150 and a number of access node terminals 160. The end-to-end relay may include a plurality of signal paths. Each signal path may include, for example, at least one receive antenna element, at least one transmit antenna element, and at least one transponder. In some cases, the receive antenna elements may be arranged to receive signals reflected by a receive reflector to form a receive antenna array. In some cases, the transmit antenna elements may be arranged to transmit signals and thus to form a transmit antenna array.

In some examples, the end-to-end relay may be implemented on the communications satellite 105. In other examples, the end-to-end relay may be implemented on an aircraft, blimp, tower, underwater structure or any other suitable structure or vehicle in which an end-to-end relay may reside. In some cases, the antenna communications systems 100 may use different frequency ranges (in the same or different frequency bands) for uplinks and downlinks. In some cases, feeder links and user links may be in different frequency ranges (in the same or different frequency bands). In some cases, the end-to-end relay may act as a passive or active reflector.

In some examples, the end-to-end relay may include multiple transponders that, in the context of end-to-end beamforming systems, induce multipath between the access node terminals 160 and the user terminals 150. Another feature is that antennas (e.g., one or more antenna subsystems) of the end-to-end relay may contribute to end-to-end beamforming so that forward and/or return user beams are formed when properly beam-weighted signals are communicated through the multipath induced by the end-to-end relay. For example, during forward communications, each of multiple transponders may receive a respective superposed composite of (beam weighted) forward uplink signals from multiple (e.g., all) of the access node terminals 160 (which may, in some cases, be referred to as composite input forward signals), and the transponders may output corresponding composite signals (which may, in some cases, be referred to as forward downlink signals). Each of the forward downlink signals may be a unique composite of the beam-weighted forward uplink signals, which may, when transmitted by the transmit antenna elements of the end-to-end relay, superpose to form user beams in desired locations. Return end-to-end beamforming may be implemented similarly.

In some cases, conditions and/or demands associated with providing communications services to devices of each of the different coverage areas may change over time. According to the techniques described herein, the communications satellite may be configured with a number of different operating modes that may provide communications services for the coverage areas, for example, each with different characteristics that may provide associated advantages and disadvantages relative to other modes. For example, one operating mode may provide forward link and return link (or uplink and downlink) communications services to the user terminals of one coverage area, whereas another operating mode may only provide forward link (or downlink) communications services, but may provide the forward link services to the user terminals of multiple coverage areas. Additionally or alternatively, some operating modes may provide a greater bandwidth for certain coverage areas, while other operating modes may offer greater reliability, for example. By selecting different ones of these operating modes for different situations, the techniques described herein may allow a communications satellite to dynamically and flexibly adapt its operations to more efficiently provide communications services by switching between different operating modes based on dynamically changing conditions and demands.

Figure 2:
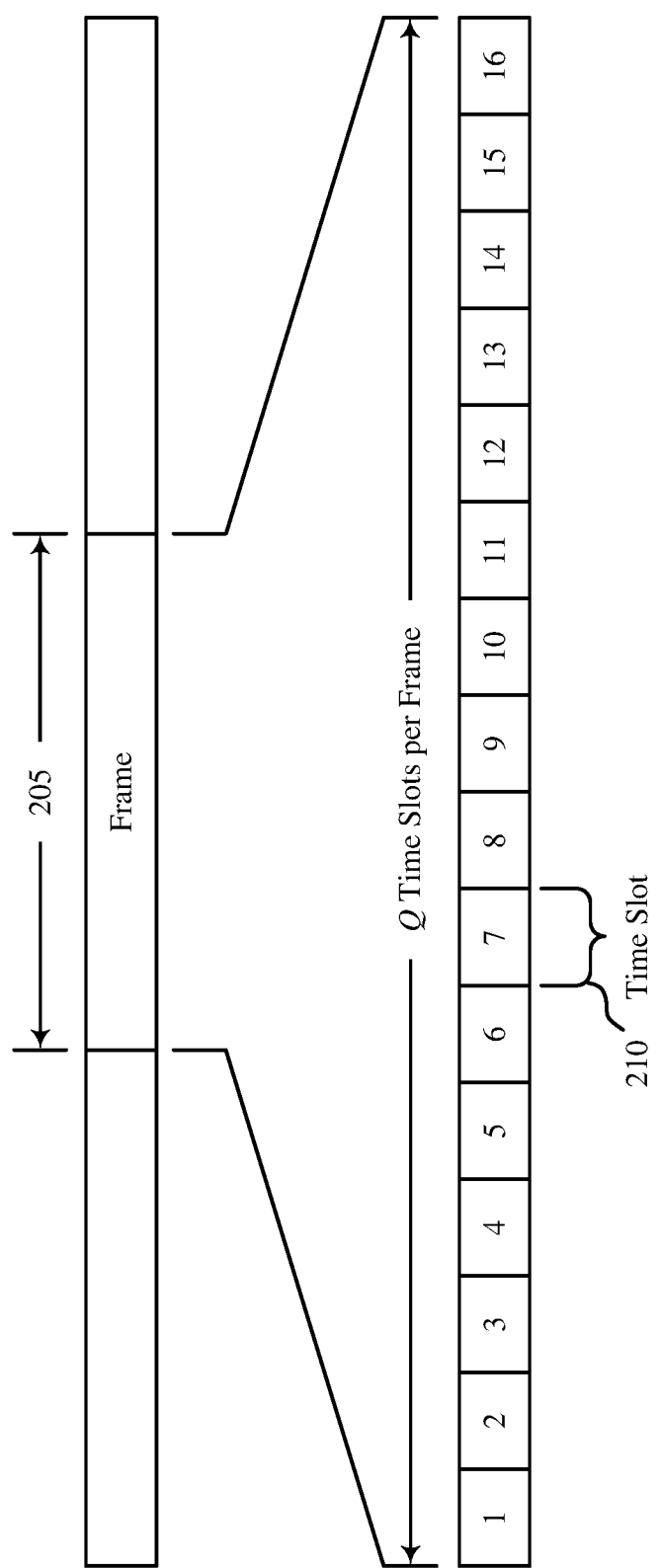
FIG. 2 shows an illustrative frame structure that supports switching between operating modes of beamforming systems and satellites in accordance with aspects of the present disclosure.

FIG. 2 shows an illustrative frame structure 200 that supports switching between operating modes of beamforming systems and satellites in accordance with aspects of the present disclosure. The example frame structure 200 of FIG. 2 shows a number of frames 205, where each frame 205 includes a number of time slots 210 given by a quantity Q. As described herein, a communications satellite may switch between different operating modes. In some cases, a minimum duration that the communications satellite may operate according to any given operating mode may be the duration of one time slot 210, although the communications satellite may operate according to one operating mode for a duration greater than a time slot 210 (e.g., any number of consecutive time slots 210).

In the example frame structure 200 shown in FIG. 2, the quantity Q may be equal to 16, representing that each frame 205 includes 16 time slots 210. Accordingly, in this example and as shown in FIG. 2, the communications satellite may operate according to a first operating mode for a minimum duration of one time slot 210 before switching to operating according to a second operating mode in one or more subsequent time slots 210. The value of 16 for the quantity Q is only one example, and it is contemplated that a frame 205 may include any number of time slots 210 according to any value for the quantity Q.

In some cases, it may be desirable to use the techniques described herein for low latency applications, such as voice. Thus, it may be beneficial for a frequency at which the communications satellite switches operating modes to be made relatively insignificant as compared to other delays (e.g., latency). For example, for a satellite in a geosynchronous orbit (GSO) or geosynchronous equatorial orbit (GEO), a one-way path delay (e.g., signal propagation delay) may be approximately 250 milliseconds (ms), and this one-way path delay may be an unavoidable delay. Therefore, selecting a duration for the frames 205 of approximately one tenth of the value of the one-way path delay, or less, may render any delay between switching operating modes to be relatively insignificant. Accordingly, for a GSO or GEO satellite, a frame duration on the order of approximately 25 ms may generally be adequate, and a shorter frame duration may not significantly reduce a total delay, as the total delay is dominated by the one-way path delay. As such, a duration for the frames 205 to support the techniques described herein for switching operating modes of approximately 25 ms may be suitable for many applications. In other examples, however, different durations may be defined for the frames 205, such that the time slots 210 correspondingly have different durations. For example, in other types of communications systems or other satellite communications systems implementations, other unavoidable delays may be relatively shorter or longer, and thus relatively shorter or longer frames 205 and time slots 210 may be used. In some cases, a very high rate for switching between operating modes may effectively provide multiple different coverage areas with virtually continuous full-rate data services (e.g., by switching at a rate fast enough such that each of the time slots 210 appears to be virtually instantaneous).

In another example, an alternative frame structure may be defined on a substantially slower scale. For example, rather than switching between operating modes several times per second, the communications satellite may be configured to operate according to a first operating mode for duration of time such as multiple seconds, minutes, hours, or multiple days before switching to operating according to a second operating mode. For example, in certain application (e.g., government, military, etc.), an operator of the communications system may identify a particular geographic location (e.g., a temporary installation, a battlefield, a construction site, etc.) to which to provide maximized communications services before switching to another geographic location. Accordingly, in this example, the communications satellite may operate according to a first operating mode for relatively long duration (e.g., multiple hours, days, weeks, months, etc.). before switching to operating according to a second operating mode in one or more subsequent time slots 210.

Figure 3:
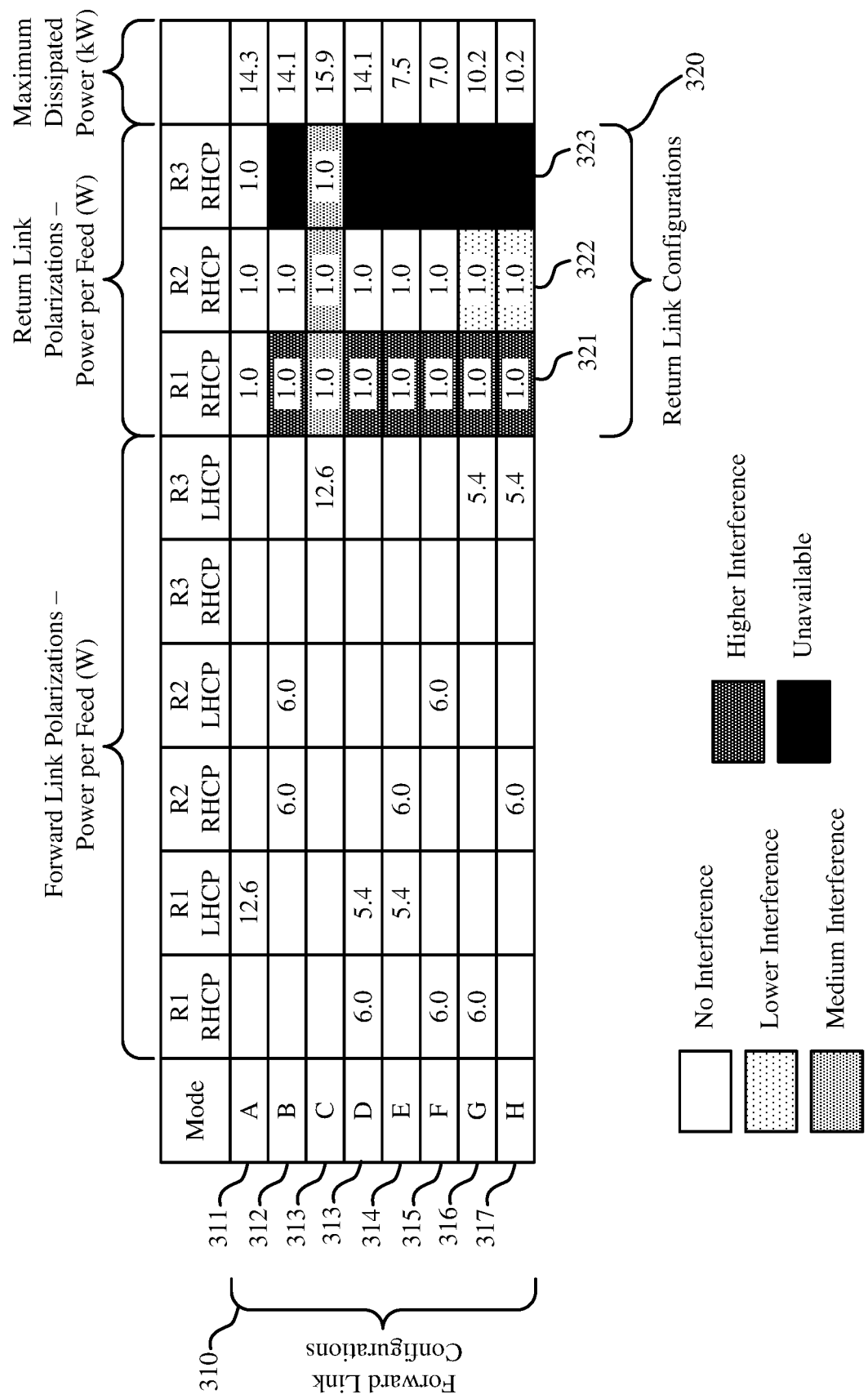
FIG. 3 shows a table of operating modes that support switching between operating modes of beamforming systems and satellites in accordance with aspects of the present disclosure.

FIG. 3 shows a table 300 of operating modes that support switching between operating modes of beamforming systems and satellites in accordance with aspects of the present disclosure. The table 300 provides a summary of numerous operating modes that may be implemented for a communications satellite in the satellite communications systems described with reference to FIGS. 1 and 2. The operating modes referenced in the table 300 represent one example set of operating modes that may be used in one example implementation of the satellite communications systems described herein, but other like implementations are contemplated that may use any number of other analogous sets of operating modes.

The table 300 shows cells defined by respective columns and rows, where values are provided within cells for the operating modes and configurations that are defined herein. The values shown in the cells are to be understood as example values for illustrative purposes with reference to one example implementation.

For example, the shown values may correspond to an implementation in which a communications satellite is configured with bus having a power of 24.8 kilowatts (kW) and a number of high power amplifiers (HPAs) having power-added efficiency (PAE) metrics, for example, ranging from 30% to 40%. However, the values are only exemplary and other like implementations may result in different values. The rows A through H represent forward link configurations 310 (e.g., forward link configurations "A" through "H"). The columns represent polarization states for corresponding forward links and return links for one of three antennas (e.g., reflectors R1, R2, and R3) of the communications satellite. Six columns are provided for forward link polarizations and three columns are provided for return link polarizations. The final column shows a maximum dissipated power of an antenna array for each of the forward link configurations 310A through H. The cells left blank represent, for example, operating modes and configurations that may be unavailable in the contemplated example implementation, although may be used in other like implementations.

As described herein, a communications satellite may include three antennas (e.g., three reflectors referred to herein as R1, R2, and R3 reflectors) that the communications satellite may use to provide communications services to devices of up to three respective coverage areas via signals transmitted and received over beamformed communication links for the respective coverage areas. For example, the communications satellite may include a first antenna (e.g., an R1 antenna or R1 reflector) for communicating with devices in a first coverage area, second antenna (e.g., an R2 antenna or R2 reflector) for communicating with devices in a second coverage area, and a third antenna (e.g., an R3 antenna or R3 reflector) for communicating with devices in a third coverage area.

As referenced herein, in some cases, an operating mode for a communications satellite may be given by two alphanumeric characters. For example, a first of the characters may be a letter corresponding to a respective forward link configuration 310, and a second of the characters may be a numeral corresponding to a respective return link configuration 320. In some cases, an operating mode may include a forward link configuration 310 and no return link configuration 320, in which case the second character may be a "0" (e.g., representing the lack of a return link configuration, i.e., a null value).

With reference to the table 300 of FIG. 3, each of the forward links and return links may be assumed to provide communications with devices in the third coverage area via the R3 antenna (e.g., corresponding to a group of access node terminals, i.e., a "SAN farm"). For example, the forward link configurations for R1, R2, and R3 may be assumed to include receiving forward uplink signals from devices in the third coverage area via the R3 antenna and transmitting (or relaying) forward downlink signals to devices of the respective coverage area corresponding to the indicated R1, R2, or R3 antenna. Likewise, the return link configurations for R1, R2, and R3 may be assumed to include receiving return uplink signals from devices of the respective coverage area corresponding to the indicated R1, R2, or R3 antenna and transmitting (or relaying) downlink signals to devices in the third coverage area via the R3 antenna.

For example, a first operating mode may be represented by "A0," which may correspond to the use of a first forward link configuration 311 "A" in combination with no return link configuration (e.g., indicated by "0"). Referencing table 300, the first forward link configuration 311 "A" provides a value of 12.6 in a cell of the R1 LHCP forward link column, which represents a forward link in which LHCP-polarized signals may be received via the R3 antenna from the third coverage area and transmitted via the R1 antenna to the first coverage area. The value of 12.6 may represent a power amplification of 12.6 W (e.g., provided by an HPA), for example, for each feed of an array of antenna feed elements used for the forward link.

According to different operating modes, each of the forward link configurations 310 "A" through "H" may be used in conjunction with one or more return link configurations 320. The table 300 shows three return link configurations 320 (e.g., "1" through "3") that may be used in conjunction with the forward link configurations 310 (in addition to the null "0" return link configuration). The table 300 includes three return link polarization columns corresponding to these return link configurations 320. For example, the R1 RHCP column corresponds to a first return link configuration 321 "1," which may represent a return link in which RHCP-polarized signals may be received via the R1 antenna from the first coverage area and transmitted via the R3 antenna to the third coverage area. The R2 RHCP column corresponds to a second return link configuration 322 "2," which may represent a return link in which RHCP-polarized signals may be received via the R2 antenna from the second coverage area and transmitted via the R3 antenna to the third coverage area. The R3 RHCP column corresponds to a third return link configuration 323 "3," which may represent a return link in which RHCP-polarized signals may be received via the R3 antenna from the third coverage area and transmitted via the R3 antenna back to the third coverage area (e.g., providing return link communications between different devices within the third coverage area).

The presence of a value in a cell in the return link polarization columns may indicate that the corresponding return link configuration 320 may be available for use with the forward link configuration 310 given by the row containing the cell. The table 300 indicates that three operating modes with a return link configuration 320 may be available for the first forward link configuration 311 "A." For example, the table 300 provides a value of 1.0 in a cell of the R1 RHCP return link column, which may indicate that the first return link configuration "1" may be used with the first forward link configuration 310 "A," for example, in a second operating mode "A1." The value of 1.0 may represent a power amplification of 1.0 W (e.g., provided by an HPA), for example, for each feed of an array of antenna feed elements used for the return link. The table 300 also shows that the second return link configuration 312 "2" and the third return link configuration 313 "3" may also be used with the first forward link configuration 311 "A," for example, in a third operating mode "A2" and a fourth operating mode "A3," respectively.

Each of the return link cells shown in the table 300 is also shaded to represent a level of interference that may occur between the forward link(s) and the return link(s). In some cases, interference may have the effect of reducing a data rate for the associated communication link, for example, because the communications satellite may adjust (e.g., decrease) a modulation and coding scheme (MCS) and/or a coding rate, or other like communications parameters, for communications using the communication link. Alternatively, if the communications satellite does not adjust such communications parameters, the interference may decrease a signal quality metric (e.g., decrease SNR or SINR) for the associated communications, thus similarly reducing an effective data rate for the communications.

As shown in the table 300, for example, each of the return link cells for the first forward link configuration 311 "A" is shaded to indicate that there is substantially no interference between the forward link and the return link. In each of these operating modes (e.g., "A1," "A2," and "A3"), the forward link may be polarized using LHCP while the return links may be polarized using RHCP. As LHCP and RHCP are orthogonal polarization states, cross-polarization isolation may provide polarization diversity between the forward links and the return links, and thus there may be little (e.g., a substantially negligible amount) interference between the forward links and the return links.

In other operating modes, however, the use of a particular return link configuration 320 with a particular forward link configuration 310 may result in interference between the forward link(s) and the return link(s). For example, a second forward link configuration 312 "B" is provided in the table 300. Referencing table 300, the second forward link configuration 312 "B" may include a dual polarization configuration in which both RHCP-polarized signals and LHCP-polarized signals may be received via the R3 antenna from the third coverage area and transmitted via the R2 antenna to the second coverage area over respective forward links. A fifth operating mode "B0" may include only the orthogonal RHCP and LHCP forward links without a return link configuration 320. Combining the second forward link configuration 312 "B" with a return link configuration may, or may not, result in a certain amount of interference.

For example, a sixth operating mode "B 1" may include the second forward link configuration 312 "B" and the first return link configuration 321 "1." The table 300 shows that there may be a high level of interference for the sixth operating mode "B1." In this example, the second forward link configuration 312 "B" may include RHCP-polarized signals, and the first return link configuration 321 "1" may also include RHCP-polarized signals. As such, the RHCP links may not have a cross polarization between them, and thus may result in a high level of interference between signals that occupy, for example, overlapping sets of spatial resources. As described herein, however, the first coverage area may overlap with the third coverage area (as well as the second coverage area). Accordingly, RHCP-polarized signals may be communicated between devices in overlapping geographic areas, and thus the RHCP-polarized forward link and return link signals may occupy overlapping sets of spatial resources, thus resulting in the relatively higher level of interference shown in table 300.

In contrast, a seventh operating mode "B2" may include the second forward link configuration 312 "B" and the second return link configuration 322 "2." The table 300 shows that there may be no interference (or a minimal amount of interference) for the sixth operating mode "B2." That is, in the seventh operating mode "B2," RHCP-polarized signals may be received via the R2 antenna from the second coverage area and transmitted via the R3 antenna to the third coverage area over the return link. As described herein, the second coverage and the third coverage area may not overlap, in some cases. Thus, there may not be an interference issue for the seventh operating mode "B2" because the forward link signals and the return link signals may not occupy overlapping sets of resources.

In some cases, a particular combination of a forward link configuration 310 and a return link configuration 320 may be unavailable. For example, as shown in the table 300, a combination of the second forward link configuration 312 "B" and the third return link configuration 323 "3" may not be available. In such a hypothetical eighth operating mode "B3," the R3 antenna may be used to receive dual-polarized forward uplink signals, and thus the R3 antenna may not be available to also transmit return downlink signals according to the third return link configuration 323 "3." Such a hypothetical operating mode is further described herein with reference to FIG. 15. Likewise, because each of the fourth forward link configuration 314 "D," fifth forward link configuration 315 "E," sixth forward link configuration 316 "F," seventh forward link configuration 317 "G," and the eighth forward link configuration 318 "H" may use the third antenna R3 to receive dual-polarized forward uplink signals, the third return link configuration 323 "3" may similarly be unavailable with each of these forward link configurations.

Table 300 also shows example operating modes that may result in a "medium" level of interference. For example, a third forward link configuration 313 "C" is provided in the table 300. Referencing table 300, in the third forward link configuration 313 "C," LHCP-polarized signals may be received via the R3 antenna from the third coverage area and transmitted via the R3 antenna back to the third coverage area over a forward link. A ninth operating mode "C0" may include only the LHCP forward link without a return link configuration. In some cases, combining the third forward link configuration 313 "C" with a return link configuration 320 may result in a medium level of interference. For example, in each of a tenth operating mode "C1," an eleventh operating mode "C2," and a twelfth operating mode "C3," interference may occur due to the simultaneous reception and transmission of the LHCP forward uplink and downlink via the R3 antenna. For example, a carrier-to-interference (C/I) ratio may be reduced (e.g., by approximately 14 dB) as compared to a configuration where the reception of forward link signals occurs via an antenna with a non-overlapping coverage area to the antenna for forward link transmission. Further, in the tenth operating mode "C1," a higher forward link EIRP of the LHCP forward uplink may cause interference to the RHCP return uplink at R1. While the LHCP and RHCP signals may be cross polarized, the higher forward link EIRP of the LHCP forward uplink signals from the access node terminals may result in additional cross-polarization interference through R1 (e.g., 3 to 8 dB relative to carrier (dBc)).

Table 300 also shows example operating modes that may result in a relatively lower level of interference. For example, a fourth forward link configuration 314 "G" is provided in the table 300. Referencing table 300, in the fourth forward link configuration 314 "G," RHCP-polarized signals may be received via the R3 antenna from the third coverage area and transmitted via the R1 antenna to the first coverage area over a first forward link, and LHCP-polarized signals may also be received via the R3 antenna from the third coverage area and transmitted via the R3 antenna back to the third coverage area over a forward link. A thirteenth operating mode "G0" may include only the RHCP and LHCP forward links without a return link configuration. In some cases, combining the fourth forward link configuration 314 "G" with a return link configuration 320 may result in a "lower" level of interference. For example, in a fourteenth operating mode "G2" with a return link provided via an RHCP return uplink received via the R2 antenna and an RHCP return downlink transmitted via the R3 antenna. In this case, the RHCP forward downlink signals transmitted via the R1 antenna may interfere with the RHCP return downlink signals transmitted via the R3 antenna because of the geographic overlap between the R1 antenna coverage area and the R3 antenna coverage area and the higher EIRP of the forward downlink signals relative to the return downlink signals (e.g., the forward downlink signals may have C/I 7-12 dB higher than the return downlink signals).

In addition to the fourteen operating modes described above, table 300 also provides up to thirteen additional operating modes, such as: "D0," "D1," "D2," "E0," "E1," "E2," "F0," "F1," "F2," "G1," "H0," "H1," and "H2." In all, the table 300 provides twenty seven operating modes (including the "hypothetical" B3 operating mode), which may each be implemented in ways similar to those described above according to the table 300. Each of these operating modes is described in turn below, with reference to the satellite communications systems of FIGS. 4 through 10 and 12 through 31.

As shown by the values provided in the table 300 and the various levels of interference between forward and return links, different operating modes may be used in different situations according to their respective characteristics. For example, certain operating modes may provide relatively higher channel capacity to a certain coverage area, and thus may be used to provide relatively higher throughput to that coverage area in certain situations. In other situations, it may be desirable to provide lower throughput with greater channel diversity between different coverage areas, and/or to concurrently provide communications services to more or fewer coverage areas. Accordingly, a communications satellite may be configured to switch between operating modes, for example, to optimize these characteristics in different situations.

According to the techniques described herein, a communications satellite may be configured to operate according to an initial operating mode (e.g., a default operating mode or generally one of the operating modes described herein). After operating according to the initial operating mode for a period of time, the communications satellite may be configured to switch to a second (e.g., new) operating mode (e.g. according to an instruction received from a controller), and the communications satellite may switch its operations from the initial operating mode to the new operating mode accordingly.

In some cases, the communications satellite may be configured to switch between operating modes according to a pattern or sequence of operating modes (e.g., based on known macroscopic environmental or traffic conditions). In some cases, the communications satellite may be configured with a sequence of operating modes between which to switch in a defined order to provide communications services to devices within an aggregate coverage area of the respective coverage areas. For example, the communications satellite may be operated according to a pattern (e.g., repeating pattern) of operating modes that provides desired forward and return link data rates for the respective coverage areas. The pattern or sequence of operating modes may vary with traffic load or environmental conditions (e.g., according to a time of day).

In some cases, the sequence of operating modes may be modified according to one or more criteria. For example, the communications satellite may generally be configured to switch between a first and a second operating mode according to a standard pattern (e.g., for standard operations), but the communications satellite may also be configured to modify the standard pattern based on one or more criteria. Such criteria may include, for example, an identified volume of traffic and/or time of day. That is, the communications satellite may generally use a first pattern of operating modes at a certain time of day unless, for example, if the communications satellite detects relatively increased data traffic from a certain region. In this case, the communications satellite may be switched to a second pattern of operating modes to provide increased data throughput for this region.

Additionally or alternatively, the communications satellite may be switched (e.g., dynamically) to a new operating mode or pattern of operating modes based on one or more criteria. For example, the satellite communications system 100 may identify and/or be configured with one or more dynamic switching events based on which the communications satellite may switch operating modes or patterns of operating modes. Accordingly, when the occurrence of dynamic switching event is detected (e.g., according to one or more measurements or other criteria), the communications satellite may switch from a first operating mode to a second operating mode or from a first pattern of operating modes to a second pattern of operating modes. For example, the satellite communications system 100 may determine that a performance characteristic, such as a signal quality metric (e.g., SNR, SINR, EIRP, etc.), meets a corresponding threshold for switching operating modes or patterns of operating modes. For example, the satellite communications system 100 may determine that the signal quality metric (e.g., for a communication link via one or more of the antennas) has fallen beneath a desired signal quality target and may switch to the second operating mode or second pattern of operating modes to provide communications services over other communications links having a higher signal quality and, correspondingly, reliability (but which, e.g., may have a lower ceiling for throughput). In some cases, the different antennas (e.g., the R1, R2, and R3 antennas) may have different performance metrics, for example, each of the antennas of the communications satellite may have a different respective power gain. For example, the power gain for each of the antennas may be inversely proportional to a geographic size of the corresponding coverage area that the antenna services. That is, R2 and/or R3 antennas may have substantially higher associated power gains, for example, as compared to the R1 antenna which may provide communications services to the first coverage area (which may be, e.g., a large region up to the entirety of the visible Earth). The power gain for each of the antennas may correlate with a data rate, and thus throughput, that the antenna may provide for devices of its respective coverage area.

Accordingly, the communications satellite may be configured for a new operating mode or pattern of operating modes in a way that seeks to optimize a throughput for devices of each of the coverage areas for which the communications satellite provides services. In some cases, the new operating mode or pattern of operating modes may be determined (e.g., according to an algorithm at the controller) to maximize throughput to devices of each in the first coverage area, the second coverage area, and the third coverage area, based on, for example, a demand for services from each of the coverage areas, a power gain (and/or other performance metrics) associated with the antennas corresponding to each of the coverage areas, fixed and/or dynamic interference conditions (e.g., weather and environmental conditions, a location of the communications satellite, etc.), and the like.

For example, to optimize throughput, the antennas having the highest gain (e.g., R2 and R3) may be positioned to illuminate coverage areas with higher densities of user terminals. In some cases, lower gain antennas (e.g., the R1 antenna for the first coverage area) may be able to provide services to devices that the remaining antennas of the communications satellite cannot, and thus the communications satellite may service these devices using the R1 antenna while using the higher gain R2 and/or R3 antennas to provide services at a higher gain to the more densely populated regions within the antenna's respective coverage area. Accordingly, the controller may determine operating modes or a corresponding pattern of operating modes based on the physical capabilities of the communications satellite.

Likewise, the communications satellite may adjust one or more time durations (e.g., a ratio between multiple durations) that the communications satellite is to operate in one or more corresponding operating modes. For example, return link services may provide comparatively small amounts of throughput, and thus, in some cases (e.g., situations of high demand), the communications satellite may allocate a relatively small proportion of time (e.g., number of slots of a frame) for operating modes that provide return link services as compared to operating modes that provide substantially greater throughput via forward link services. By balancing the performance characteristics of each of its respective antennas, the demand for services for each of the antennas' corresponding coverage areas, physical parameters (orientation, population destination, trajectory, etc.), and the other like parameters discussed herein, the pattern of operating modes (e.g., including operating mode, order, and duration) may be selected to efficiently provide communications services to devices located in its serviced coverage areas.

Figure 4:
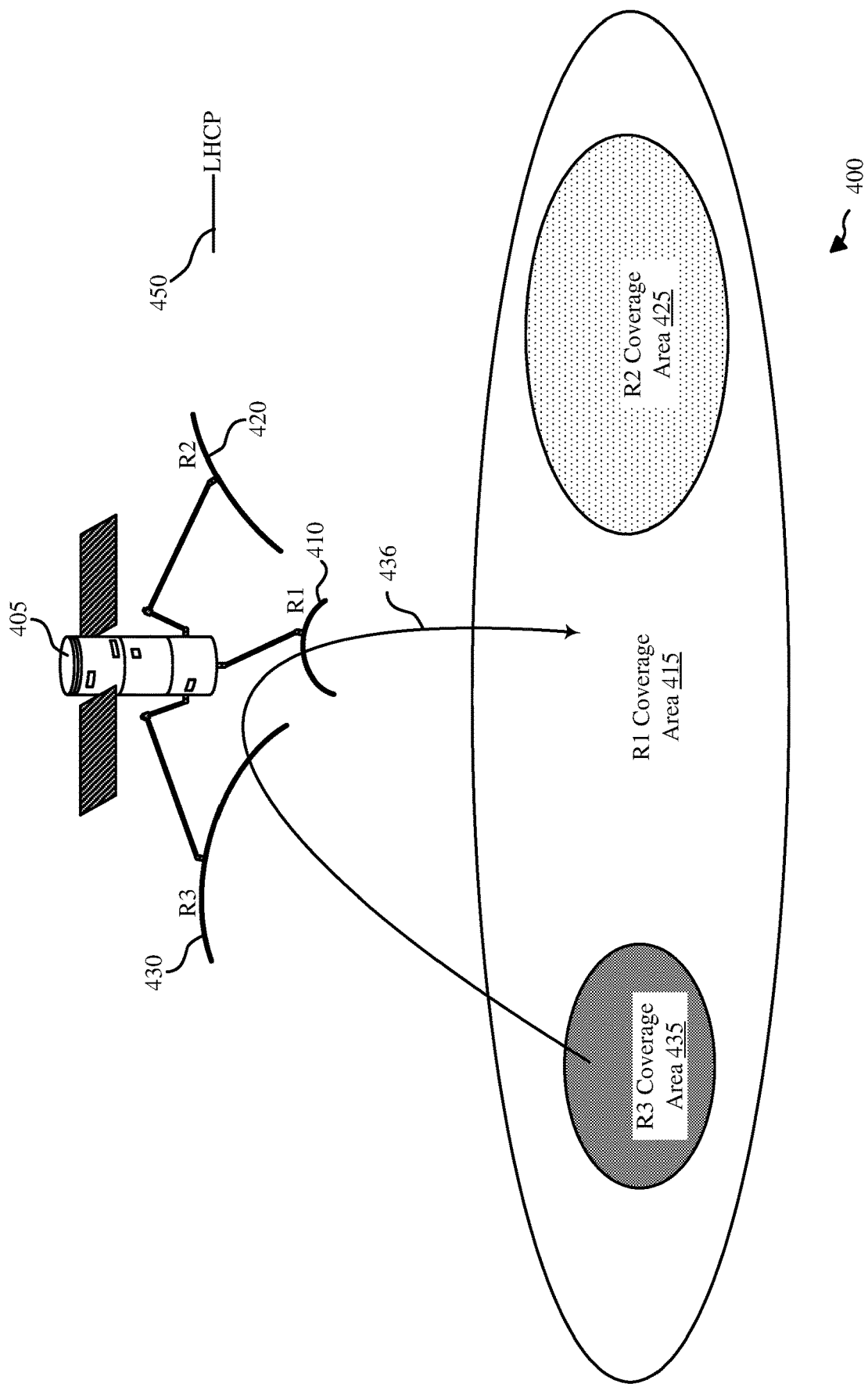
FIGS. 4-10 illustrate satellite communications system configurations that support switching between operating modes of beamforming systems and satellites in accordance with aspects of the present disclosure.

FIG. 4 illustrates a satellite communications system configuration 400 that supports switching between operating modes of beamforming systems and satellites in accordance with aspects of the present disclosure. In some examples, the satellite communications system configuration 400 may implement aspects of the satellite communications systems described with reference to FIGS. 1 through 3. The satellite communications system configuration 400 may use a number of network architectures including a space segment and a ground segment. The space segment may include a communications satellite 405, which may be an example of a communications satellite 105 as described with reference to FIGS. 1 through 3. The ground segment may include a number of user terminals and a number of access node terminals (including, e.g., one or more gateways), which may be examples of the respective devices as described with reference to FIGS. 1 through 3. The example satellite communications system configuration 400 of FIG. 4 illustrates example communication links and procedures for the communications satellite 405 to operate according to a first operating mode, for example, operating mode "A0" as described with reference to FIG. 3. The "A0" operating mode provides a first forward link configuration 311 "A" without a return link configuration.

The communications satellite 405 is illustrated with three antennas for providing communications services to devices of up to three respective coverage areas via signals transmitted and received over beamformed communication links for the respective coverage areas. For example, the communications satellite 405 may include a first antenna 410 illuminating a first coverage area 415 (e.g., an R1 reflector corresponding to an R1 coverage area), a second antenna 420 illuminating a second coverage area 425 (e.g., an R2 reflector corresponding to an R2 coverage area), and a third antenna 430 illuminating a third coverage area 435 (e.g., an R3 reflector corresponding to an R3 coverage area). Each of the antennas may include a reflector and a feed array assembly (not shown), or may include a feed array assembly without a reflector (e.g., DRA).

While the example satellite communications system configuration 400 shows and describes the communications satellite 405 as including three antennas (e.g., reflectors) primarily for communications implementing end-to-end beamforming, in other contemplated implementations the satellite communications systems 400 may include any number of antennas for communicating with devices within any number of coverage areas and may similarly implement any other applicable communications schemes. In some examples, there may be some overlap between different coverage areas. For example, as shown in the example satellite communications system configuration 400, the first coverage area 415 fully overlaps the second coverage area 425 and the third coverage area 435. In other examples, the first coverage area 415 may overlap with only one in the second coverage area 425 or the third coverage area 435. Additionally, in other examples, the first coverage area 415 may partially overlap with the second coverage area 425 and/or the third coverage area 435 (e.g., the second coverage area 425 and/or the third coverage area 435 may be partially within the first coverage area 415 and partially not covered by the first coverage area 415).

According to the first operating mode shown in FIG. 4 (e.g., operating mode "A0"), the communications satellite 405 may provide forward link communications services to devices located in the first coverage area 415 that may be served by devices (e.g., access node terminals) located in the third coverage area 435. For example, using a forward link 436, the communications satellite 405 may receive forward uplink signals from devices (e.g., access node terminals) in the third coverage area 435 via the R3 antenna 430 and relay corresponding forward downlink signals to devices (e.g., user terminals) in the first coverage area 415 via the R1 antenna 410. The example satellite communications system configuration 400 also shows that the communications satellite 405 includes the second antenna 420 associated with the second coverage area 425, but, in some cases, the second antenna 420 may not be used in the first operating mode. Accordingly, when operating according to the first operating mode, the communications satellite 405 may not provide communications services to portions in the second coverage area 425 not overlapping with the first coverage area 415.

As shown in the example satellite communications system configuration 400 of FIG. 4, signals communicated over the forward link 436 may be polarized using a first polarization 450, here being LHCP. Accordingly, antennas of transmitting devices (e.g., access node terminals) may apply LHCP polarization to transmit signals over the forward link 436, and antennas of receiving devices (e.g., user terminals) may similarly use the LHCP polarization to receive the polarized signals over the forward link 436. Likewise, respective receive and transmit ports of the communications satellite 405 may be configured for LHCP to substantially relay only the LHCP-polarized signals and not relay, for example, RHCP-polarized signals, so that the communications satellite 405 appropriately relays the polarized signals transmitted from the access node terminals. While the use of circular polarizations is described herein, other polarizations may be similarly implemented using like polarization techniques (e.g., using one or more polarizations selected from sets of polarizations that have mutual orthogonality).

Devices in a serviced coverage area and the communications satellite 405 may use a first frequency band to communicate uplink signals and may use a second frequency band to communicate downlink signals. In some examples, the first frequency band for the uplink signals and the second frequency band for the downlink signals may occupy non-overlapping sets of frequency resources. For example, uplink signals may be communicated using a frequency range around the 30 GHz spectrum and downlink signals may be communicated using a frequency range around the 20 GHz spectrum. Accordingly, in some cases, uplink and downlink signals may be communicated concurrently (e.g., over overlapping or partially overlapping time domain resources). In such cases, the communications satellite 405 may be configured to receive uplink signals at 30 GHz via R3, perform signal processing to convert the signals to 20 GHz, and transmit downlink signals via R1 at 20 GHz. This 30 GHz and GHz uplink-downlink pairing, however, is only one example implementation. In other implementations, the satellite communications system configuration 400 may be configured with uplink-downlink pairings of, for example, 50 GHz and 40 GHz, 14 and 12 GHz (e.g., Ku band), V band spectrums, and any other like pairing of radio frequency spectrum bands. Likewise, in some implementations, uplink signals may be configured to use a frequency band having a higher frequency and downlink signals may be configured to use a frequency band having a lower frequency, but the opposite convention may also be implemented.

As similarly described herein, the first operating mode shows the "A0" operating mode. As illustrated in FIG. 4, and as similarly described with reference to FIG. 3, the "0" of the "A0" operating mode label indicates that the first operating mode does not include a return link configuration. Operating modes "A1," "A2," and "A3," as discussed below with reference to FIGS. 5 through 7, for example, provide return link configurations in combination with the first forward link configuration "A" shown and described here in FIG. 4.

Figure 5:
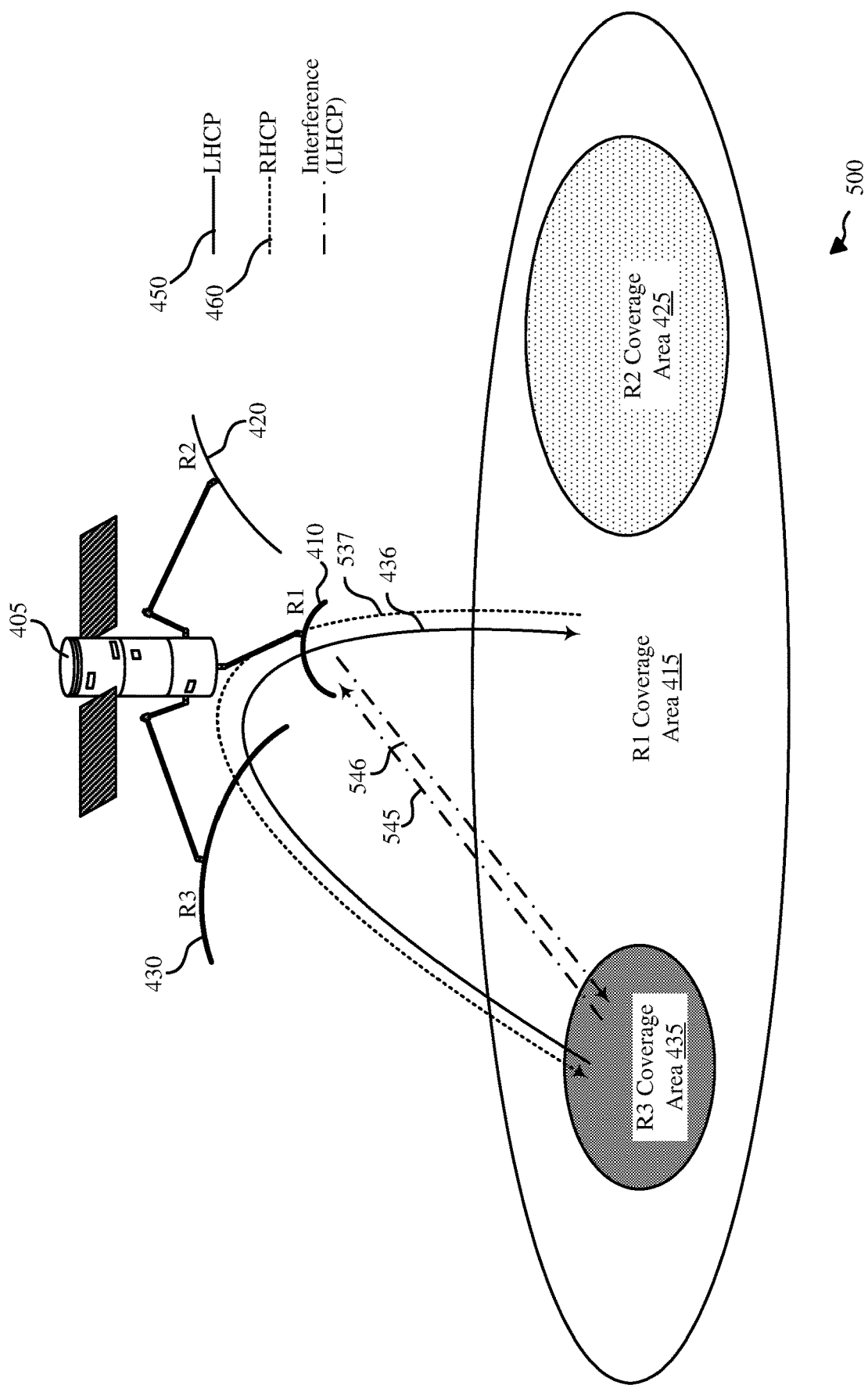

FIG. 5 illustrates a satellite communications system configuration 500 that supports switching between operating modes of beamforming systems and satellites in accordance with aspects of the present disclosure. The example satellite communications system configuration 500 of FIG. 5 illustrates example communication links and procedures for the communications satellite 405 to operate according to a second operating mode, for example, operating mode "A1," as referenced in the table of FIG. 3. The "A1" operating mode provides a first return link configuration 321 "1" in combination with the first forward link configuration 311 "A," as is described with reference to FIG. 4.

According to the second operating mode shown in FIG. 5 (e.g., operating mode "A1"), the communications satellite 405 may provide forward link communications services to devices located in the first coverage area 415 that may be served by devices (e.g., access node terminals) located in the third coverage area 435 via a forward link 436, as similarly described with reference to FIG. 4 (e.g., according to the first forward link configuration "A").

Additionally, according to the second operating mode, the communications satellite 405 may relay return link signals between the first coverage area 415 and the third coverage area 435. Thus, return link communications services may be provided to devices (e.g., user terminals) located in the first coverage area 415 via access node terminals located in the third coverage area 435 (e.g., according to the first return link configuration 321 "1") using a second polarization 460 (e.g., RHCP). For example, to establish a return link 537, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430. Accordingly, antennas of transmitting devices (e.g., user terminals) may apply RHCP polarization to transmit signals over the return link 537, and antennas of receiving devices (e.g., access node terminals) may use RHCP polarization to receive the polarized signals over the return link 537.

The example satellite communications system configuration 500 of FIG. 5 also shows both forward link interference 545 and noise and intermodulation components (IMs) 546, either or both of which may potentially degrade a signal quality of signals communicated in the third coverage area 435 via communications satellite 405. For example, devices in the third coverage area 435 may receive signals on the return link 537 using time-frequency resources that may at least partially overlap with time-frequency resources in the third coverage are 435 of the forward link 436. Additionally, because the first coverage area 415 may overlap with the third coverage area 435, the resources for the forward link 436 may also spatially overlap with the resources for the return link 537. Thus, forward link interference 545 may exist, which may decrease a signal quality for communications with the devices in the third coverage area 435. As shown for the second operating mode, however, the forward link 436 and the return link 537 may use orthogonal polarizations, for example, providing polarization diversity (e.g., of −22 dB). Accordingly, the forward link interference 545 may not be substantially increased relative to other operating modes and/or a benchmark level of interference (as similarly indicated by the table described with reference to FIG. 3). The benchmark level of interference may correspond, for example, to a satellite communications system configuration where the third coverage area 435 (e.g., having the access node terminals) is non-overlapping with the first coverage area 415.

Additionally, the noise and IMs 546 may cause a relatively small amount of degradation for the return link 537 based on the forward link 436 (e.g., −15 dBc). Thus, even beamforming of beams on forward link 436 within the third coverage area 435 may not cause substantial interference. Taken together, the impact on link performance from the forward link interference 545 and the noise and IMs 546 for the second operating mode may be relatively minor (e.g., substantially negligible relative to a benchmark). While techniques may be implemented to mitigate some of the signal quality degradation, as described herein, such techniques (e.g., not directing beamformed forward link beams within the third coverage area 435 and/or various interference cancellation techniques) may be relatively unnecessary given the relatively low levels of interference and degradation in this example.

Figure 6:
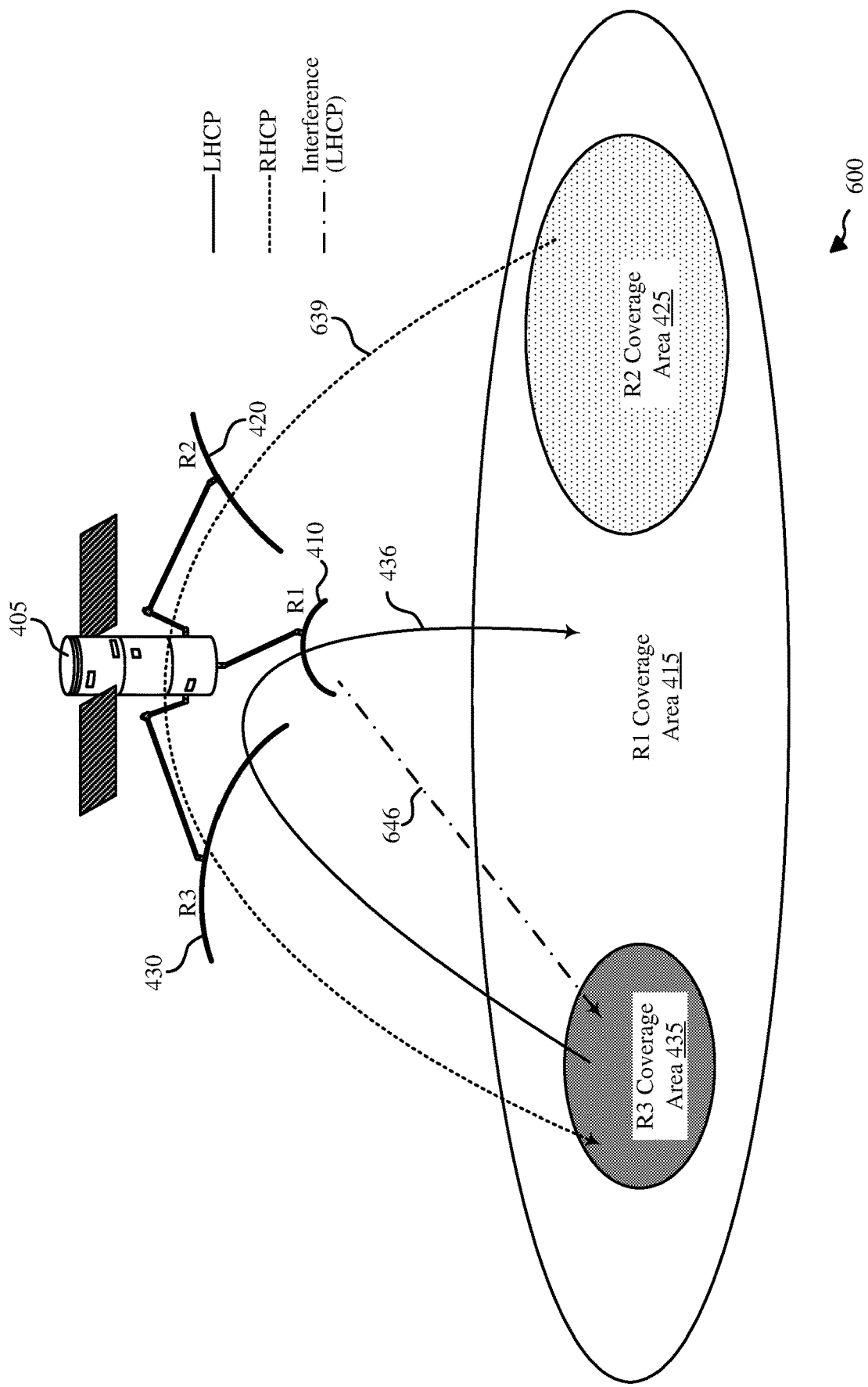

FIG. 6 illustrates a satellite communications system configuration 600 that supports switching between operating modes of beamforming systems and satellites in accordance with aspects of the present disclosure. The example satellite communications system configuration 600 of FIG. 6 illustrates example communication links and procedures for the communications satellite 405 to operate according to a third operating mode, for example, operating mode "A2," as referenced in the table of FIG. 3. The "A2" operating mode provides a second return link configuration 322 "2" in combination with the first forward link configuration 311 "A," as is described with reference to FIG. 4.

According to the third operating mode shown in FIG. 6 (e.g., operating mode "A2"), the communications satellite 405 may provide forward link communications services to devices located in the first coverage area 415 that may be served by devices (e.g., access node terminals) located in the third coverage area 435 via a forward link 436, as similarly described with reference to FIG. 4 (e.g., according to the first forward link configuration "A").

Additionally, according to the third operating mode, the communications satellite 405 may relay return link signals between the second coverage area 425 and the third coverage area 435. Thus, return link communications services may be provided to devices located in the second coverage area 425 via access node terminals located in the third coverage area 435 (e.g., according to the second return link configuration 322 "2"). For example, to establish a return link 639, the communications satellite 405 may receive return RHCP uplink signals from devices (e.g., user terminals) in the second coverage area 425 via the R2 antenna 420 and relay corresponding RHCP return downlink signals via to devices (e.g., access node terminals) in the third coverage area 435 via the R3 antenna 430. Accordingly, antennas of transmitting devices (e.g., user terminals) may apply RHCP polarization to transmit signals over the return link 639, and antennas of receiving devices (e.g., access node terminals) may use RHCP polarization to receive the polarized signals over the return link 639.

The example satellite communications system configuration 600 of FIG. 6 also shows noise and IMs 646, which may cause a relatively small amount of degradation for the return link 639 based on the forward link 436 (e.g., −15 dBc). Thus, even beamforming of beams on the forward link 436 within the third coverage area 435 may not cause substantial interference. As shown for the third operating mode, the forward link 436 and the return link 639 may use orthogonal polarizations, for example, providing polarization diversity (e.g., of −22 dB). Accordingly, forward link interference may not be substantially increased relative to other operating modes and/or a benchmark level of interference (as similarly indicated by the table described with reference to FIG. 3). While techniques may be implemented to mitigate some of the signal quality degradation, as described herein, such techniques (e.g., not directing beamformed forward link beams within the third coverage area 435, interference cancellation) may be relatively unnecessary given the relatively low levels of interference and degradation in this example.

Figure 7:
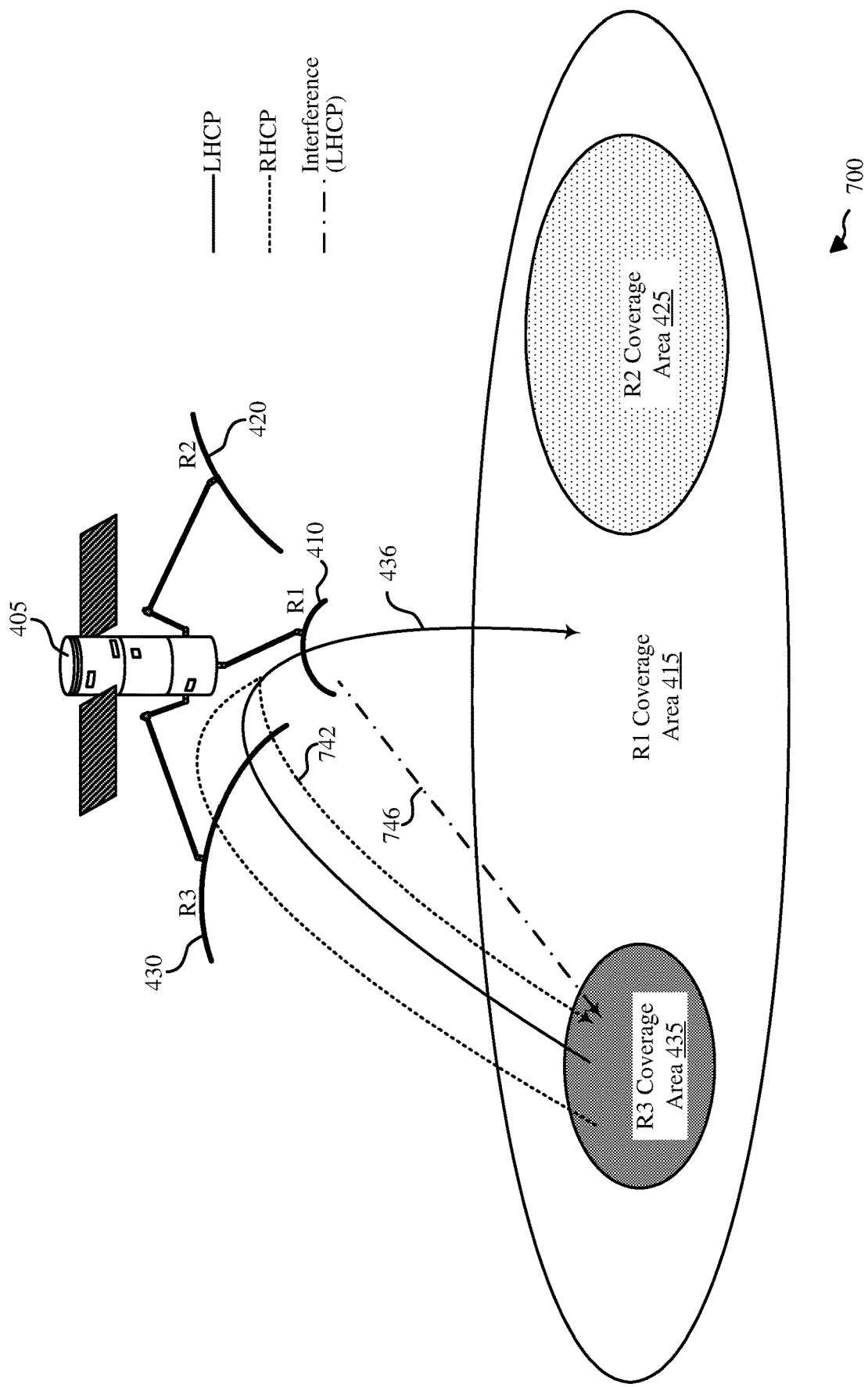

FIG. 7 illustrates a satellite communications system configuration 700 that supports switching between operating modes of beamforming systems and satellites in accordance with aspects of the present disclosure. The example satellite communications system configuration 700 of FIG. 7 illustrates example communication links and procedures for the communications satellite 405 to operate according to a fourth operating mode, for example, operating mode "A3," as referenced in the table of FIG. 3. The "A3" operating mode provides a third return link configuration 323 "3" in combination with the first forward link configuration 311 "A," as is described with reference to FIG. 4.

According to the fourth operating mode shown in FIG. 7 (e.g., operating mode "A3"), the communications satellite 405 may provide forward link communications services to devices located in the first coverage area 415 that may be served by devices (e.g., access node terminals) located in the third coverage area 435 via a forward link 436, as similarly described with reference to FIG. 4 (e.g., according to the first forward link configuration 311 "A").

Additionally, according to the fourth operating mode, the communications satellite 405 may relay return link signals between devices of the third coverage area 435 and other devices of the third coverage area 435. Thus, return link communications services may be provided to devices (e.g., user terminals) located in the third coverage area 435 via access node terminals located in the third coverage area 435 (e.g., according to the third return link configuration 323 "3"). For example, to establish a return link 742, the communications satellite 405 may receive RHCP return uplink signals from devices (e.g., user terminals) in the third coverage area 435 via the R3 antenna 430 and relay corresponding RHCP return downlink signals to other devices (e.g., access node terminals) in the third coverage area 435 via the R3 antenna 430. Accordingly, antennas of transmitting devices (e.g., user terminals) may apply RHCP polarization to transmit signals over the return link 742, and antennas of receiving devices (e.g., access node terminals) may use RHCP polarization to receive the polarized signals over the return link 742.

The example satellite communications system configuration 700 of FIG. 7 also shows noise and IMs 746, which may cause a relatively small amount of degradation for the return link 742 based on the forward link 436 (e.g., −15 dBc). Thus, even beamforming of beams on forward link 436 within the third coverage area 435 may not cause substantial interference. As shown for the fourth operating mode, the forward link 436 and the return link 742 may use orthogonal polarizations, for example, providing polarization diversity (e.g., of −22 dB). Accordingly, forward link interference may not be substantially increased relative to other operating modes and/or a benchmark level of interference (as similarly indicated by the table described with reference to FIG. 3). While techniques may be implemented to mitigate some of the signal quality degradation, as described herein, such techniques (e.g., not directing beamformed forward link beams within the third coverage area 435, interference cancellation) may be relatively unnecessary given the relatively low levels of interference and degradation in this example.

The operating modes for the fourth forward link configuration 314 "D" are discussed next with reference to FIGS. 8 through 10 to exemplify an operating mode to which the communications satellite 405 may switch, for example, from an operating mode using the first forward link configuration 311 "A." The "D" forward link configurations provide analogous forward and return link communications services to the operating modes for the "A" forward link configurations (e.g., the "A0," "A1," and "A2," operating modes) provide forward and return link communications services to the same respective coverage areas as the "D0," "D1," and "D2," operating modes). However, whereas the "A" operating modes provide forward link services to devices in the first coverage area 415 via a single LHCP forward link, the "D" operating modes provide forward link services to devices in the first coverage area 415 via respective LHCP and RHCP dual polarization forward links.

Based on the difference in the forward link for the "A" operating modes and the "D" operating modes, the communications satellite 405 may determine (e.g. according to an instruction received from a controller) to switch to one or the other (e.g., from the other, from another operating mode, etc.) based on various considerations. For example, the dual polarization forward links of the "D" operating modes may provide roughly double the amount of spectrum for forward link communications via the R1 antenna as compared to the "A" operating modes using the single forward link. This may increase a potential data rate and thus throughput for forward link communications services to the devices in the first coverage area 415. That is, as shown in the table of FIG. 3, the communications satellite 405 may apply a greater power amplifier per feed when a single polarity is use for a single link, as compared to dual polarity. For example, the first forward link configuration 311 "A" may provide a power amplifier of 12.6 W, as compared to, for example, 6.0 W and 5.4 W using dual polarization for the "D" forward link configuration. The power spread over the greater bandwidth provided by the "D" forward link configurations may provide a greater information capacity (e.g., according to the Shannon—Hartley theorem) than the "A" forward link configurations. In some cases, however, the greater power amplification of the "A" forward link configurations may reduce power fluctuations, for example, relative to dual polarity modes, by using a greater proportion of the available power to transmit payload information (and, in some situations, e.g., when an amount of overhead is particularly high, this may result in the "A" operating modes providing a greater effective information capacity than the "D" operating modes).

Further, while the "D" operating modes may incur interference in using return links (e.g., as shown in the table of FIG. 3), these return link configurations are available to the "D" operating modes, nonetheless. The "A" operating modes, however, incur relatively less interference to use the same return link configurations (e.g., the substantially negligible interference described herein). Accordingly, as described herein, the communications satellite 405 may determine or be controlled to switch (e.g., dynamically) to use one of the "A" operating modes, for example, to provide higher reliability communications services for both forward link and return link services, while the communications satellite 405 may determine to use one of the "D" operating modes, for example, to provide a higher maximum data rate for forward link communications services with the devices in the first coverage area 415. The communications satellite 405 may perform analogous analyses and determinations for the rest of the operating modes described herein to determine and accordingly switch between operating modes.

Figure 8:
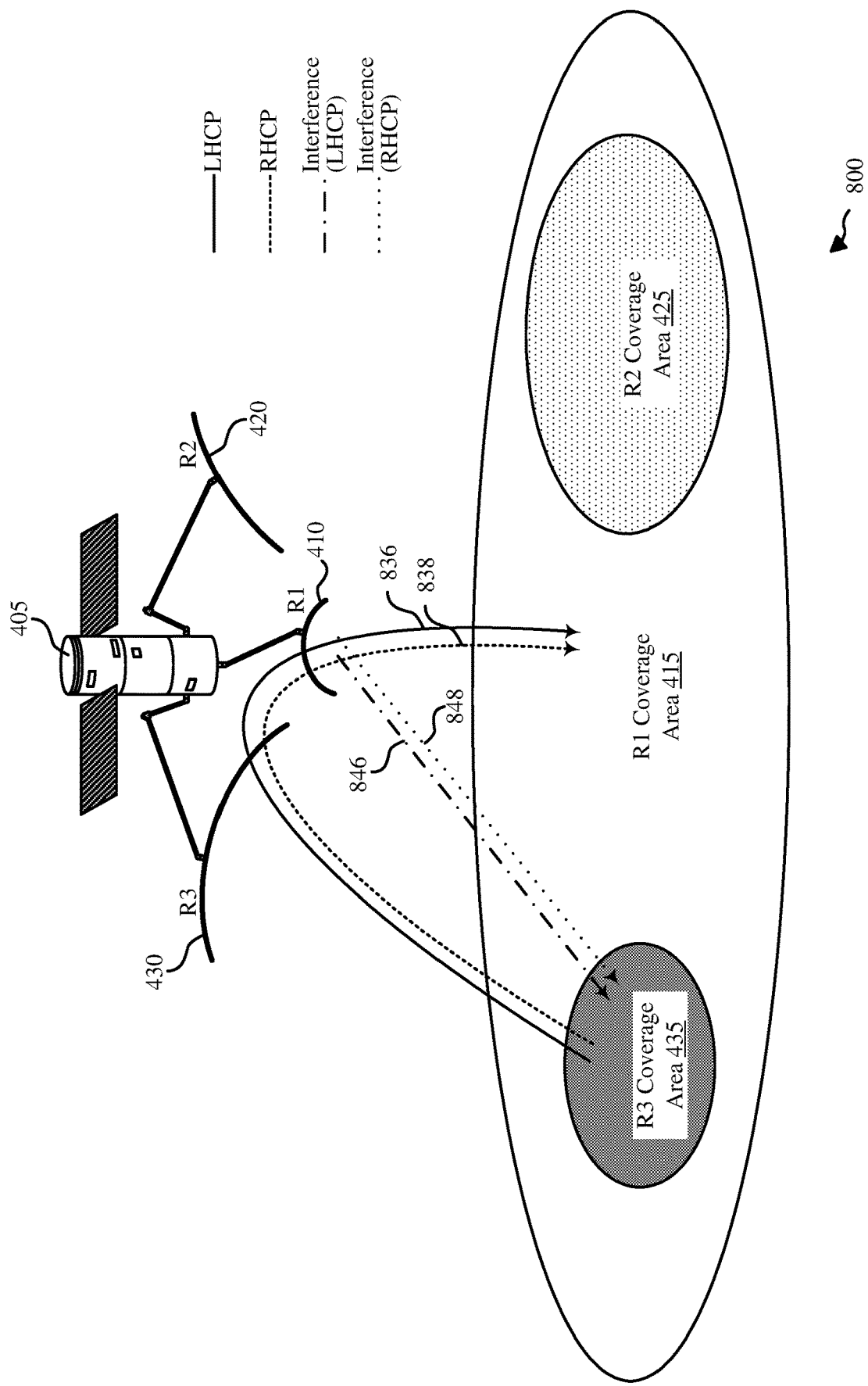

FIG. 8 illustrates a satellite communications system configuration 800 that supports switching between operating modes of beamforming systems and satellites in accordance with aspects of the present disclosure. The example satellite communications system configuration 800 of FIG. 8 illustrates example communication links and procedures for the communications satellite 405 to operate according to a fifth operating mode, for example, operating mode "D0" as described with reference to FIG. 3. The "D0" operating mode provides a fourth forward link configuration 314 "D" without a return link configuration.

According to the fifth operating mode shown in FIG. 8 (e.g., operating mode "D0"), the communications satellite 405 may provide forward link communications services to devices located in the first coverage area 415 that may be served by devices (e.g., access node terminals) located in the third coverage area 435 via forward links 836 and 838.

As shown in the example satellite communications system configuration 800 of FIG. 8, signals may be communicated between the devices in the third coverage area 435 and the first coverage area 415 using dual polarization. For example, signals communicated over the forward link 836 may be polarized using a first polarization, here being LHCP, and signals communicated over the forward link 838 may be polarized using a second polarization, here being RHCP. Accordingly, antennas of transmitting devices (e.g., access node terminals) may apply LHCP polarization to transmit signals over the forward link 836, and antennas of respective receiving devices (e.g., user terminals) may similarly use the LHCP polarization to receive the polarized signals over the forward link 836. Similarly, antennas of transmitting devices may apply RHCP polarization to transmit signals over the forward link 838, and antennas of respective receiving devices may use RHCP polarization to receive the polarized signals over the forward link 838. Likewise, respective receive and transmit ports of the communications satellite 405 may be configured for LHCP or RHCP to substantially relay only the appropriately polarized signals so that the communications satellite 405 appropriately relays the dual-polarized signals transmitted from the access node terminals. In this way, dual polarization may be used to communicate overlapping streams of data between the same respective coverage areas. While the use of circular polarizations is described herein, other polarizations may be similarly implemented using like polarization techniques (e.g., using one or more polarizations selected from sets of polarizations that have mutual orthogonality).

The example satellite communications system configuration 800 of FIG. 8 also shows noise and IMs 846 and 848, which may potentially degrade a signal quality of signals communicated in the third coverage area 435 via communications satellite 405. As shown for the fifth operating mode, the forward link 836 and the forward link 838 may use orthogonal polarizations, for example, providing polarization diversity. Accordingly, forward link interference may not be substantially increased relative to other operating modes and/or a benchmark level of interference.

As similarly described herein, the fifth operating mode shows the "D0" operating mode. As illustrated in FIG. 8, and as similarly described with reference to FIG. 3, the "0" of the "D0" operating mode label indicates that the fifth operating mode does not include a return link configuration. Operating modes "D1" and "D2," as discussed below with reference to FIGS. 9 and 10, for example, provide return link configurations in combination with the fourth forward link configuration 314 "D" shown and described here in FIG. 8.

Figure 9:
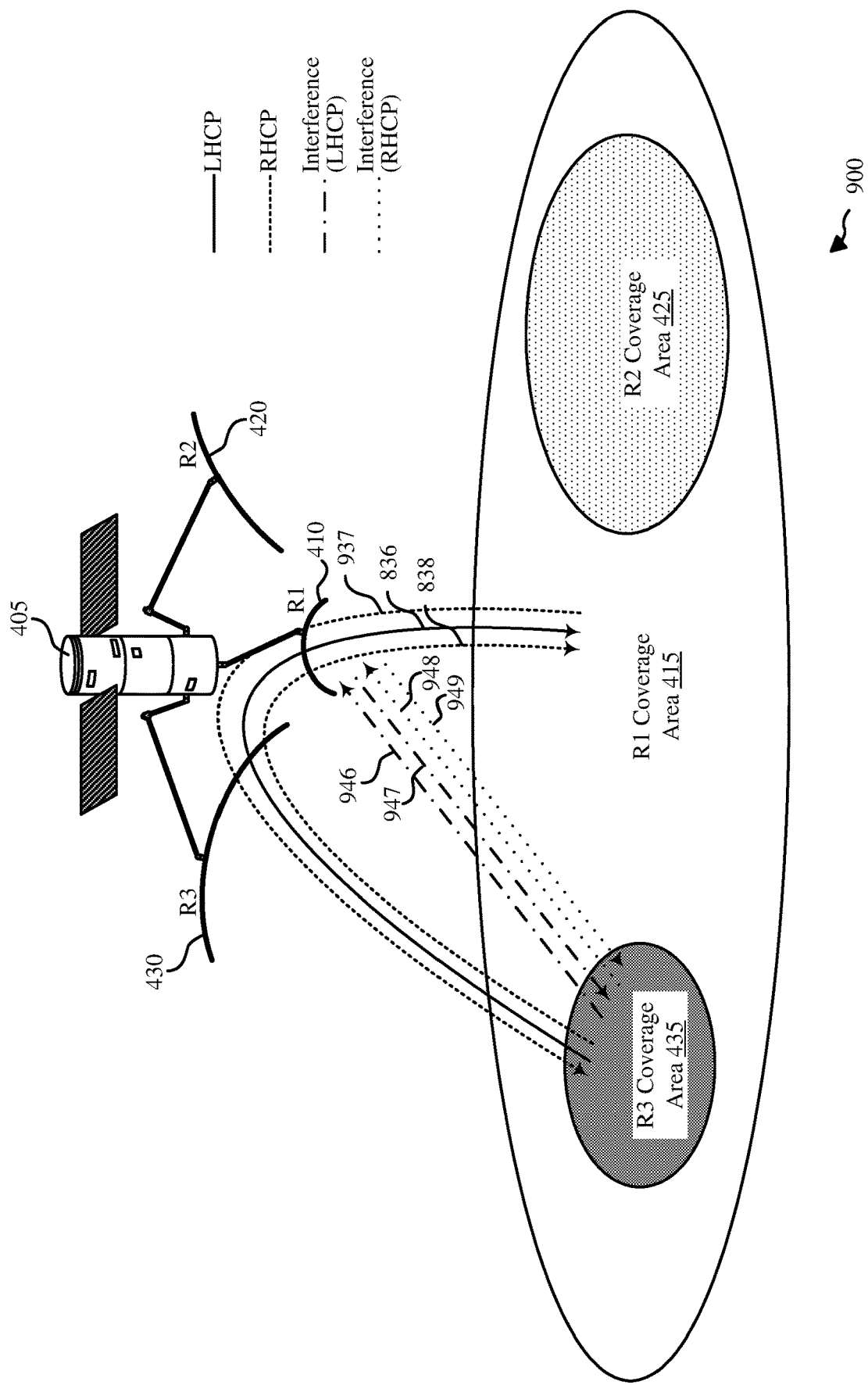

FIG. 9 illustrates a satellite communications system configuration 900 that supports switching between operating modes of beamforming systems and satellites in accordance with aspects of the present disclosure. The example satellite communications system configuration 900 of FIG. 9 illustrates example communication links and procedures for the communications satellite 405 to operate according to a sixth operating mode, for example, operating mode "D1," as referenced in the table of FIG. 3. The "D1" operating mode provides the first return link configuration 321 "1" in combination with the fourth forward link configuration 314 "D," as is described with reference to FIG. 8.

According to the sixth operating mode shown in FIG. 9 (e.g., operating mode "D1"), the communications satellite 405 may provide forward link communications services to devices located in the first coverage area 415 that may be served by devices (e.g., access node terminals) located in the third coverage area 435 via forward links 836 and 838, as similarly described with reference to FIG. 8 (e.g., according to the fourth forward link configuration 314 "D").

Additionally, according to the sixth operating mode, the communications satellite 405 may relay return link signals between the first coverage area 415 and the third coverage area 435. Thus, return link communications services to may be provided devices (e.g., user terminals) located in the first coverage area 415 via access node terminals located in the third coverage area 435 (e.g., according to the first return link configuration 321 "1"). For example, to establish a return link 937, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 937, and antennas of receiving devices (e.g., access node terminals) may use RHCP polarization to receive the polarized signals over the return link 937.

Accordingly, at the communications satellite 405, signals may be communicated between the devices in the third coverage area 435 and the first coverage area 415 using dual polarization. For example, respective receive and transmit ports of the communications satellite 405 may each be configured for LHCP or RHCP to substantially relay the correspondingly polarized signals and so that the communications satellite 405 appropriately relays the dual-polarized signals. For the return link 937, respective receive and transmit ports of the communications satellite 405 may be configured for RHCP to substantially relay the RHCP-polarized signals and not relay, for example, LHCP-polarized signals. In this way, forward link and return link signals may be communicated between devices in the first coverage area 415 and devices in the third coverage area 435 via the communications satellite 405 using, for example, dual polarization and communications resources that may overlap in time and/or frequency. While the use of circular polarizations is described herein, other polarizations may be similarly implemented using like polarization techniques (e.g., using one or more polarizations selected from sets of polarizations that have mutual orthogonality).

The example satellite communications system configuration 900 of FIG. 9 also shows forward uplink interference 946 and forward downlink interference 947. For example, forward uplink interference 946 may represent interference between the uplink for forward link 836 and the uplink for return link 937, while forward downlink interference 947 may represent interference between the downlink for forward link 836 and the downlink for return link 937. However, because forward link 836 and return link 937 use orthogonal polarizations, forward uplink interference 946 and forward downlink interference 947 may not be substantially increased relative to other operating modes and/or a benchmark level of interference due to polarization diversity (e.g., of −22 dB). Thus, beamforming on forward link 836 may be performed even within third coverage area 435.

Forward uplink interference 948 may represent interference between the uplink for forward link 838 and the uplink for return link 937. Because forward link 836 and return link 937 do not use orthogonal polarizations and the third coverage area 435 is within the illumination area of R1, the uplink of forward link 836 may cause substantial interference to the uplink for return link 937 (e.g., 22 dB worse than if the third coverage area 435 is outside the illumination area of R1). Beamforming of receive beams for return link 937 may mitigate forward uplink interference 948, however the received power from forward uplink interference 948 at R1 may reduce the level of the signals for return link 937 and thus reduce the ability to fully mitigate the effects on return link 937.

Forward downlink interference 949 may represent interference between the downlink of forward link 838 and the downlink for return link 937 which do not use orthogonal polarizations. Forward downlink interference 949 may be reduced due to the lower gain of R1 relative to R3, but still may cause substantial interference if signal energy from the downlink of forward link 838 is present in the third coverage area 435. Beamforming of the forward link 838 may be used to mitigate forward downlink interference 949 (e.g., nulling signal energy from forward link 838 within the third coverage area 435). Additionally or alternatively, an MCS and/or a coding rate for the forward link 838 or return link 937 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

In some cases, a portion of the noise and IMs 946 and 948 (e.g., in particular, certain intermodulation frequencies) may be the result of self-interference. For example, parasitic couplings between components of the antennas and transponders may cause self-interference that may degrade corresponding communications. In such cases, self-interference cancellation (SIC) procedures may be employed to cancel this self-interference (e.g., the self-interference can be identified and mitigated through active procedures or through fixed hardware).

In some cases, however, alternatively to implementing interference mitigation techniques, the communications satellite 405 may instead switch to a different operating mode. For example, according to the sixth operating mode "D1" as shown and described here in FIG. 9, the communications satellite 405 may provide forward and return link communications services to devices located in the first coverage area 415. Accordingly, rather than performing specific interference mitigation and/or interference cancellation techniques, the communications satellite 405 may instead determine (e.g. according to an instruction received from a controller) to switch to a new operating mode, for example, the second operating mode "A1," as described with reference to FIG. 5. That is, the second operating mode "A1" may also provide forward and return link services to devices located in the first coverage area, but may be less susceptible to performance loss due to interference, for example, as may occur for the sixth operating mode "D1." The second operating mode "A1" may, however, provide a slightly reduced maximum data rate as compared to the sixth operating mode "D1." Similarly, if, for example, demand for return link communications services is relatively low, the controller may determine to switch to an operating mode with a higher forward link data rate and lower interference, but which may not provide return link services (e.g., for devices in the third coverage area 435 and/or based on demand from the first coverage area 415 and/or the second coverage area 425). Accordingly, the controller may dynamically determine, based on the interference, as well as the other metrics and criteria discussed herein, to switch to another operating mode for circumstances in which another operating mode may be better suited.

While described here with reference to the satellite communications system configuration 900 of FIG. 9, aspects of these interference mitigation, cancellation, and avoidance techniques may be employed for any of the operating modes as described herein.

Figure 10:
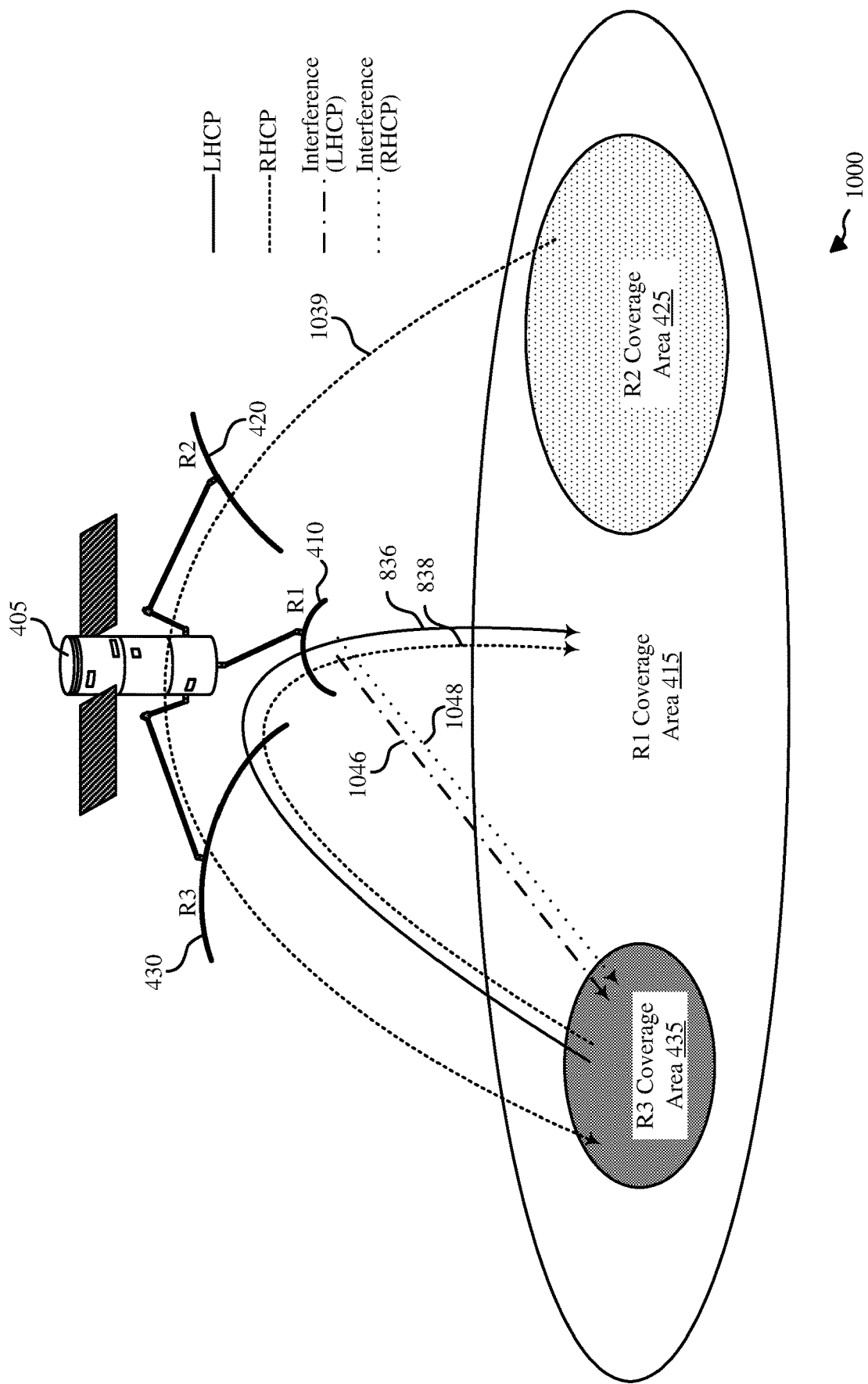

FIG. 10 illustrates a satellite communications system configuration 1000 that supports switching between operating modes of beamforming systems and satellites in accordance with aspects of the present disclosure. The example satellite communications system configuration 1000 of FIG. 10 illustrates example communication links and procedures for the communications satellite 405 to operate according to a seventh operating mode, for example, operating mode "D2," as referenced in the table of FIG. 3. The "D2" operating mode provides the second return link configuration 322 "2" in combination with the fourth forward link configuration 314 "D," as is described with reference to FIG. 8.

According to the seventh operating mode shown in FIG. 10 (e.g., operating mode "D2"), the communications satellite 405 may provide forward link communications services to devices located in the first coverage area 415 that may be served by devices (e.g., access node terminals) located in the third coverage area 435 via forward links 836 and 838, as similarly described with reference to FIG. 8 (e.g., according to the fourth forward link configuration 314 "D").

Additionally, according to the seventh operating mode, the communications satellite 405 may relay RHCP return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 1039, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 1039, and antennas of receiving devices (e.g., access node terminals) may use RHCP polarization to receive the polarized signals over the return link 1039.

The example satellite communications system configuration 1000 of FIG. 10 also shows forward downlink interference 1046 and forward downlink interference 1048. Forward downlink interference 1046 may represent interference between the downlink for forward link 836 and the downlink for return link 1039, while forward downlink interference 1048 may represent interference between the downlink for forward link 838 and the downlink for return link 1039. Because forward link 836 and return link 1039 use orthogonal polarizations, forward downlink interference 1046 may not be substantially increased relative to other operating modes and/or a benchmark level of interference due to polarization diversity (e.g., of −22 dB). Thus, beamforming on forward link 836 may be performed even within third coverage area 435.

Forward downlink interference 1048 may represent interference between the downlink of forward link 838 and the downlink for return link 1039 which do not use orthogonal polarizations. Forward downlink interference 1048 may be reduced due to the lower gain of R1 relative to R3, but still may cause substantial interference if signal energy from the downlink of forward link 838 is present in the third coverage area 435. Beamforming of the forward link 838 may be used to mitigate forward downlink interference 1048 (e.g., nulling signal energy from forward link 838 within the third coverage area 435). Additionally or alternatively, an MCS and/or a coding rate for the forward link 838 or return link 1048 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

Figure 11:
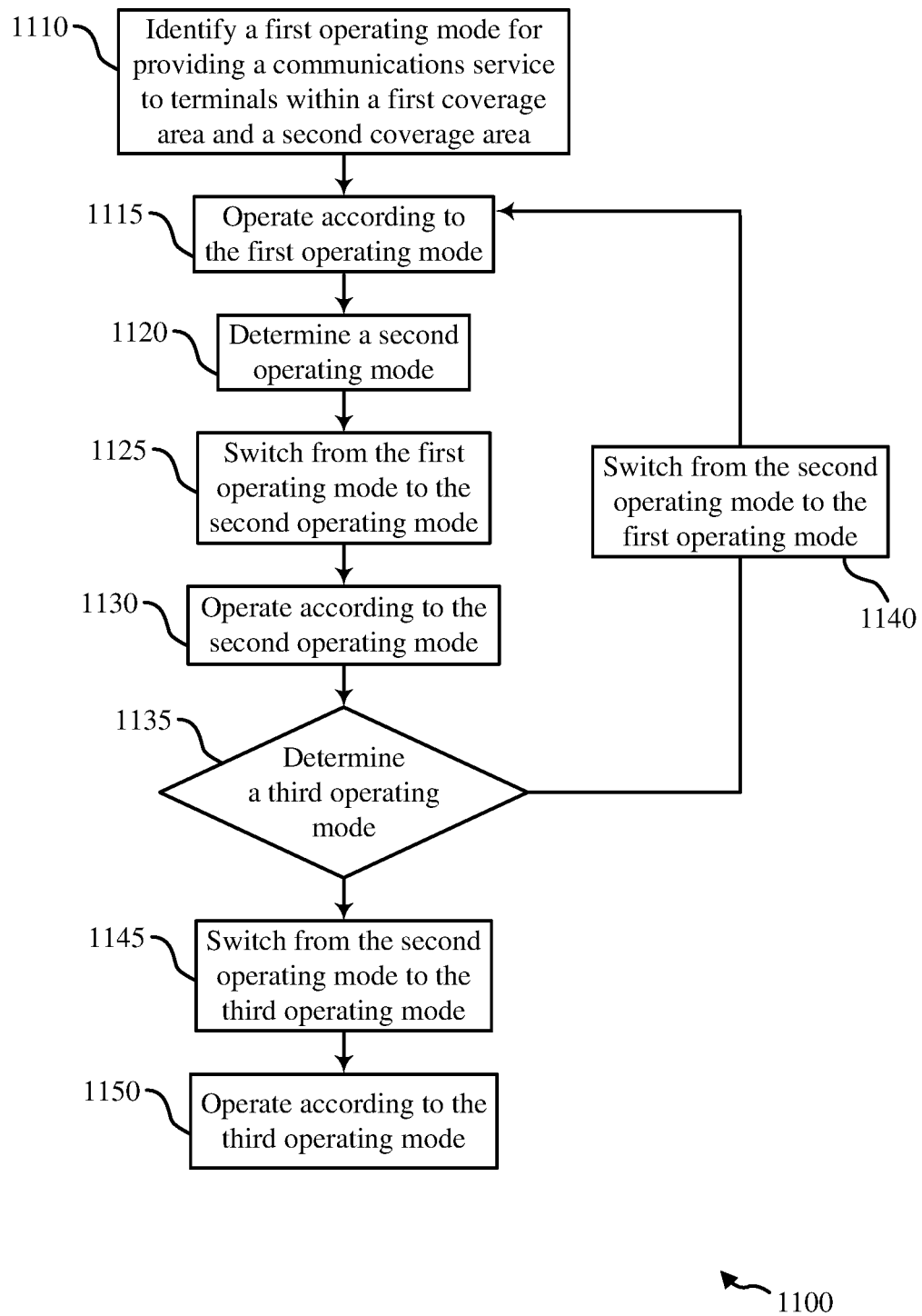
FIG. 11 illustrates an example of a process flow that supports switching between operating modes of beamforming systems and satellites in accordance with aspects of the present disclosure.

FIG. 11 illustrates an example of a process flow 1100 that supports switching between operating modes of beamforming systems and satellites in accordance with aspects of the present disclosure. In some examples, the process flow 1100 may be implemented by aspects of the satellite communications systems, as described with reference to FIGS. 1 through 10. The process flow 1100 may be performed by a controller 175, and may include determining operating modes for a communications satellite as described with reference to FIGS. 1 through 10. Alternative examples of the following may be implemented, where some steps are performed in a different order than described or are not performed at all. In some examples, steps may include additional features not mentioned below, or further steps may be added.

At 1110, the controller may determine a first operating mode for a communications satellite from a set of operating modes for providing communications services to terminals within a service area that includes a first coverage area associated with a first antenna of the communications satellite (e.g., the R1 coverage area associated with the R1 antenna) and a second coverage area associated with a second antenna of the set of antennas (e.g., the R3 coverage area associated with the R3 antenna). In some cases, the second coverage area may include at least one access node terminal (e.g., gateway) for providing the communications services via the communications satellite. In some cases, the second coverage area may at least partially overlap with the first coverage area.

The first operating mode may correspond to a first configuration of respective polarizations with at least one of the set of antennas for receiving signals of each of the respective polarizations and at least one of the set of antennas for transmitting signals of each of the respective polarizations. As an illustrative example for the process flow 1100, the first operating mode may correspond to a configuration (e.g., including a first forward link configuration) of the communications satellite according to a "D" operating mode, for example, as described herein with reference to FIGS. 8 through 10.

At 1115, the communications satellite may operate according to the first operating mode. For example, in the illustrative example in which the first operating mode is the "D" operating mode (e.g., "D" being the first forward link configuration), the communications satellite may use the R3 antenna to receive forward uplink signals from access node terminals in the R3 coverage area using LHCP and RHCP polarizations, and the communications satellite 405 may use the R1 antenna (to transmit forward downlink signals to user terminals in the R1 coverage area, also using the LHCP and RHCP polarizations. That is, the first configuration may associate each of the respective polarizations with the first antenna for receiving the each of the respective polarizations for a first link direction (e.g., the forward link) and the second antenna for transmitting the each of the respective polarizations for the first link direction.

At 1120, the controller may determine a second operating mode from the set of operating modes for providing the communications services for terminals of the service area, where the second operating mode corresponds to a second configuration of the respective polarizations with at least one of the set of antennas for receiving signals of each of the respective polarizations and at least one of the set of antennas for transmitting signals of each of the respective polarizations.

In some examples, the second operating mode may be different from the first configuration. For example, the communications satellite 405 may determine to switch to an operating mode that provides communications services to a different set of terminals, that differently allocates resources between terminals of different coverage areas, that increases a throughput for terminals in certain coverage areas, that has different interference characteristics (e.g., different tradeoffs between throughput and interference), and other like factors. In the illustrative example of the process flow 1100 shown in FIG. 11, the second operating mode and the second configuration may correspond to the "A" operating mode, for example, as described herein with reference to FIGS. 4 through 7. In this example, the "A" operating mode may correspond to a second forward link configuration used by the communications satellite 405.

In some cases, the communications satellite may operate according to the second operating mode for a certain duration, for example, a number of slots of a frame of a frame structure, for example, as described with reference to FIG. 2. In some examples, the controller may determine a number of slots of the frame structure for operating the communications satellite according to the second configuration. In other examples, the controller may determine a sequence including several operating modes and corresponding durations of numbers of slots for each of the operating modes in a sequence (e.g., a sequence of operating modes for slots of a frame structure). In some cases, the sequence may be configured or preconfigured to provide communications services according to certain known conditions.

At 1125, the communications satellite may be switched from the first operating mode to the second operating mode. For example, the communications satellite may switch from an operating mode using the "D" forward link configuration (e.g., using each polarization for the forward link direction) to an operating mode using the "A" forward link configuration (e.g., using a single polarization for the forward link direction). In a simple example, from "D0" to "A1" operating modes, the communications satellite may be switched from providing dual polarization in a forward link direction to the first coverage area to providing a single polarization in a forward link direction and a single polarization in a return link direction to the first coverage area. In alternative embodiments, the first operating mode and the second operating mode may each be any of the operating modes described herein.

Additionally or alternatively, the controller may identify a dynamic switching event for switching operating modes. For example, the controller may determine that a performance characteristic, such as a signal quality metric (e.g., SNR, SINR, EIRP, etc.), meets a corresponding threshold for performing such a switch. For example, the controller may determine that the signal quality metric has fallen beneath a desired signal quality target for a particular communication link (e.g., forward link, return link) in the first operating mode and may switch to the second operating mode, to improve the signal quality metric, which may result in more efficient communication links.

At 1130, the communications satellite may operate according to the second operating mode. For example, in the illustrative example in which the second operating mode is an "A" operating mode, the communications satellite 405 may use the R3 antenna (e.g., R3 reflector) to receive forward uplink signals from access node terminals in the third coverage area using LHCP polarization, and the communications satellite may use the R1 antenna (e.g., R1 reflector) to transmit forward downlink signals to user terminals in the R1 coverage area, also using the LHCP polarization.

At 1135, the controller may determine a third operating mode from the set of operating modes for providing the communications services for terminals of the service area, where the third operating mode corresponds to a third configuration of the respective polarizations with at least one of the set of antennas for receiving signals of each of the respective polarizations and at least one of the set of antennas for transmitting signals of each of the respective polarizations.

In some cases, the third operating mode may be the same as the first operating mode. For example, controller may determine to return to the first operating mode based on factors indicating that the first operating mode provides an improved allocation of resources for a set of user terminals. For example, the controller may determine to switch the communications satellite back to the first operating mode as shown at 1140.

Alternatively, the third operating mode may be different from both of the first operating mode and the second operating mode. For example, the third operating mode may be any of the remaining operating modes (e.g., "A" through "H" forward link configurations 310 and optionally a return link configuration 320), as described herein. For example, the third operating mode may be an "A" or a "D" forward link configuration using a different return link configuration 320 from the first operating mode and the second operating mode. Accordingly, at 1145, the controller may switch the communication satellite from the second operating mode to the third operating mode.

At 1150, the communications satellite 405 may operate according to the third operating mode. For example, in the illustrative example in which the third operating mode is the "D2" operating mode, the communications satellite 405 may, in the same manner as the first configuration (e.g., "D0"), use the R3 antenna (e.g., R3 reflector) to receive forward uplink signals from access node terminals using LHCP and RHCP polarization (e.g., dual polarization), and the communications satellite 405 may use the R1 antenna (e.g., R1 reflector) to transmit forward downlink signals to user terminals in the R1 coverage area, also using the LHCP/RHCP dual polarization.

Additionally, however, in the third operating mode the, the communications satellite 405 may operating using the "2" return link configuration. Accordingly, the communications satellite 405 may use the R3 antenna to receive return uplink signals from user terminals in the third coverage area and relay corresponding return downlink signals to the access node terminals in the R3 coverage area. In this example, the return link signals (e.g., the return uplink signals and the return downlink signals) may be communicated using the RHCP polarization (e.g., according to the "2" return link configuration, as described herein).

In some cases, the communications satellite may be operated according to the third operating mode for a certain duration, for example, according to a determined number of slots for operating in the third operating mode according to the frame structure (e.g., determined at 1135). In other examples, the communications satellite may be operated according to the third operating mode for a number of slots in a sequence of operating modes (e.g., for each of one or more frames), as may previously have been determined or configured.

Figure 12:
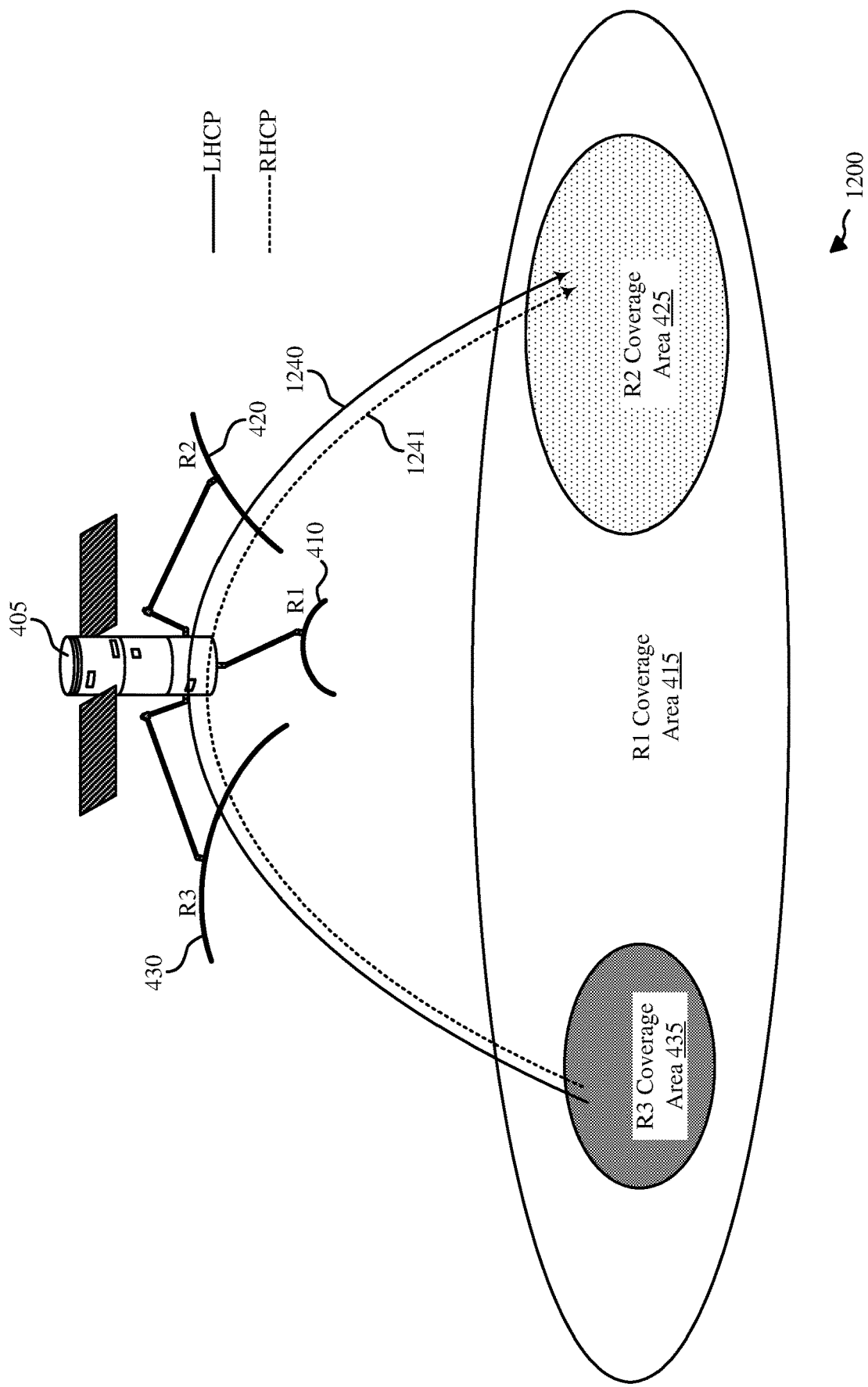
FIGS. 12-31 illustrate satellite communications system configurations that support switching between operating modes of beamforming systems and satellites in accordance with aspects of the present disclosure.

FIG. 12 illustrates a satellite communications system configuration 1200 that supports switching between operating modes of beamforming systems and satellites in accordance with aspects of the present disclosure. The example satellite communications system configuration 1200 of FIG. 12 illustrates example communication links and procedures for the communications satellite 405 to operate according to an eighth operating mode, for example, operating mode "B0" as described with reference to FIG. 3. The "B0" operating mode provides a second forward link configuration 312 "B" without a return link configuration.

According to the eighth operating mode shown in FIG. 12 (e.g., operating mode "B0"), the communications satellite 405 may provide forward link communications services to devices located in the second coverage area 425 that may be served by devices (e.g., access node terminals) located in the third coverage area 435 via forward links 1240 and 1241.

As shown in the example satellite communications system configuration 1200 of FIG. 12, signals may be communicated between the devices in the third coverage area 435 and the second coverage area 425 using dual polarization. For example, signals communicated over the forward link 1240 may be polarized using a first polarization, here being LHCP, and signals communicated over the forward link 1241 may be polarized using a second polarization, here being RHCP. Accordingly, antennas of transmitting devices (e.g., access node terminals) may apply LHCP polarization to transmit signals over the forward link 1240, and antennas of respective receiving devices (e.g., user terminals) may similarly use the LHCP polarization to receive the polarized signals over the forward link 1240. Similarly, antennas of transmitting devices (e.g., access node terminals) may apply RHCP polarization to transmit signals over the forward link 1241, and antennas of respective receiving devices (e.g., user terminals) may use RHCP polarization to receive the polarized signals over the forward link 1241.

As similarly described herein, the eighth operating mode shows the "B0" operating mode. As illustrated in FIG. 12, and as similarly described with reference to FIG. 3, the "0" of the "B0" operating mode label indicates that the eighth operating mode does not include a return link configuration. Operating modes "B 1," "B2," and "B3," as discussed below with reference to FIGS. 13 through 15, for example, provide return link configurations in combination with the second forward link configuration 312 "B" shown and described here in FIG. 12.

Figure 13:
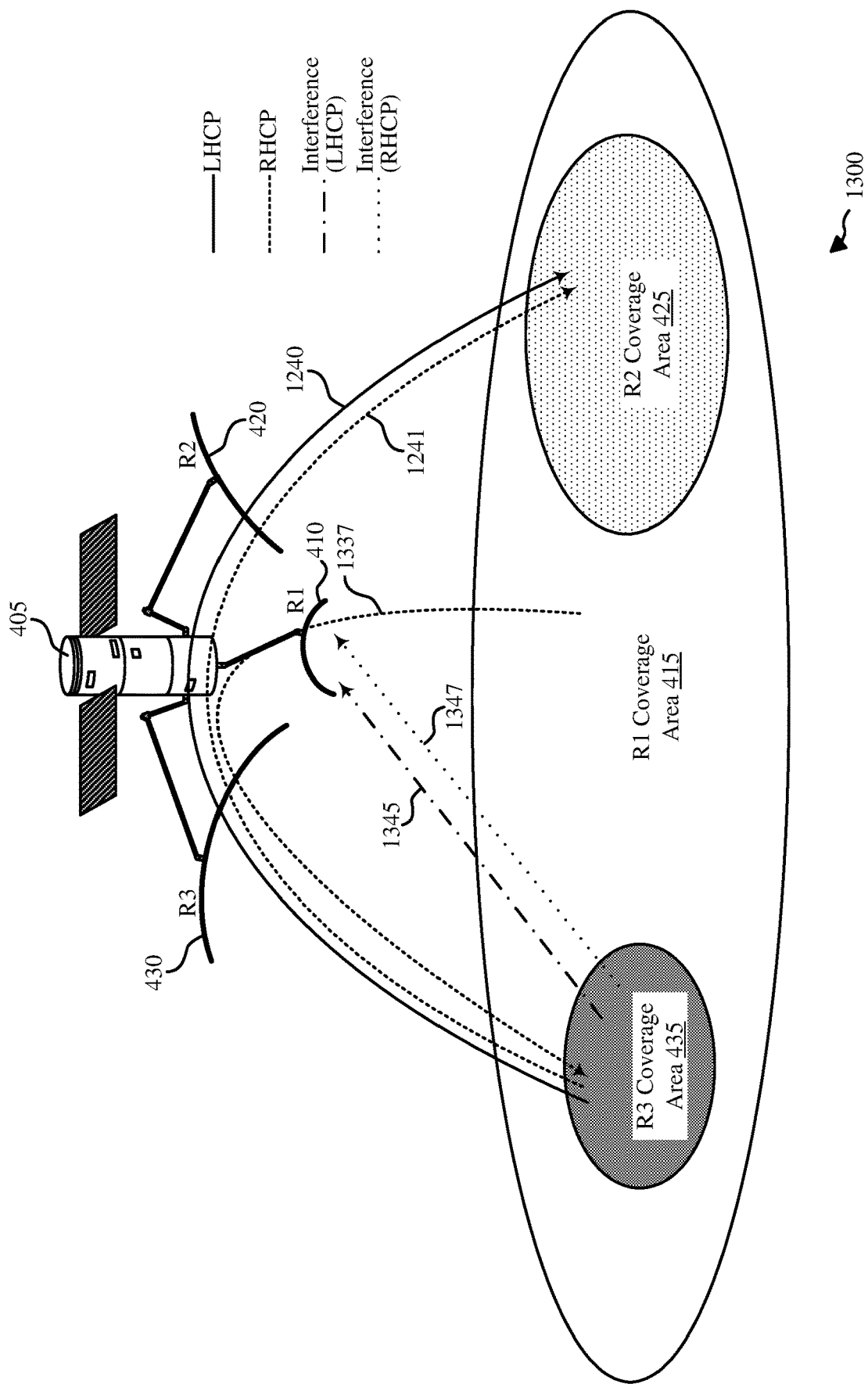

FIG. 13 illustrates a satellite communications system configuration 1300 that supports switching between operating modes of beamforming systems and satellites in accordance with aspects of the present disclosure. The example satellite communications system configuration 1300 of FIG. 13 illustrates example communication links and procedures for the communications satellite 405 to operate according to a ninth operating mode, for example, operating mode "B 1," as referenced in the table of FIG. 3. The "B 1" operating mode provides the first return link configuration 321 "1" in combination with the second forward link configuration 312 "B," as is described with reference to FIG. 12.

According to the ninth operating mode shown in FIG. 13 (e.g., operating mode "B 1"), the communications satellite 405 may provide forward link communications services to devices located in the second coverage area 425 that may be served by devices (e.g., access node terminals) located in the third coverage area 435 via forward links 1240 and 1241, as similarly described with reference to FIG. 12 (e.g., according to the second forward link configuration 312 "B").

Additionally, according to the ninth operating mode, the communications satellite 405 may relay return link signals between the first coverage area 415 and the third coverage area 435. Thus, return link communications services may be provided to devices (e.g., user terminals) located in the first coverage area 415 (e.g., which may include or at least partially overlap with the second coverage area 425) via access node terminals located in the third coverage area 435 (e.g., according to the first return link configuration 321 "1"). For example, to establish a return link 1337, the communications satellite 405 may receive RHCP return uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430.

Accordingly, the communications satellite 405 may be operated to provide a dual polarization forward link (e.g., forward links 1240 and 1241) for the second coverage area 425 while providing a single return link 1337 for the first coverage area. By way of the first coverage area including or overlapping with the second coverage area, the communications satellite 405 may also provide the return link for devices in the second coverage area being provided a forward link via one or both of forward links 1240 and 1241.

The example satellite communications system configuration 1300 of FIG. 13 also shows forward uplink interference 1345 and forward uplink interference 1347. Forward uplink interference 1345 may represent interference between the uplink for forward link 1240 and the uplink for return link 1337. However, because forward link 1240 and return link 1337 use orthogonal polarizations, forward uplink interference 1345 may not be substantially increased relative to other operating modes and/or a benchmark level of interference due to polarization diversity (e.g., of −22 dB).

Forward uplink interference 1347 may represent interference between the uplink for forward link 1241 and the uplink for return link 1337. Because forward link 1241 and return link 1337 do not use orthogonal polarizations and the third coverage area 435 is within the illumination area of R1, the uplink of forward link 1241 may cause substantial interference to the uplink for return link 1337 (e.g., 22 dB worse than if the third coverage area 435 is outside the illumination area of R1). Beamforming of receive beams for return link 1337 may mitigate forward uplink interference 1347, however the received power from forward uplink interference 1347 at R1 may reduce the level of the signals for return link 1337 and thus reduce the ability to fully mitigate the effects on return link 1337.

Figure 14:
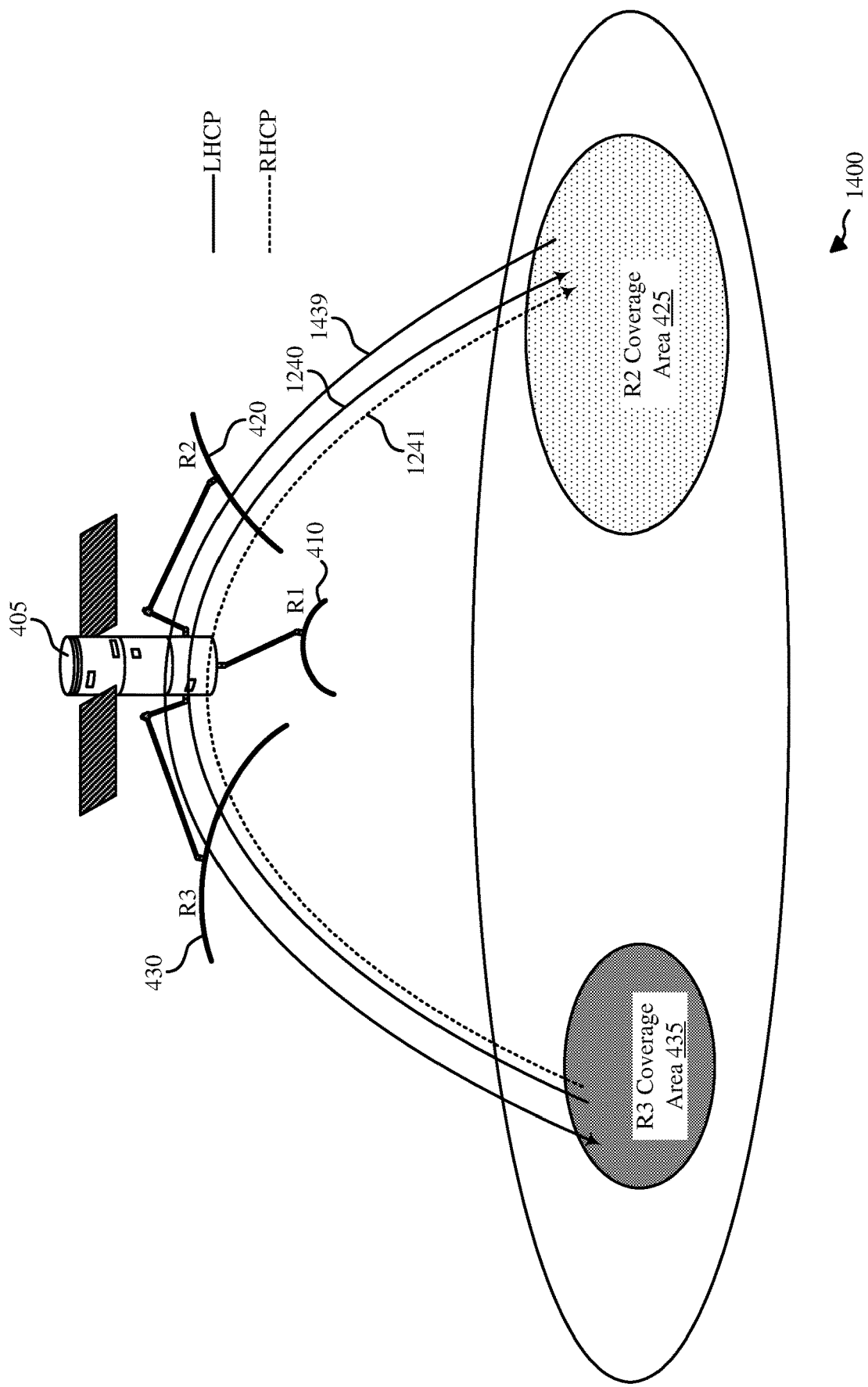

FIG. 14 illustrates a satellite communications system configuration 1400 that supports switching between operating modes of beamforming systems and satellites in accordance with aspects of the present disclosure. The example satellite communications system configuration 1400 of FIG. 14 illustrates example communication links and procedures for the communications satellite 405 to operate according to a tenth operating mode, for example, operating mode "B2," as referenced in the table of FIG. 3. The "B2" operating mode provides the second return link configuration 322 "2" in combination with the second forward link configuration 312 "B," as is described with reference to FIG. 12.

According to the tenth operating mode shown in FIG. 14 (e.g., operating mode "B2"), the communications satellite 405 may provide forward link communications services to devices located in the second coverage area 425 that may be served by devices (e.g., access node terminals) located in the third coverage area 435 via forward links 1240 and 1241, as similarly described with reference to FIG. 12 (e.g., according to the second forward link configuration 312 "B").

Additionally, according to the tenth operating mode, the communications satellite 405 may relay return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 1439, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 1439, and antennas of receiving devices (e.g., access node terminals) may use RHCP polarization to receive the polarized signals over the return link 1439.

Figure 15:
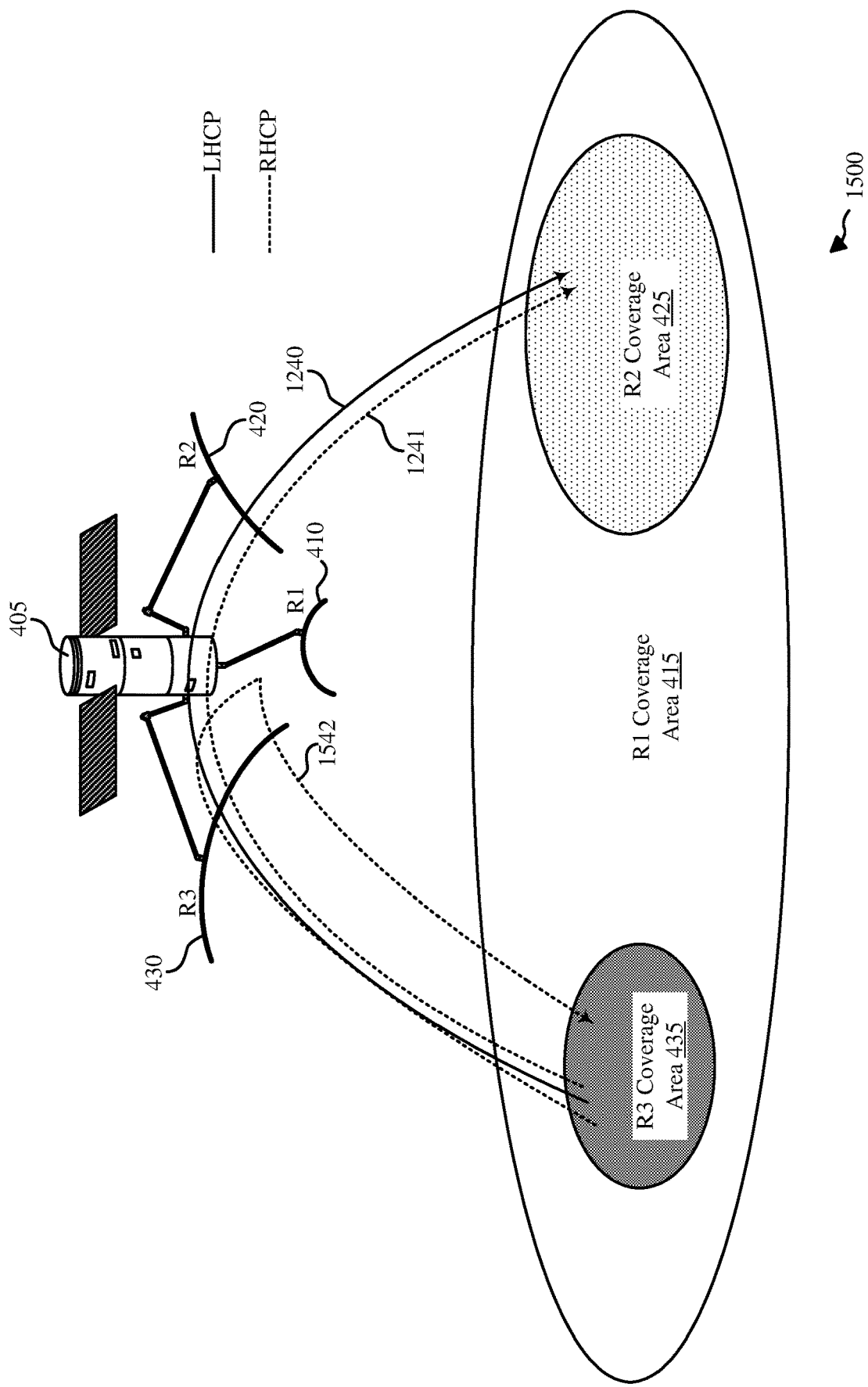

FIG. 15 illustrates a satellite communications system configuration 1500 that supports switching between operating modes of beamforming systems and satellites in accordance with aspects of the present disclosure. The example satellite communications system configuration 1500 of FIG. 15 provides an example of a hypothetical operating mode that, in some implementations, may be inoperable or unavailable. The hypothetical operating mode described in FIG. 15 may be referred to as an eleventh operating mode, which may be, for example, an operating mode "B3," as referenced in the table of FIG. 3. The "B3" operating mode attempts to implement the third return link configuration 323 "3" in combination with the second forward link configuration 312 "B," as is described with reference to FIG. 12.

According to the eleventh operating mode shown in FIG. 15 (e.g., operating mode "B3"), the communications satellite 405 may provide forward link communications services to devices located in the second coverage area 425 that are served by devices (e.g., access node terminals) located in the third coverage area 435 via forward links 1240 and 1241, as similarly described with reference to FIG. 12 (e.g., according to the second forward link configuration 312 "B").

Additionally, according to the eleventh operating mode, the communications satellite 405 provides return link communications services to devices located in the third coverage area 435 (e.g., according to the third return link configuration 323 "3"). For example, to establish a return link 1542, the communications satellite 405 receives return uplink signals from devices (e.g., user terminals) in the third coverage area 435 via the R3 antenna 430 and relays corresponding return downlink signals to other devices (e.g., access node terminals) in the third coverage area 435 via the R3 antenna 430. According to the third return link configuration 323, signals communicated over the return link 1542 may be polarized using a one of the two polarizations, here, for example, being RHCP. Accordingly, the user terminals would apply RHCP polarization to transmit signals over the return link 1542, and access node terminals would similarly use the RHCP polarization to receive the polarized signals over the return link 1542.

The eleventh operating mode however, may not be practically implemented at the communications satellite 405, as described herein. As shown in FIG. 15, the RHCP antenna elements of the R3 antenna may be configured to receive the forward uplink for forward link 1241 from the access node terminals in the third coverage area 435, and relay these signals via the R2 antenna 420. Thus, these elements may be unavailable for receiving RHCP return uplink signals from user terminals in the third coverage area 435. As such, the eleventh operating mode illustrated in FIG. 15 is one example of an operating mode that may be either unusable or unavailable in certain implementations. The satellite communications system configuration for other similar operating modes as shown in the table of FIG. 3 (e.g., modes "D3," "E3," "F3," "G3," and "H3") are omitted for the sake of brevity.

Figure 16:
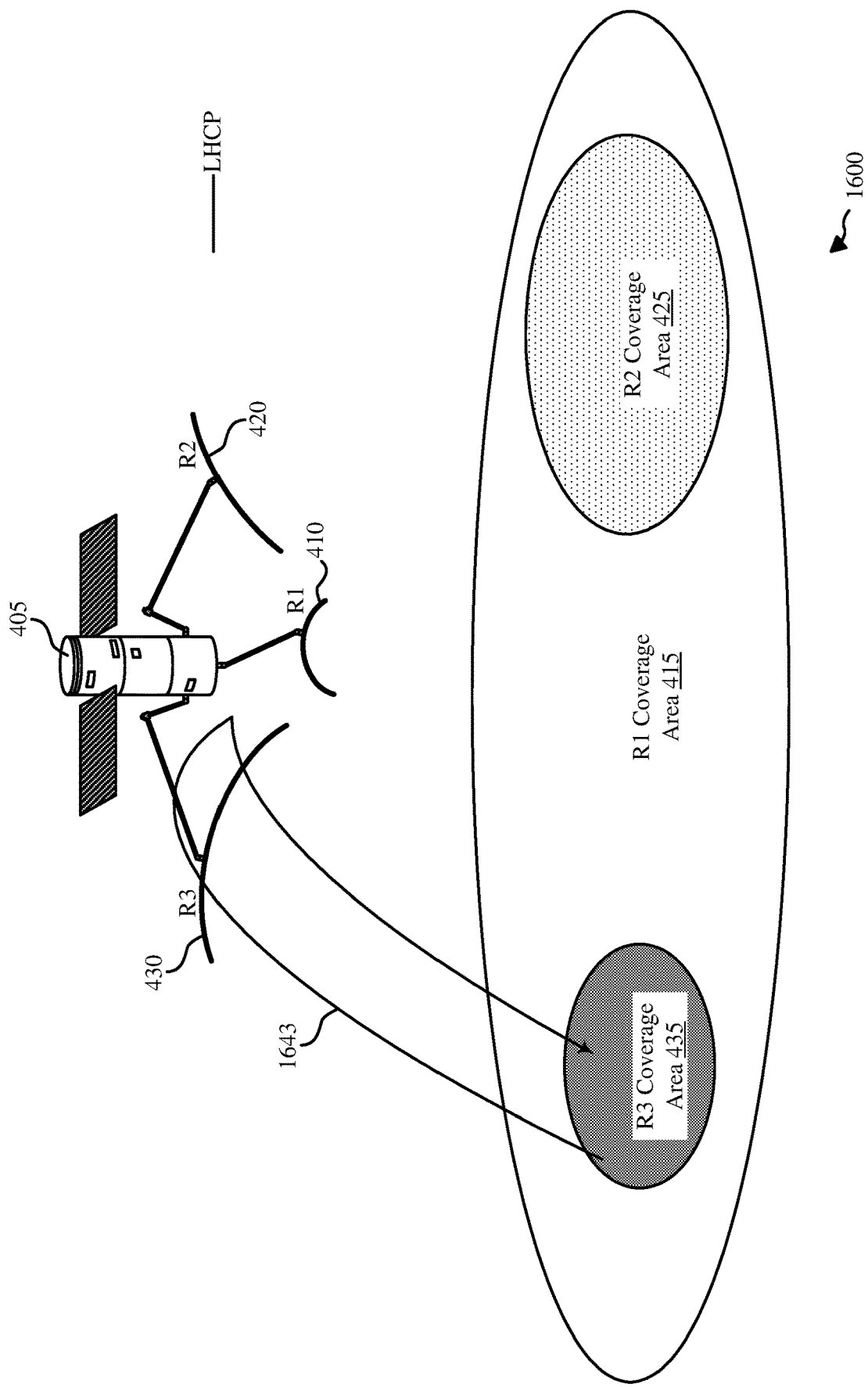

FIG. 16 illustrates a satellite communications system configuration 1600 that supports switching between operating modes of beamforming systems and satellites in accordance with aspects of the present disclosure. The example satellite communications system configuration 400 of FIG. 4 illustrates example communication links and procedures for the communications satellite 405 to operate according to a twelfth operating mode, for example, operating mode "C0" as described with reference to FIG. 3. The "C0" operating mode provides a third forward link configuration 313 "C" without a return link configuration.

According to the twelfth operating mode shown in FIG. 16 (e.g., operating mode "C0"), the communications satellite 405 may provide forward link communications services to devices (e.g., user terminals) located in the third coverage area 435 that may be served by other devices (e.g., access node terminals) located in the third coverage area 435 via a forward link 1643.

As shown in the example satellite communications system configuration 1600 of FIG. 16, signals communicated over the forward link 1643 may be polarized using a first polarization, here being LHCP. Accordingly, antennas of transmitting devices (e.g., access node terminals) may apply LHCP polarization to transmit signals over the forward link 1643, and antennas of receiving devices (e.g., user terminals) may similarly use the LHCP polarization to receive the polarized signals over the forward link 1643.

As similarly described herein, the twelfth operating mode shows the "C0" operating mode. As illustrated in FIG. 16, and as similarly described with reference to FIG. 3, the "0" of the "C0" operating mode label indicates that the twelfth operating mode does not include a return link configuration. Operating modes "C1," "C2," and "C3," as discussed below with reference to FIGS. 17 through 19, for example, provide return link configurations in combination with the third forward link configuration 313 "C" shown and described here in FIG. 16.

Figure 17:
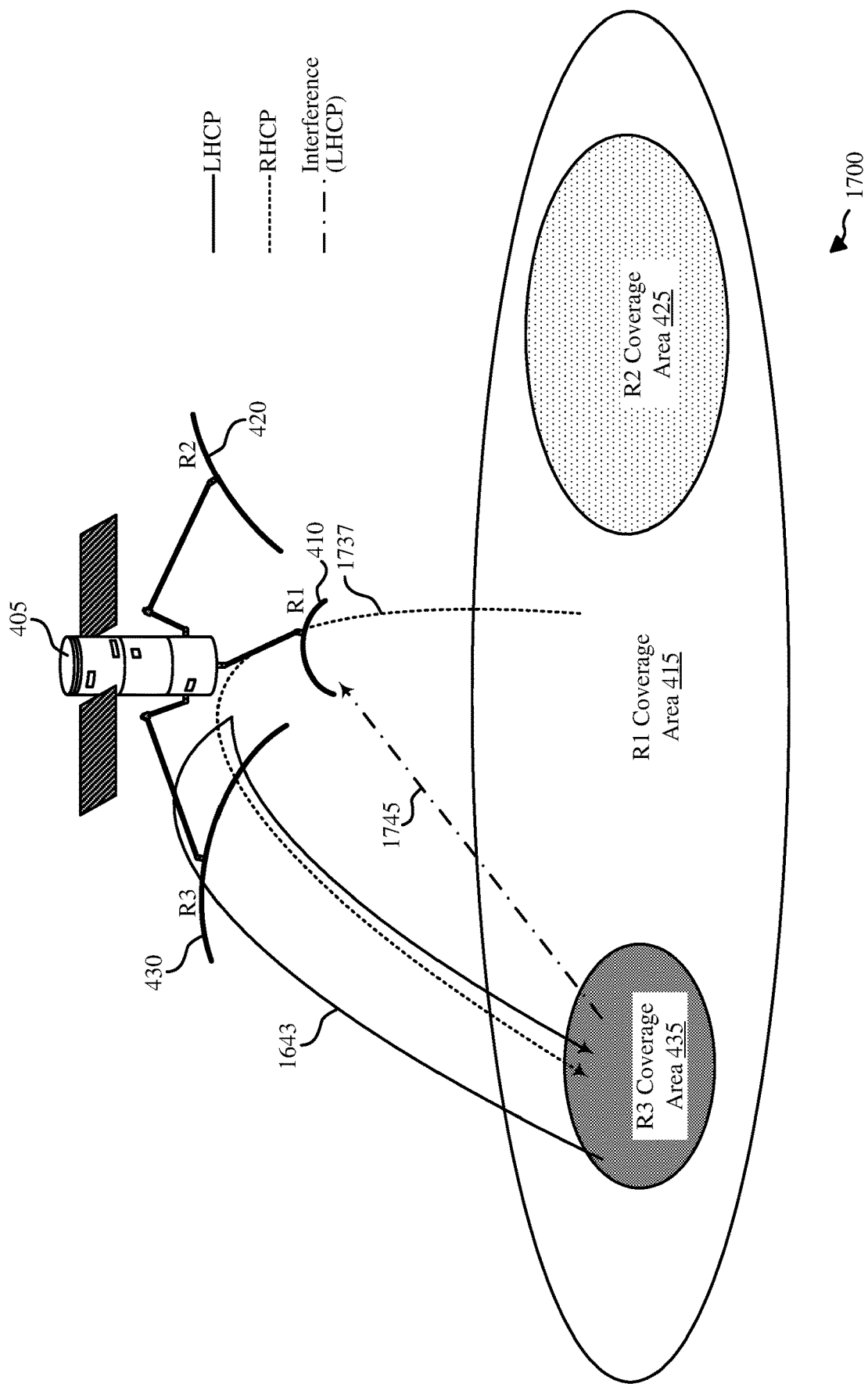

FIG. 17 illustrates a satellite communications system configuration 1700 that supports switching between operating modes of beamforming systems and satellites in accordance with aspects of the present disclosure. The example satellite communications system configuration 1700 of FIG. 17 illustrates example communication links and procedures for the communications satellite 405 to operate according to a thirteenth operating mode, for example, operating mode "C1," as referenced in the table of FIG. 3. The "C1" operating mode provides the first return link configuration 321 "1" in combination with the third forward link configuration 313 "C," as is described with reference to FIG. 16.

According to the thirteenth operating mode shown in FIG. 17 (e.g., operating mode "C 1"), the communications satellite 405 may provide forward link communications services to user terminals located in the third coverage area 435 by access node terminals located in the third coverage area 435 via forward link 1643, as similarly described with reference to FIG. 16 (e.g., according to the third forward link configuration 313 "C").

Additionally, according to the thirteenth operating mode, the communications satellite 405 may relay return link signals between the first coverage area 415 and the third coverage area 435 via return link 1737. Thus, return link communications services may be provided to devices (e.g., user terminals) located in the first coverage area 415 (e.g., which may include the user terminals in the third coverage area provided forward link communication services via forward link 1643) via access node terminals located in the third coverage area 435 (e.g., according to the first return link configuration 321 "1"). For example, to establish a return link 1737, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430. Accordingly, user terminals may apply the RHCP polarization to transmit signals over the return link 1737, and access node terminals may use RHCP polarization to receive the polarized signals over the return link 1737.

The example satellite communications system configuration 1700 of FIG. 17 also shows forward uplink interference 1745. For example, forward uplink interference 1745 may represent interference between the uplink for forward link 1643 and the uplink for return link 1737. However, because forward link 1643 and return link 1737 use orthogonal polarizations, forward uplink interference 1745 may not be substantially increased relative to other operating modes and/or a benchmark level of interference due to polarization diversity (e.g., of −22 dB). Additionally or alternatively, in some cases, an EIRP used to transmit over the forward link 1643 may be relatively increased (e.g., a C/I ratio for the forward link 1643 may be increased 3 to 8 dB), which may, in some cases, also cause downlink interference (e.g., 14 dB relative to modes where a forward link is not transmitted by the R3 antenna 430).

Figure 18:
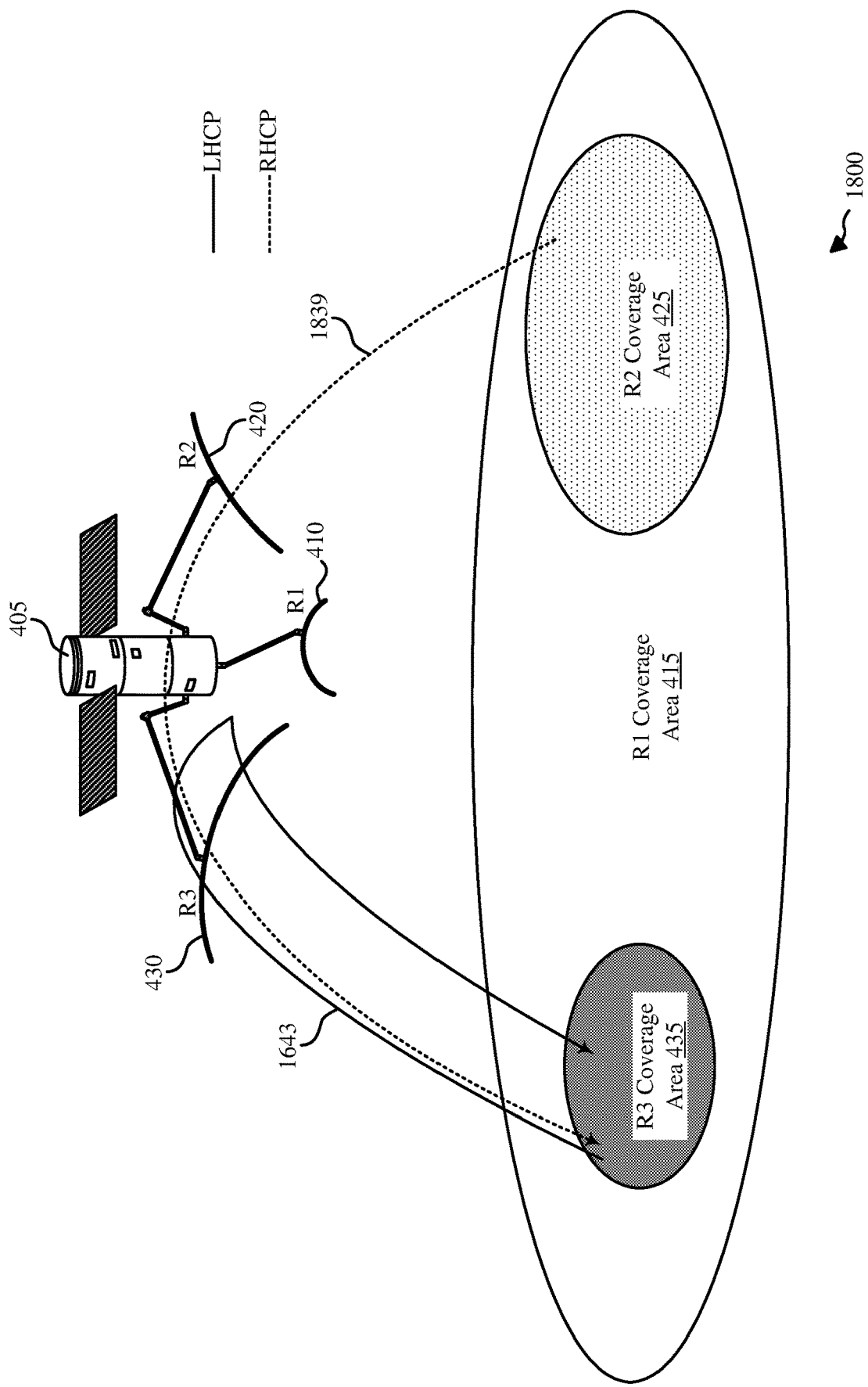

FIG. 18 illustrates a satellite communications system configuration 1800 that supports switching between operating modes of beamforming systems and satellites in accordance with aspects of the present disclosure. The example satellite communications system configuration 1800 of FIG. 18 illustrates example communication links and procedures for the communications satellite 405 to operate according to a fourteenth operating mode, for example, operating mode "C2," as referenced in the table of FIG. 3. The "C2" operating mode provides the second return link configuration 322 "2" in combination with the third forward link configuration 313 "C," as is described with reference to FIG. 16.

According to the fourteenth operating mode shown in FIG. 18 (e.g., operating mode "C 1"), the communications satellite 405 may provide forward link communications services to user terminals located in the third coverage area 435 by access node terminals located in the third coverage area 435 via a forward link 1643, as similarly described with reference to FIG. 16 (e.g., according to the third forward link configuration 313 "C").

Additionally, according to the fourteenth operating mode, the communications satellite 405 may relay return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 1839, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 1839, and antennas of receiving devices (e.g., access node terminals) may use RHCP polarization to receive the polarized signals over the return link 1839.

In some cases, the fourteenth operating mode shown in FIG. 18 may include downlink interference, which may potentially degrade a signal quality of signals communicated in the third coverage area 435 via communications satellite 405. For example, devices in the third coverage area 435 may receive signals on the return link 1839 and on the downlink portion of the forward link 1643 using time-frequency resources that may at least partially overlap with time-frequency resources in the third coverage area 435 of the forward link 1643. As shown for the fourteenth operating mode, however, the forward link 1643 and the return link 1839 may use orthogonal polarizations, for example, providing polarization diversity. Accordingly, the downlink interference may not be substantially increased relative to other operating modes and/or a benchmark level of interference (as similarly indicated by the table described with reference to FIG. 3). Additionally or alternatively, in some cases, an EIRP used to transmit over the forward link 1643 may be relatively increased (e.g., a C/I ratio for the forward link 1643 may be increased 3 to 8 dB), which may, in some cases, increase the downlink interference (e.g., 14 dB relative to a benchmark) to return link 1839.

Figure 19:
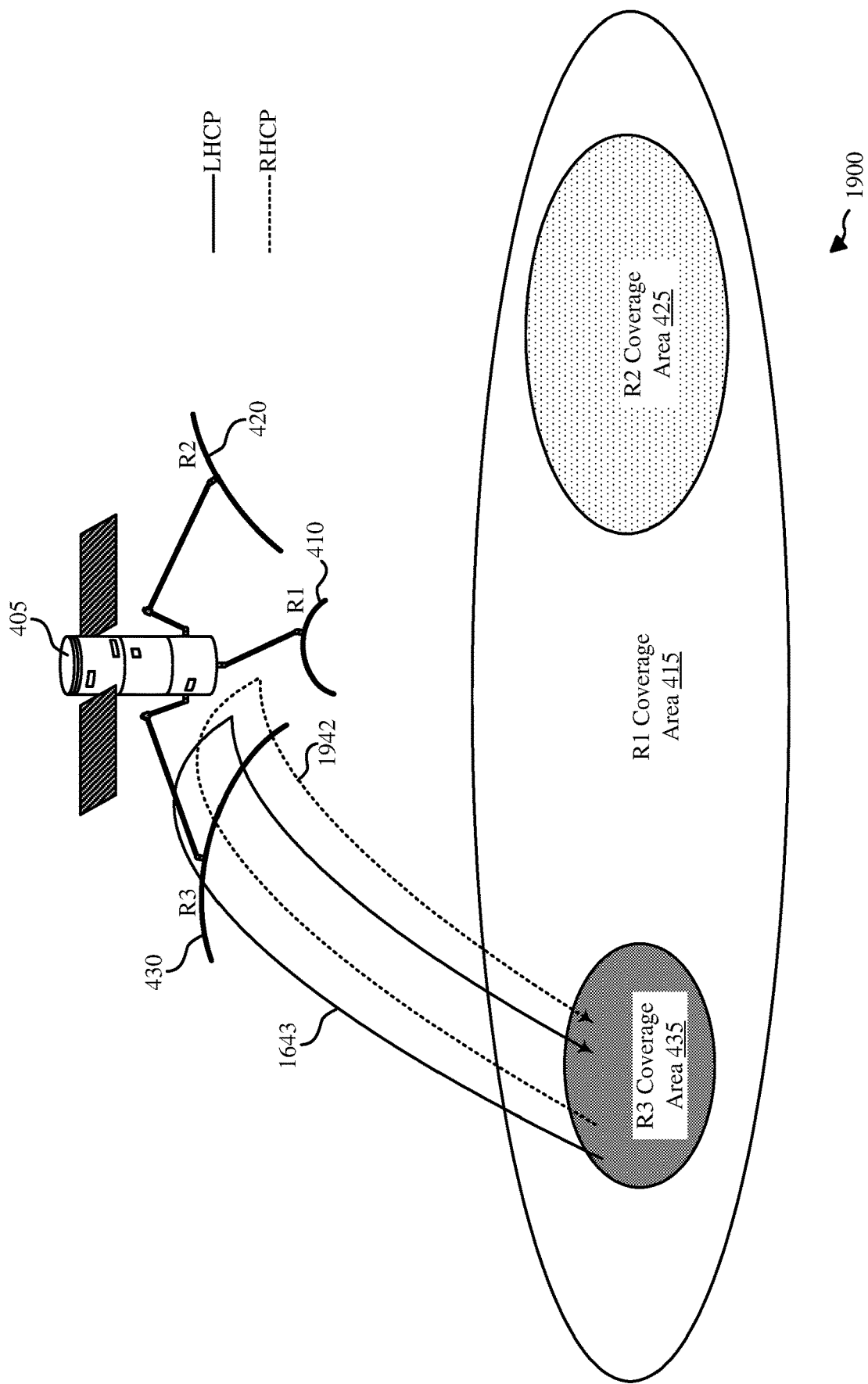

FIG. 19 illustrates a satellite communications system configuration 1900 that supports switching between operating modes of beamforming systems and satellites in accordance with aspects of the present disclosure. The example satellite communications system configuration 1900 of FIG. 19 illustrates example communication links and procedures for the communications satellite 405 to operate according to a fifteenth operating mode, for example, operating mode "C3," as referenced in the table of FIG. 3. The "C3" operating mode provides the third return link configuration 323 "3" in combination with the third forward link configuration 313 "C," as is described with reference to FIG. 16.

According to the fifteenth operating mode shown in FIG. 19 (e.g., operating mode "C 1"), the communications satellite 405 may provide forward link communications services to user terminals located in the third coverage area 435 by access node terminals located in the third coverage area 435 via a forward link 1643, as similarly described with reference to FIG. 16 (e.g., according to the third forward link configuration 313 "C").

Additionally, according to the fifteenth operating mode, the communications satellite 405 may relay return link signals between user terminals in the third coverage area 435 and access node terminals in the third coverage area 435. Thus, return link communications services may be provided to user terminals located in the third coverage area 435 via access node terminals located in the third coverage area 435 (e.g., according to the third return link configuration 323 "3"). For example, to establish a return link 1942, the communications satellite 405 may receive return RHCP uplink signals from user terminals in the third coverage area 435 via the R3 antenna 430 and relay corresponding return downlink signals to the access node terminals in the third coverage area 435 via the R3 antenna 430.

In some cases, the fifteenth operating mode shown in FIG. 19 may include downlink interference, which may potentially degrade a signal quality of signals communicated in the third coverage area 435 via communications satellite 405. For example, user terminals in the third coverage area 435 may receive signals on the downlink portion of forward link 1643 using time-frequency resources that may at least partially overlap with time-frequency resources used by the downlink portion of the return link 1942. As shown for the fifteenth operating mode, however, the forward link 1643 and the return link 1942 may use orthogonal polarizations, for example, providing polarization diversity. Accordingly, in some cases, the downlink interference may not be substantially increased relative to other operating modes and/or a benchmark level of interference (as similarly indicated by the table described with reference to FIG. 3). Additionally or alternatively, in some cases, an EIRP used to transmit over the forward link 1643 may be relatively increased (e.g., a C/I ratio for the forward link 1643 may be increased 3 to 8 dB), which may, in some cases, increase the downlink interference (e.g., 14 dB relative to a benchmark).

Figure 20:
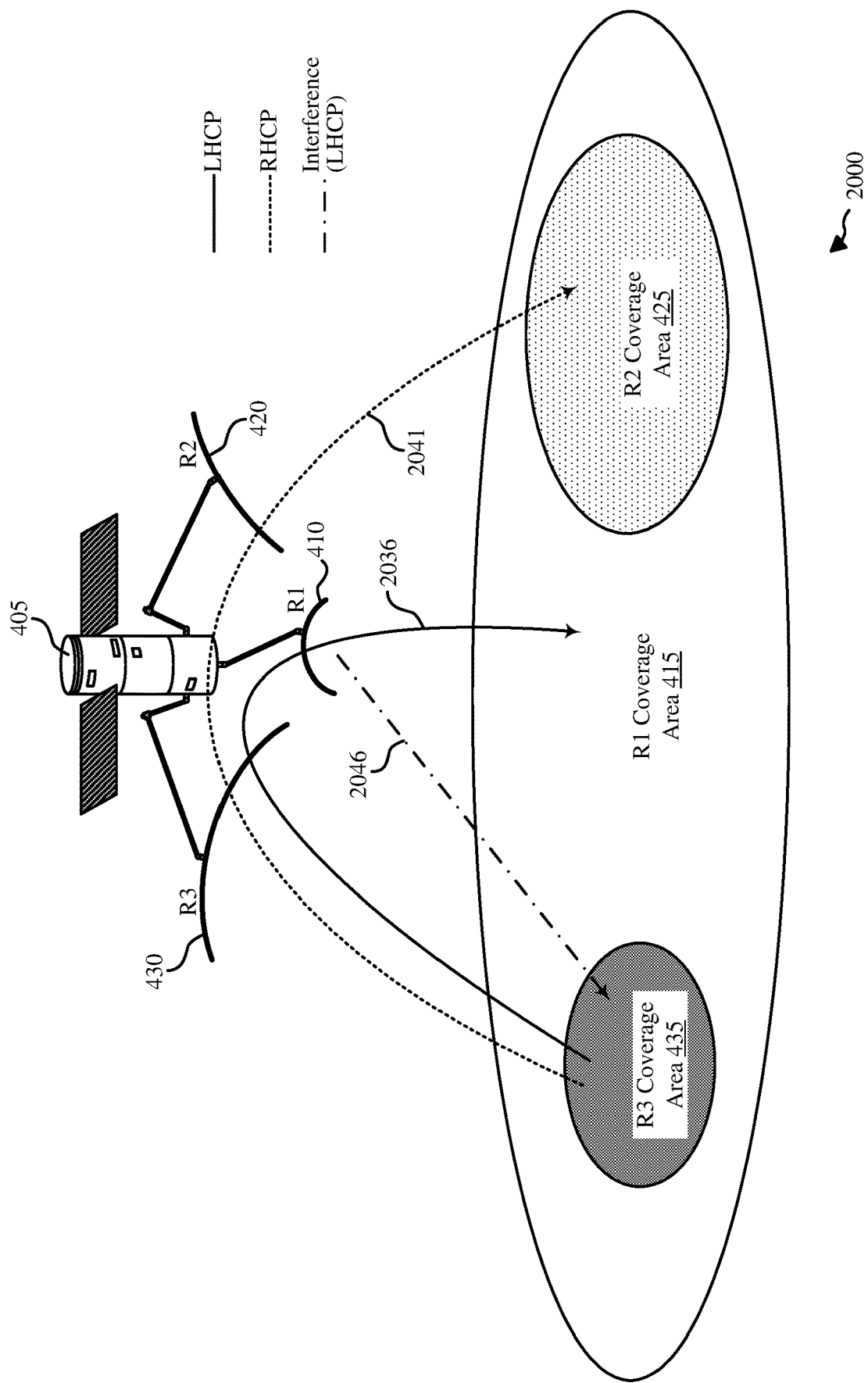

FIG. 20 illustrates a satellite communications system configuration 2000 that supports switching between operating modes of beamforming systems and satellites in accordance with aspects of the present disclosure. The example satellite communications system configuration 2000 of FIG. 20 illustrates example communication links and procedures for the communications satellite 405 to operate according to a sixteenth operating mode, for example, operating mode "E0" as described with reference to FIG. 3. The "E0" operating mode provides a fifth forward link configuration 315 "E" without a return link configuration.

According to the sixteenth operating mode shown in FIG. 20 (e.g., operating mode "E0"), the communications satellite 405 may provide forward link communications services to devices located in the first coverage area 415 and the second coverage area 425 that may each be served by devices (e.g., access node terminals) located in the third coverage area 435 via forward links 2036 and 2041, respectively.

As shown in the example satellite communications system configuration 2000 of FIG. 20, signals may be communicated between the devices in the third coverage area 435 and respective devices in the first coverage area 415 and the second coverage area 425 using dual polarization. For example, signals communicated over the forward link 2036 may be polarized using a first polarization, here being LHCP, and signals communicated over the forward link 2041 may be polarized using a second polarization, here being RHCP. Accordingly, antennas of transmitting devices (e.g., access node terminals) may apply LHCP polarization to transmit signals over the forward link 2036, and antennas of respective receiving devices (e.g., user terminals) may similarly use the LHCP polarization to receive the polarized signals over the forward link 2036. Similarly, antennas of transmitting devices may apply RHCP polarization to transmit signals over the forward link 2041, and antennas of respective receiving devices may use RHCP polarization to receive the polarized signals over the forward link 2041.

The example satellite communications system configuration 2000 of FIG. 20 also shows noise and IMs 2046, which may potentially degrade a signal quality of signals communicated in the third coverage area 435 via communications satellite 405. As shown for the sixteenth operating mode, the forward link 2036 and the forward link 2041 may use orthogonal polarizations, for example, providing polarization diversity. Accordingly, noise and IMs 2046 may not be substantially increased relative to other operating modes and/or a benchmark level of interference.

As similarly described herein, the sixteenth operating mode shows the "E0" operating mode. As illustrated in FIG. 20, and as similarly described with reference to FIG. 3, the "0" of the "E0" operating mode label indicates that the sixteenth operating mode does not include a return link configuration. Operating modes "E1" and "E2," as discussed below with reference to FIGS. 21 and 22, for example, provide return link configurations in combination with the fifth forward link configuration 315 "E" shown and described here in FIG. 20.

Figure 21:
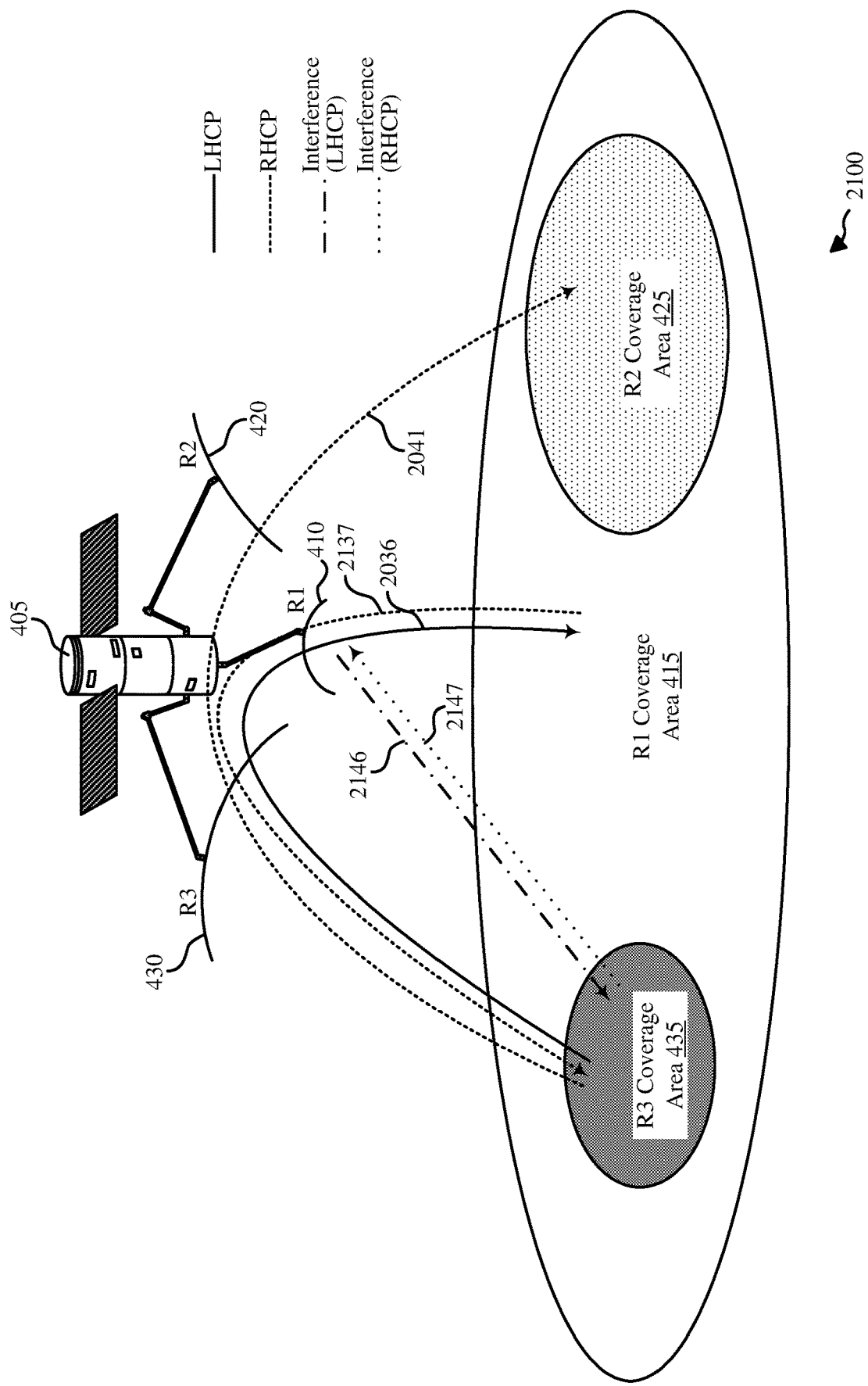

FIG. 21 illustrates a satellite communications system configuration 2100 that supports switching between operating modes of beamforming systems and satellites in accordance with aspects of the present disclosure. The example satellite communications system configuration 2100 of FIG. 21 illustrates example communication links and procedures for the communications satellite 405 to operate according to a seventeenth operating mode, for example, operating mode "E1," as referenced in the table of FIG. 3. The "E1" operating mode provides the first return link configuration 321 "1" in combination with the fifth forward link configuration 315 "E," as is described with reference to FIG. 20.

According to the seventeenth operating mode shown in FIG. 21 (e.g., operating mode "E1"), the communications satellite 405 may provide forward link communications services to devices located in the first coverage area 415 and the second coverage area 425 that may each be served by devices (e.g., access node terminals) located in the third coverage area 435 via forward links 2036 and 2041, respectively, as similarly described with reference to FIG. 20 (e.g., according to the fifth forward link configuration 315 "E").

According to the seventeenth operating mode, the communications satellite 405 may relay return link signals between the first coverage area 415 and the third coverage area 435 in addition to the forward links 2036 and 2041. Thus, return link communications services may be provided to devices (e.g., user terminals) located in the first coverage area 415 via access node terminals located in the third coverage area 435 (e.g., according to the first return link configuration 321 "1"). For example, to establish a return link 2137, the communications satellite 405 may receive return RHCP uplink signals from devices (e.g., user terminals) in the first coverage area 415 via the R1 antenna 410 and relay corresponding RHCP return downlink signals to access node terminals in the third coverage area 435 via the R3 antenna 430. Accordingly, antennas of transmitting devices (e.g., user terminals) may apply the RHCP polarization to transmit signals over the return link 2137, and antennas of receiving devices (e.g., access node terminals) may use RHCP polarization to receive the polarized signals over the return link 2137.

Figure 22:
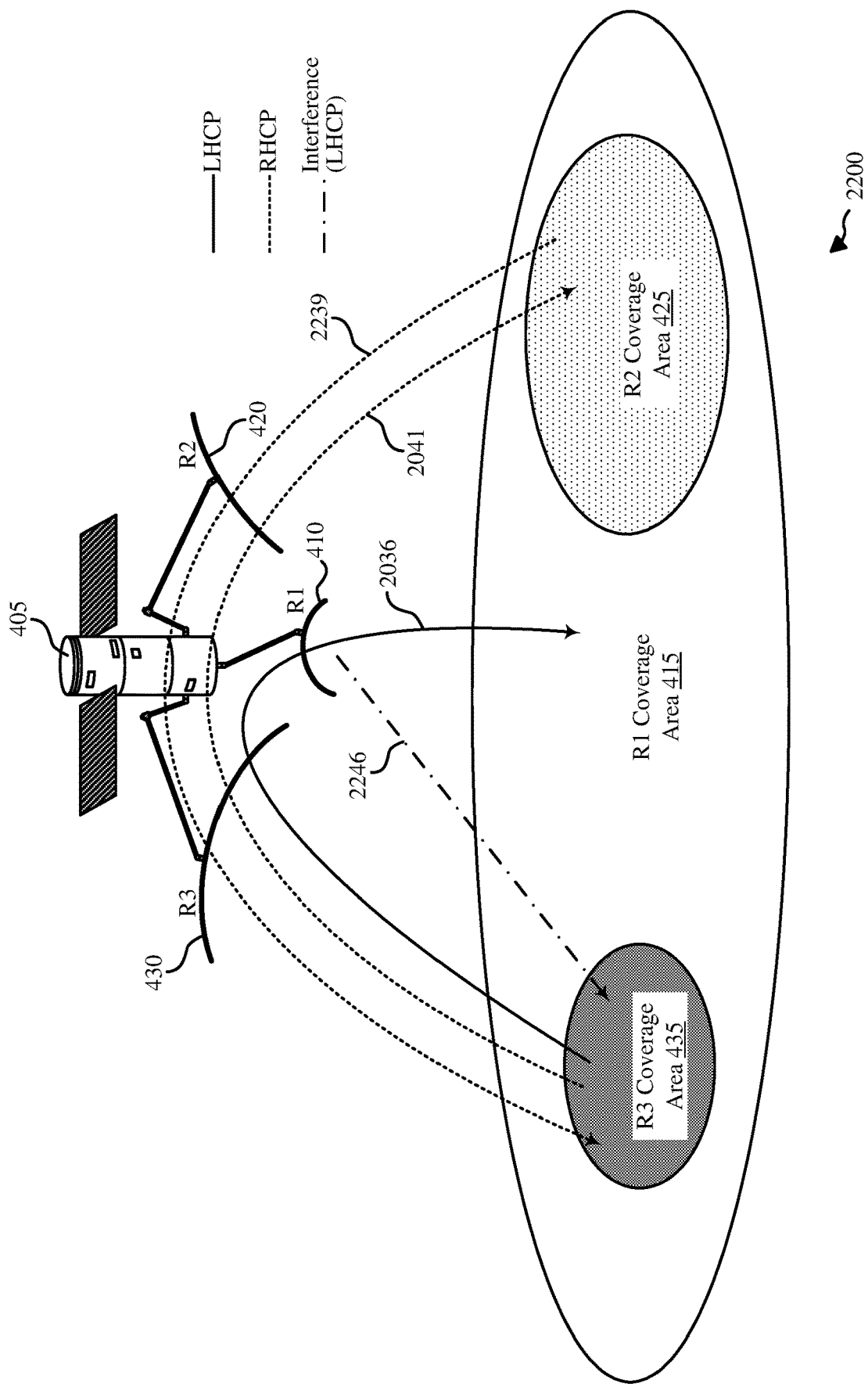

The example satellite communications system configuration 2100 of FIG. 21 also shows both forward uplink interference 2147 and noise and IMs 2146. Forward uplink interference 2147 may represent interference between the uplink for forward link 2041 and the uplink for return link 2137. Because forward link 2041 and return link 2137 do not use orthogonal polarizations and the third coverage area 435 is within the illumination area of R1, the uplink of forward link 2041 may cause substantial interference to the uplink for return link 2137 (e.g., 22 dB worse than if the third coverage area 435 is outside the illumination area of R1). Beamforming of receive beams for return link 2137 may mitigate forward uplink interference 2147, however the received power from forward uplink interference 2147 at R1 may reduce the level of the signals for return link 2137 and thus reduce the ability to fully mitigate the effects on return link 2137. Noise and IMs 2146 may be similar to noise and IMs 2046 discussed above, and thus may not be substantially increased relative to other operating modes and/or a benchmark level of interference FIG. 22 illustrates a satellite communications system configuration 2200 that supports switching between operating modes of beamforming systems and satellites in accordance with aspects of the present disclosure. The example satellite communications system configuration 2200 of FIG. 22 illustrates example communication links and procedures for the communications satellite 405 to operate according to an eighteenth operating mode, for example, operating mode "E2," as referenced in the table of FIG. 3. The "E2" operating mode provides the second return link configuration 322 "2" in combination with the fifth forward link configuration 315 "E," as is described with reference to FIG. 20.

According to the eighteenth operating mode shown in FIG. 22 (e.g., operating mode "E2"), the communications satellite 405 may provide forward link communications services to devices located in the first coverage area 415 and the second coverage area 425 that may each be served by devices (e.g., access node terminals) located in the third coverage area 435 via forward links 2036 and 2041, respectively, as similarly described with reference to FIG. 20 (e.g., according to the fifth forward link configuration 315 "E").

Additionally, according to the eighteenth operating mode, the communications satellite 405 may relay return link signals between the second coverage area 425 and the third coverage area 435 via return link 2239. Thus, return link communications services may be provided to devices (e.g., user terminals) located in the second coverage area 425 via access node terminals located in the third coverage area 435 (e.g., according to the second return link configuration 322 "2"). For example, to establish return link 2239, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 2239, and antennas of receiving devices (e.g., access node terminals) may use RHCP polarization to receive the polarized signals over the return link 2239.

The example satellite communications system configuration 2200 of FIG. 22 also shows noise and IMs 2246, which may be similar to noise and IMs 2046 and thus may not be substantially increased relative to other operating modes and/or a benchmark level of interference.

Figure 23:
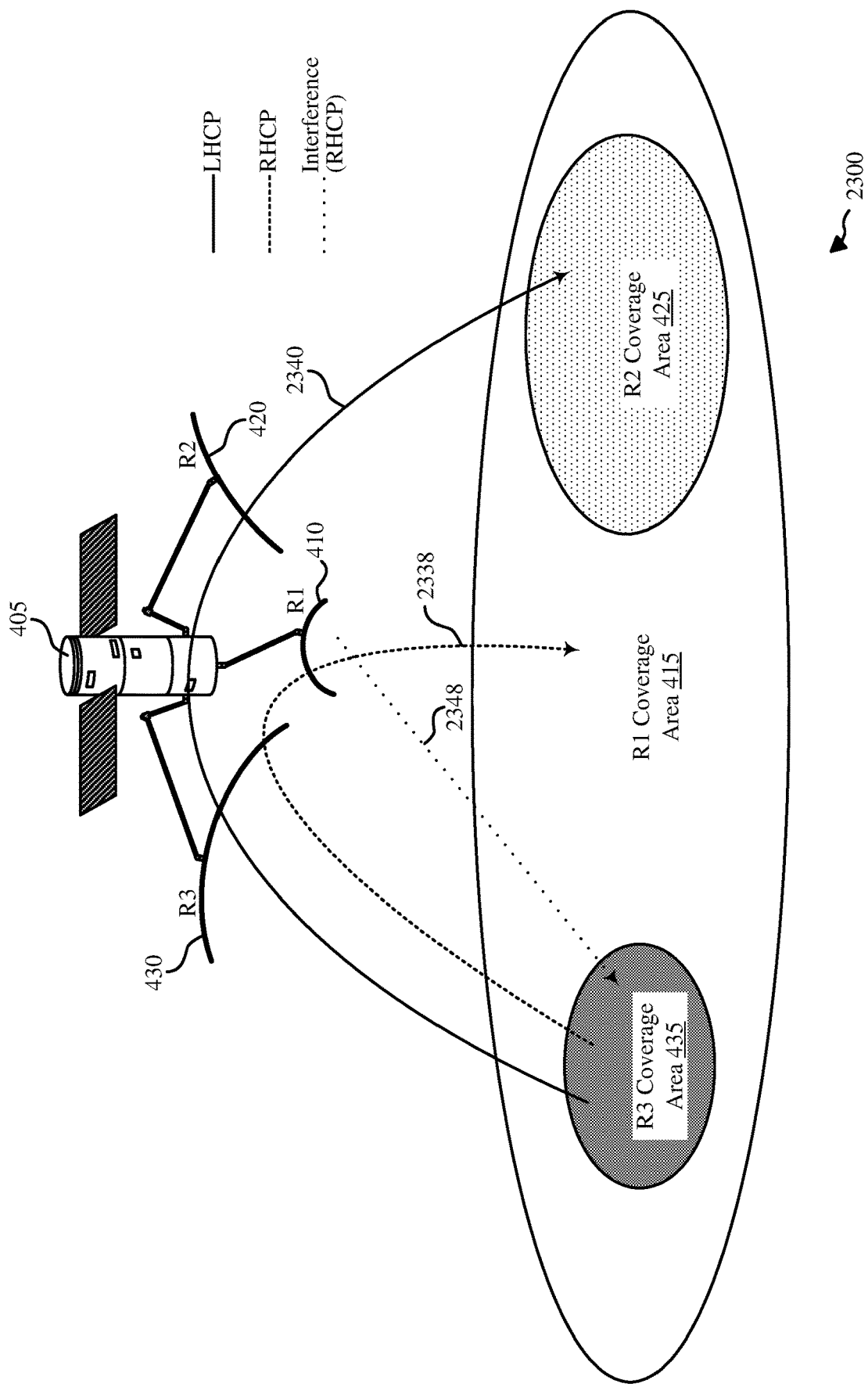

FIG. 23 illustrates a satellite communications system configuration 2300 that supports switching between operating modes of beamforming systems and satellites in accordance with aspects of the present disclosure. The example satellite communications system configuration 2300 of FIG. 23 illustrates example communication links and procedures for the communications satellite 405 to operate according to a nineteenth operating mode, for example, operating mode "F0" as described with reference to FIG. 3. The "F0" operating mode provides a sixth forward link configuration 316 "F" without a return link configuration.

According to the nineteenth operating mode shown in FIG. 23 (e.g., operating mode "F0"), the communications satellite 405 may provide forward link communications services to devices located in the first coverage area 415 via forward link 2338 and the second coverage area 425 via forward link 2340 that may each be served by devices (e.g., access node terminals) located in the third coverage area 435.

Signals communicated over the forward link 2340 may be polarized using a first polarization, here being LHCP, and signals communicated over the forward link 2338 may be polarized using a second polarization, here being RHCP. Accordingly, antennas of transmitting devices (e.g., access node terminals) may apply LHCP polarization to transmit signals over the forward link 2340, and antennas of respective receiving devices (e.g., user terminals) may similarly use the LHCP polarization to receive the polarized signals over the forward link 2340. Similarly, antennas of transmitting devices may apply RHCP polarization to transmit signals over the forward link 2338, and antennas of respective receiving devices may use RHCP polarization to receive the polarized signals over the forward link 2338.

The example satellite communications system configuration 2300 of FIG. 23 also shows noise and IMs 2348, which may potentially degrade a signal quality of signals communicated in the third coverage area 435 via communications satellite 405. As shown for the nineteenth operating mode, the forward link 2338 and the forward link 2340 may use orthogonal polarizations, for example, providing polarization diversity. Accordingly, noise and IMs 2348 may not be substantially increased relative to other operating modes and/or a benchmark level of interference.

As similarly described herein, the nineteenth operating mode shows the "F0" operating mode. As illustrated in FIG. 23, and as similarly described with reference to FIG. 3, the "0" of the "F0" operating mode label indicates that the nineteenth operating mode does not include a return link configuration. Operating modes "F 1" and "F2," as discussed below with reference to FIGS. 24 and 25, for example, provide return link configurations in combination with the sixth forward link configuration 316 "F" shown and described here in FIG. 23.

Figure 24:
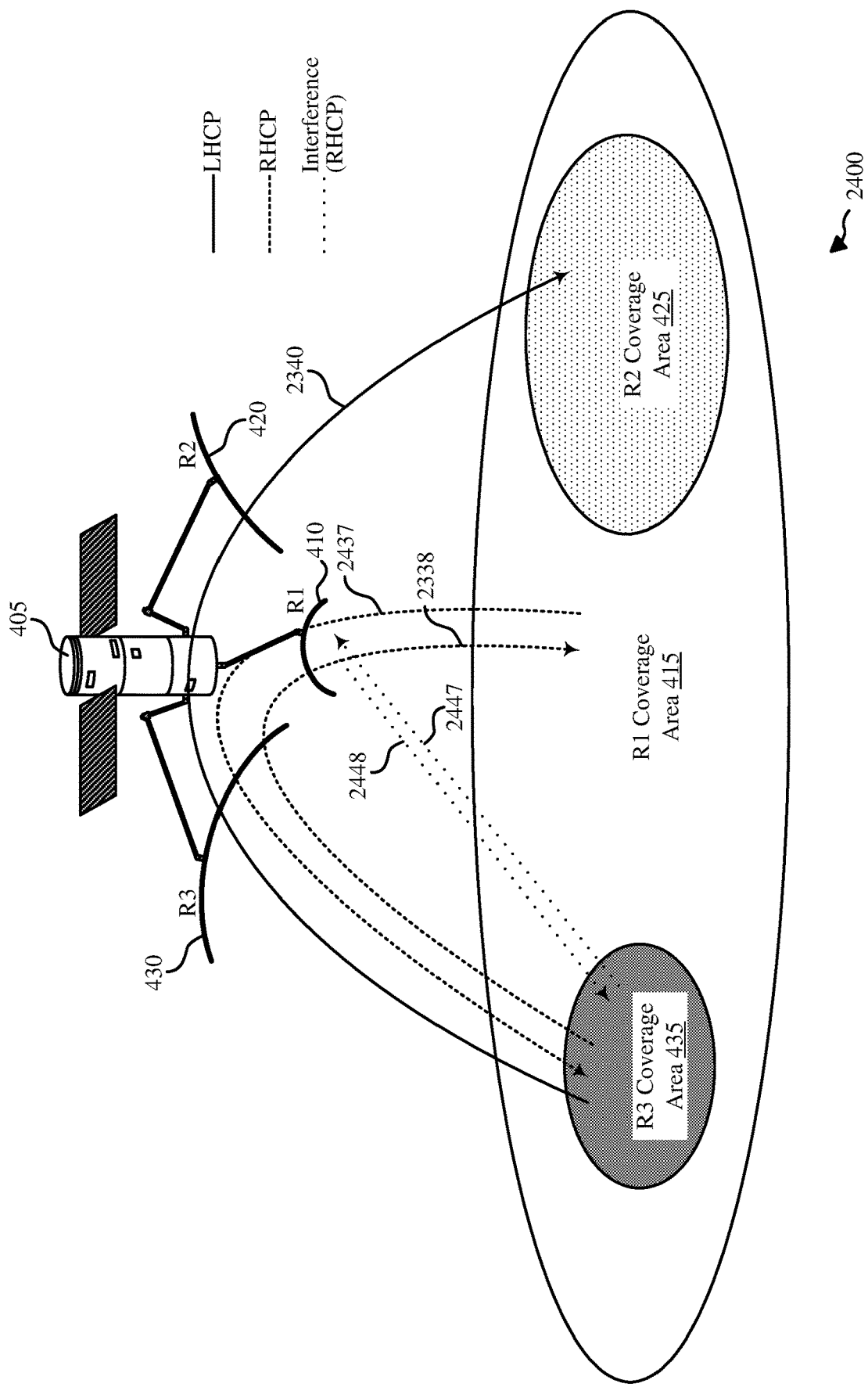

FIG. 24 illustrates a satellite communications system configuration 2400 that supports switching between operating modes of beamforming systems and satellites in accordance with aspects of the present disclosure. The example satellite communications system configuration 2400 of FIG. 24 illustrates example communication links and procedures for the communications satellite 405 to operate according to a twentieth operating mode, for example, operating mode "F 1," as referenced in the table of FIG. 3. The "F1" operating mode provides the first return link configuration 321 "1" in combination with the sixth forward link configuration 316 "F," as is described with reference to FIG. 23.

According to the twentieth operating mode shown in FIG. 24 (e.g., operating mode "F 1"), the communications satellite 405 may provide forward link communications services to devices located in the first coverage area 415 and the second coverage area 425 that may each be served by devices (e.g., access node terminals) located in the third coverage area 435 via forward links 2338 and 2340, respectively, as similarly described with reference to FIG. 23 (e.g., according to the sixth forward link configuration 316 "F").

Additionally, according to the twentieth operating mode, the communications satellite 405 may relay return link signals between the first coverage area 415 and the third coverage area 435. Thus, return link communications services may be provided to devices (e.g., user terminals) located in the first coverage area 415 via access node terminals located in the third coverage area 435 (e.g., according to the first return link configuration 321 "1"). For example, to establish a return link 2437, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 (e.g., access node terminals) via the R3 antenna 430. Accordingly, antennas of transmitting devices (e.g., user terminals) may apply RHCP polarization to transmit signals over the return link 2437, and antennas of receiving devices (e.g., access node terminals) may use RHCP polarization to receive the polarized signals over the return link 2437.

The example satellite communications system configuration 2400 of FIG. 24 also shows forward uplink interference 2447 and forward downlink interference 2448. Forward uplink interference 2447 may represent interference between the uplink for forward link 2338 and the uplink for return link 2437. Because forward link 2338 and return link 2437 do not use orthogonal polarizations and the third coverage area 435 is within the illumination area of R1, the uplink of forward link 2338 may cause substantial interference to the uplink for return link 2437 (e.g., 22 dB worse than if the third coverage area 435 is outside the illumination area of R1). Beamforming of receive beams for return link 2437 may mitigate forward uplink interference 2447, however the received power from forward uplink interference 2447 at R1 may reduce the level of the signals for return link 2437 and thus reduce the ability to fully mitigate the effects on return link 2437.

Forward downlink interference 2448 may represent interference between the downlink of forward link 2338 and the downlink for return link 2437 which do not use orthogonal polarizations. Forward downlink interference 2448 may be reduced due to the lower gain of R1 relative to R3, but still may cause substantial interference if signal energy from the downlink of forward link 2338 is present in the third coverage area 435. Beamforming of the forward link 2338 may be used to mitigate forward downlink interference 2448 (e.g., nulling signal energy from forward link 2338 within the third coverage area 435). Additionally or alternatively, an MCS and/or a coding rate for the forward link 2338 or return link 2437 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

Figure 25:
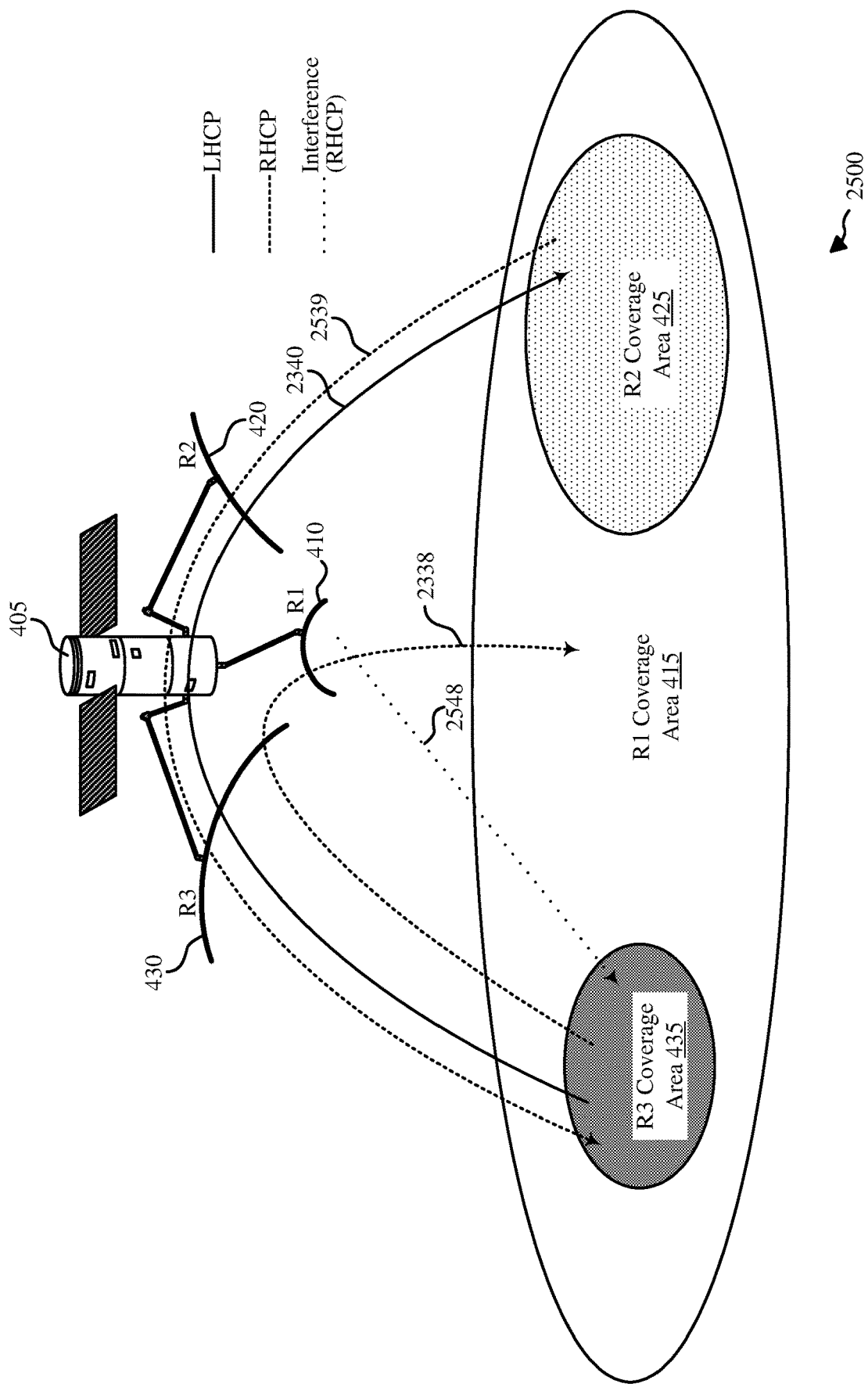

FIG. 25 illustrates a satellite communications system configuration 2500 that supports switching between operating modes of beamforming systems and satellites in accordance with aspects of the present disclosure. The example satellite communications system configuration 2500 of FIG. 25 illustrates example communication links and procedures for the communications satellite 405 to operate according to a twenty-first operating mode, for example, operating mode "F2," as referenced in the table of FIG. 3. The "F2" operating mode provides the second return link configuration 322 "2" in combination with the sixth forward link configuration 316 "F," as is described with reference to FIG. 23.

According to the twenty-first operating mode shown in FIG. 25 (e.g., operating mode "F2"), the communications satellite 405 may provide forward link communications services to devices located in the first coverage area 415 and the second coverage area 425 that may each be served by devices (e.g., access node terminals) located in the third coverage area 435 via forward links 2338 and 2340, respectively, as similarly described with reference to FIG. 23 (e.g., according to the sixth forward link configuration 316 "F").

Additionally, according to the twenty-first operating mode, the communications satellite 405 may relay return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 2539, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 2539, and antennas of receiving devices (e.g., access node terminals) may use RHCP polarization to receive the polarized signals over the return link 2539.

The example satellite communications system configuration 2500 of FIG. 25 also shows forward downlink interference 2548, which may represent interference between the downlink of forward link 2338 and the downlink for return link 2539 which do not use orthogonal polarizations. Forward downlink interference 2548 may be reduced due to the lower gain of R1 relative to R3, but still may cause substantial interference if signal energy from the downlink of forward link 2338 is present in the third coverage area 435. Beamforming of the forward link 2338 may be used to mitigate forward downlink interference 2548 (e.g., nulling signal energy from forward link 2338 within the third coverage area 435). Additionally or alternatively, an MCS and/or a coding rate for the forward link 2338 or return link 2539 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

Figure 26:
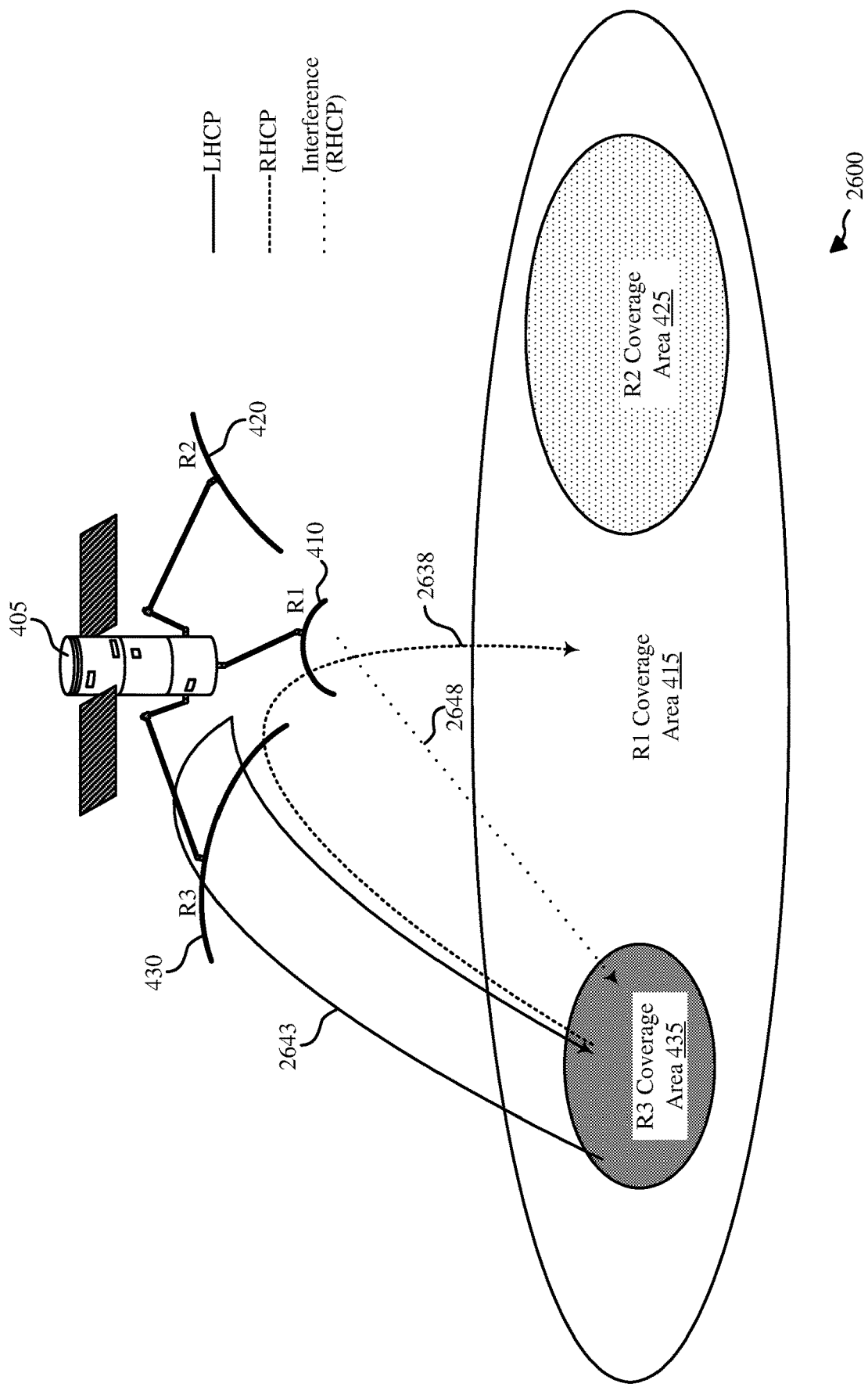

FIG. 26 illustrates a satellite communications system configuration 2600 that supports switching between operating modes of beamforming systems and satellites in accordance with aspects of the present disclosure. The example satellite communications system configuration 2600 of FIG. 26 illustrates example communication links and procedures for the communications satellite 405 to operate according to a twenty-second operating mode, for example, operating mode "G0" as described with reference to FIG. 3. The "G0" operating mode provides a seventh forward link configuration 317 "G" without a return link configuration.

According to the twenty-second operating mode shown in FIG. 26 (e.g., operating mode "G0"), the communications satellite 405 may provide forward link communications services to devices (e.g., user terminals) located in the first coverage area 415 and to devices (e.g., user terminals) located in the third coverage area 435 that may each be served by access node terminals located in the third coverage area 435 via forward links 2638 and 2643, respectively.

As shown in the example satellite communications system configuration 2600 of FIG. 26, signals communicated over the forward link 2643 may be polarized using a first polarization, here being LHCP, and signals communicated over the forward link 2638 may be polarized using a second polarization, here being RHCP. Accordingly, antennas of transmitting devices may apply LHCP polarization to transmit signals over the forward link 2643, and antennas of receiving devices may similarly use the LHCP polarization to receive the polarized signals over the forward link 2643. Similarly, antennas of transmitting devices may apply RHCP polarization to transmit signals over the forward link 2638, and antennas of respective receiving devices may use RHCP polarization to receive the polarized signals over the forward link 2638.

The example satellite communications system configuration 2600 of FIG. 26 also shows forward downlink interference 2648, which may cause a relatively small amount of degradation for the downlink portion of the forward link 2643 based on the forward link 2638. Thus, even beamforming of beams on the forward link 2638 within the third coverage area 435 may not cause substantial interference. As shown for the twenty-second operating mode, the forward link 2638 and the forward link 2643 may use orthogonal polarizations, for example, providing polarization diversity. Accordingly, forward link interference may not be substantially increased relative to other operating modes and/or a benchmark level of interference.

As similarly described herein, the twenty-second operating mode shows the "G0" operating mode. As illustrated in FIG. 26, and as similarly described with reference to FIG. 3, the "0" of the "G0" operating mode label indicates that the twenty-second operating mode does not include a return link configuration. Operating modes "G1" and "G2," as discussed below with reference to FIGS. 27 and 28, for example, provide return link configurations in combination with the seventh forward link configuration 317 "G" shown and described here in FIG. 26.

Figure 27:
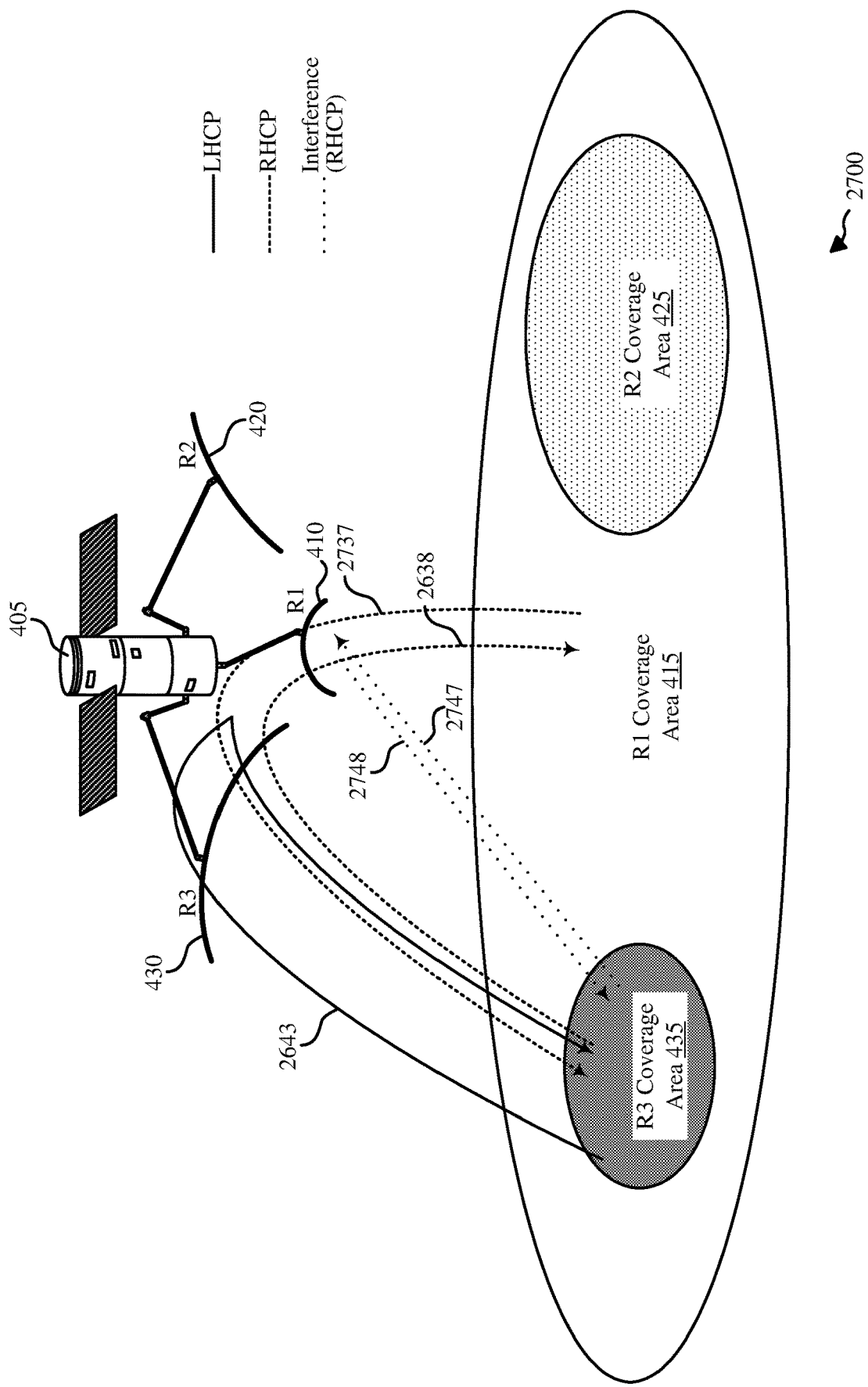

FIG. 27 illustrates a satellite communications system configuration 2700 that supports switching between operating modes of beamforming systems and satellites in accordance with aspects of the present disclosure. The example satellite communications system configuration 2700 of FIG. 27 illustrates example communication links and procedures for the communications satellite 405 to operate according to a twenty-third operating mode, for example, operating mode "G1," as referenced in the table of FIG. 3. The "G1" operating mode provides the first return link configuration 321 "1" in combination with the seventh forward link configuration 317 "G," as is described with reference to FIG. 26.

According to the twenty-third operating mode shown in FIG. 27 (e.g., operating mode "G1"), the communications satellite 405 may provide forward link communications services to devices (e.g., user terminals) located in the first coverage area 415 and to devices (e.g., user terminals) located in the third coverage area 435 that may each be served by access node terminals located in the third coverage area 435 via forward links 2638 and 2643, respectively, as similarly described with reference to FIG. 26 (e.g., according to the seventh forward link configuration 317 "G").

Additionally, according to the twenty-third operating mode, the communications satellite 405 may relay return link signals between the first coverage area 415 and the third coverage area 435. Thus, return link communications services may be provided to devices (e.g., user terminals) located in the first coverage area 415 via access node terminals located in the third coverage area 435 (e.g., according to the first return link configuration 321 "1"). For example, to establish a return link 2737, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 2737, and antennas of receiving devices (e.g., access node terminals) may use RHCP polarization to receive the polarized signals over the return link 2737.

The example satellite communications system configuration 2700 of FIG. 27 also shows forward uplink interference 2747 and forward downlink interference 2748. Forward uplink interference 2747 may represent interference between the uplink for forward link 2638 and the uplink for return link 2737. Because forward link 2638 and return link 2737 do not use orthogonal polarizations and the third coverage area 435 is within the illumination area of R1, the uplink of forward link 2638 may cause substantial interference to the uplink for return link 2737 (e.g., 22 dB worse than if the third coverage area 435 is outside the illumination area of R1). Beamforming of receive beams for return link 2737 may mitigate forward uplink interference 2747, however the received power from forward uplink interference 2747 at R1 may reduce the level of the signals for return link 2737 and thus reduce the ability to fully mitigate the effects on return link 2737.

Forward downlink interference 2748 may represent interference between the downlink of forward link 2638 and the downlink for return link 2737 which do not use orthogonal polarizations. Forward downlink interference 2748 may be reduced due to the lower gain of R1 relative to R3, but still may cause substantial interference if signal energy from the downlink of forward link 2638 is present in the third coverage area 435. Beamforming of the forward link 2638 may be used to mitigate forward downlink interference 2748 (e.g., nulling signal energy from forward link 2638 within the third coverage area 435). Additionally or alternatively, an MCS and/or a coding rate for the forward link 2638 or return link 2737 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

Figure 28:
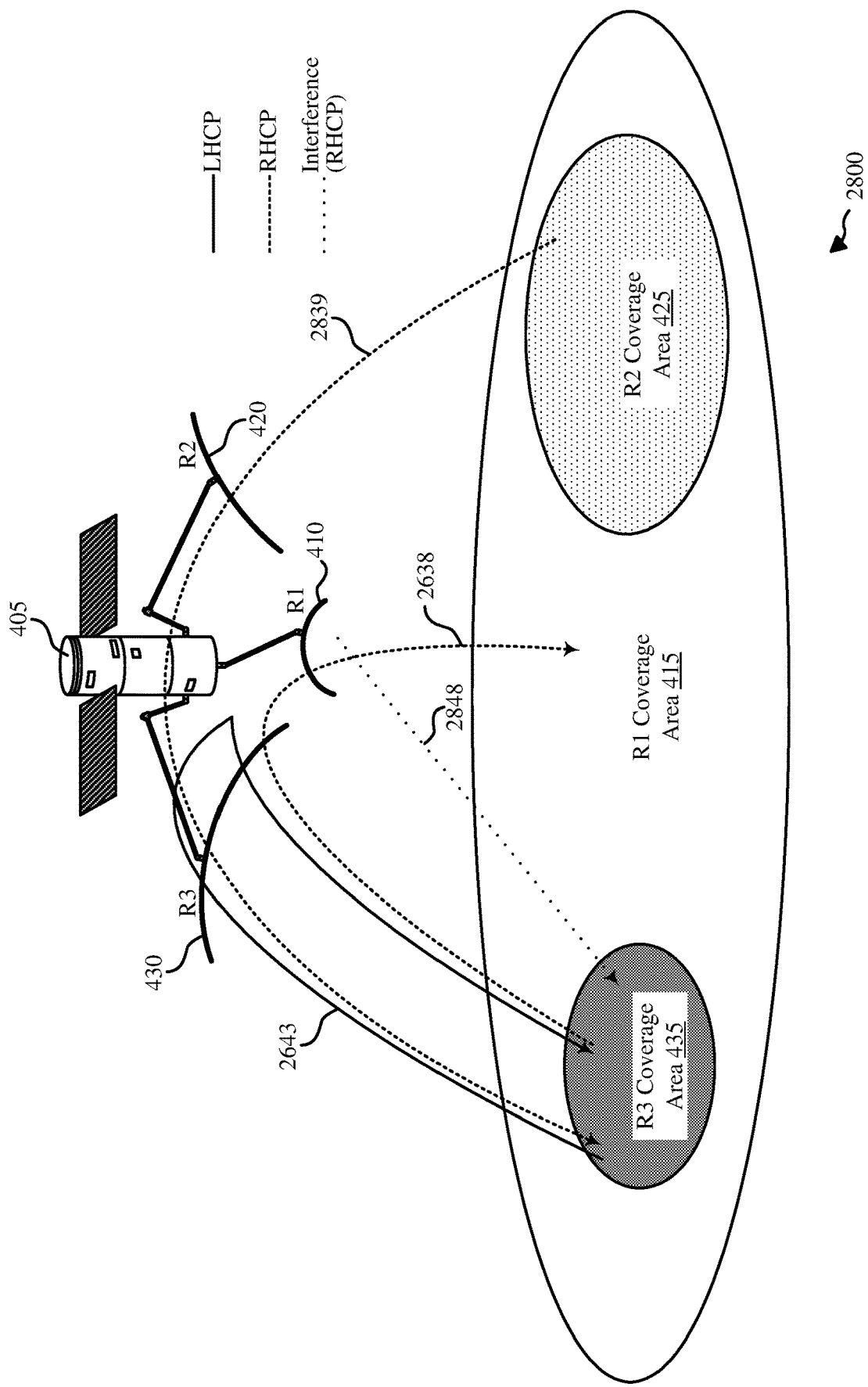

FIG. 28 illustrates a satellite communications system configuration 2800 that supports switching between operating modes of beamforming systems and satellites in accordance with aspects of the present disclosure. The example satellite communications system configuration 2800 of FIG. 28 illustrates example communication links and procedures for the communications satellite 405 to operate according to a twenty-fourth operating mode, for example, operating mode "G2," as referenced in the table of FIG. 3. The "G2" operating mode provides the second return link configuration 322 "2" in combination with the seventh forward link configuration 317 "G," as is described with reference to FIG. 26.

According to the twenty-fourth operating mode shown in FIG. 28 (e.g., operating mode "G2"), the communications satellite 405 may provide forward link communications services to devices (e.g., user terminals) located in the first coverage area 415 and to devices (e.g., access node terminals and/or user terminals) located in the third coverage area 435 that may each be served by other devices (e.g., additional access node terminals) located in the third coverage area 435 via forward links 2638 and 2643, respectively, as similarly described with reference to FIG. 26 (e.g., according to the seventh forward link configuration 317 "G").

Additionally, according to the twenty-fourth operating mode, the communications satellite 405 may relay return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 2839, the communications satellite 405 may receive return RHCP uplink signals from devices (e.g., user terminals) in the second coverage area 425 via the R2 antenna 420 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 2839, and antennas of receiving devices (e.g., access node terminals) may use RHCP polarization to receive the polarized signals over the return link 2839.

The example satellite communications system configuration 2800 of FIG. 28 also shows forward downlink interference 2848, which may represent interference between the downlink of forward link 2638 and the downlink for return link 2839 which do not use orthogonal polarizations. Forward downlink interference 2848 may be reduced due to the lower gain of R1 relative to R3, but still may cause substantial interference if signal energy from the downlink of forward link 2638 is present in the third coverage area 435. Beamforming of the forward link 2638 may be used to mitigate forward downlink interference 2848 (e.g., nulling signal energy from forward link 2638 within the third coverage area 435). Additionally or alternatively, an MCS and/or a coding rate for the forward link 2638 or return link 2839 may be adapted to account for the interference. However, this may correspondingly reduce a data rate for these communications. Alternatively, if the communications system does not employ an interference mitigation procedure, the interference may decrease a signal quality metric (e.g., decrease SNR or SINR) for the associated communications, thus similarly reducing an effective data rate for the communications.

Figure 29:
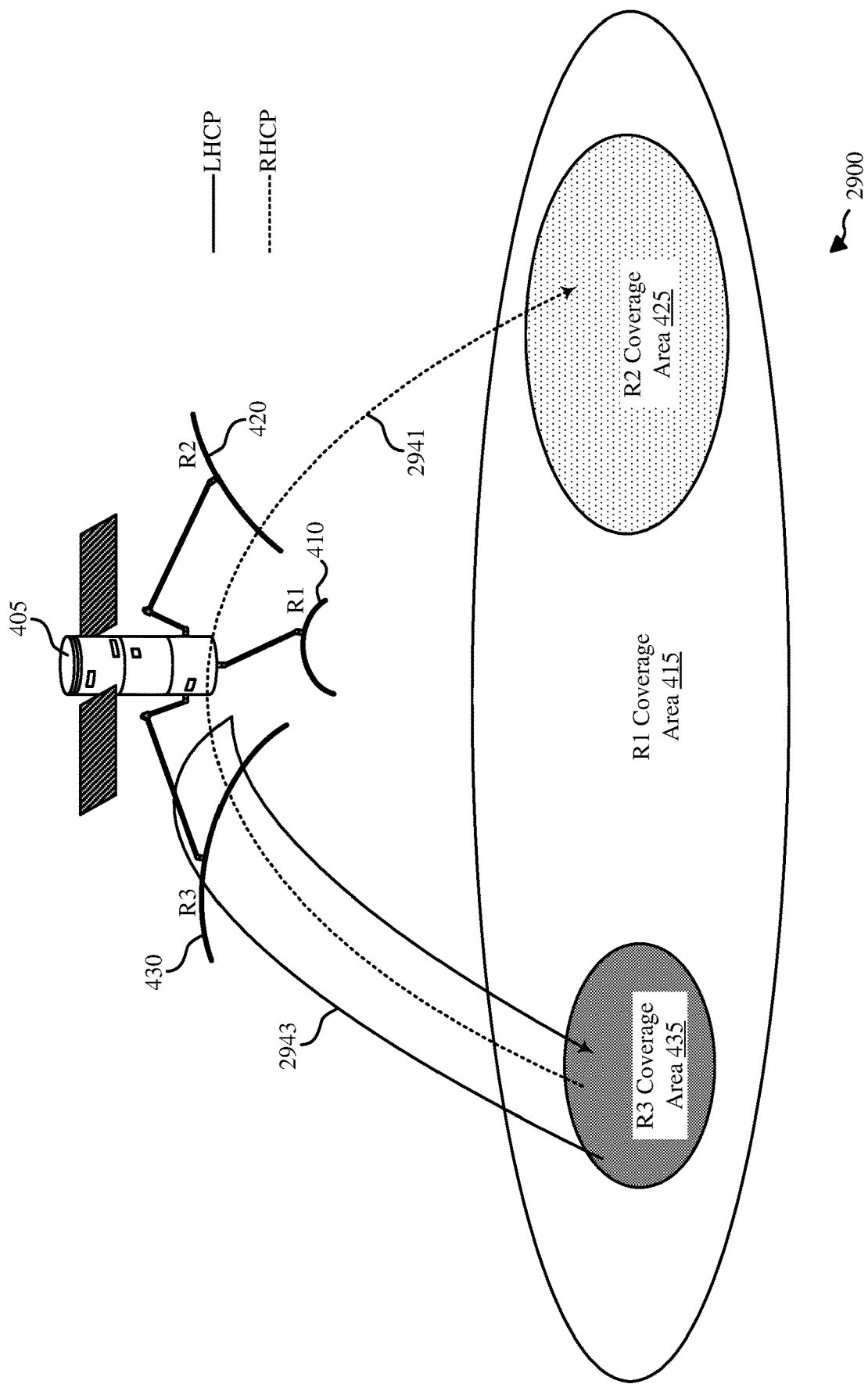

FIG. 29 illustrates a satellite communications system configuration 2900 that supports switching between operating modes of beamforming systems and satellites in accordance with aspects of the present disclosure. The example satellite communications system configuration 2900 of FIG. 29 illustrates example communication links and procedures for the communications satellite 405 to operate according to a twenty-fifth operating mode, for example, operating mode "H0" as described with reference to FIG. 3. The "H0" operating mode provides an eighth forward link configuration 318 "H" without a return link configuration.

According to the twenty-fifth operating mode shown in FIG. 29 (e.g., operating mode "H0"), the communications satellite 405 may provide forward link communications services to devices (e.g., user terminals) located in the second coverage area 425 and to devices (e.g., user terminals) located in the third coverage area 435 that may each be served by access node terminals located in the third coverage area 435 via forward links 2941 and 2943, respectively.

As shown in the example satellite communications system configuration 2900 of FIG. 29, signals communicated over the forward link 2943 may be polarized using a first polarization, here being LHCP, and signals communicated over the forward link 2941 may be polarized using a second polarization, here being RHCP. Accordingly, antennas of transmitting devices may apply LHCP polarization to transmit signals over the forward link 2943, and antennas of receiving devices may similarly use the LHCP polarization to receive the polarized signals over the forward link 2943. Similarly, antennas of transmitting devices may apply RHCP polarization to transmit signals over the forward link 2941, and antennas of respective receiving devices may use RHCP polarization to receive the polarized signals over the forward link 2941.

As similarly described herein, the twenty-fifth operating mode shows the "H0" operating mode. As illustrated in FIG. 29, and as similarly described with reference to FIG. 3, the "0" of the "H0" operating mode label indicates that the twenty-fifth operating mode does not include a return link configuration. Operating modes "H1" and "H2," as discussed below with reference to FIGS. 30 and 31, for example, provide return link configurations in combination with the eighth forward link configuration 318 "H" shown and described here in FIG. 29.

Figure 30:
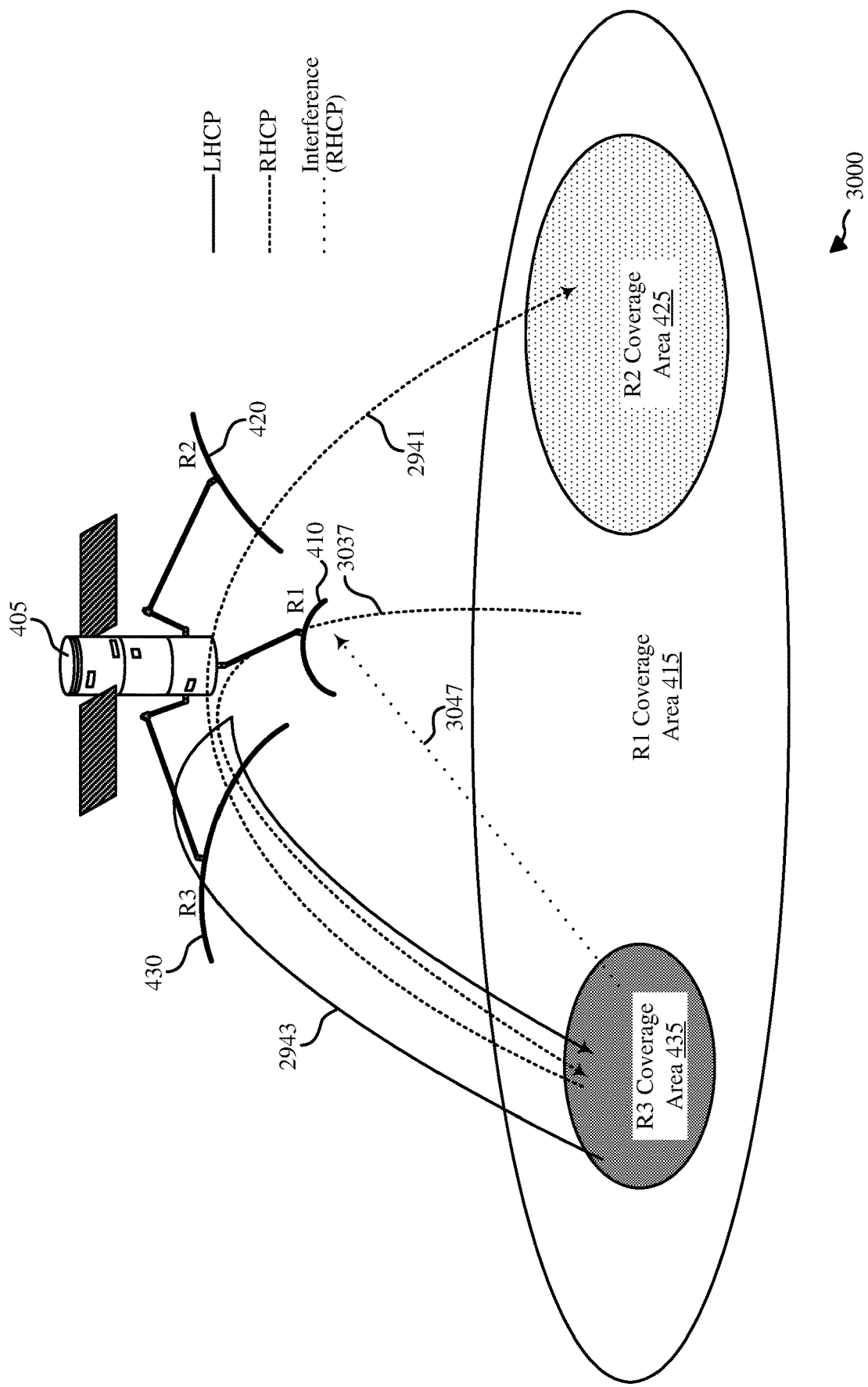

FIG. 30 illustrates a satellite communications system configuration 3000 that supports switching between operating modes of beamforming systems and satellites in accordance with aspects of the present disclosure. The example satellite communications system configuration 3000 of FIG. 30 illustrates example communication links and procedures for the communications satellite 405 to operate according to a twenty-sixth operating mode, for example, operating mode "H1," as referenced in the table of FIG. 3. The "H1" operating mode provides the first return link configuration 321 "1" in combination with the eighth forward link configuration 318 "H," as is described with reference to FIG. 29.

According to the twenty-sixth operating mode shown in FIG. 30 (e.g., operating mode "H1"), the communications satellite 405 may provide forward link communications services to devices (e.g., user terminals) located in the second coverage area 425 and to devices (e.g., access node terminals and/or user terminals) located in the third coverage area 435 that may each be served by other devices (e.g., additional access node terminals) located in the third coverage area 435 via forward links 2941 and 2943, respectively, as similarly described with reference to FIG. 29 (e.g., according to the eighth forward link configuration 318 "H").

Additionally, according to the twenty-sixth operating mode, the communications satellite 405 may relay return link signals between the first coverage area 415 and the third coverage area 435. Thus, return link communications services may be provided to devices (e.g., user terminals) located in the first coverage area 415 via access node terminals located in the third coverage area 435 (e.g., according to the first return link configuration 321 "1"). For example, to establish a return link 3037, the communications satellite 405 may receive return RHCP uplink signals from devices (e.g., user terminals) in the first coverage area 415 via the R1 antenna 410 and relay corresponding RHCP return downlink signals to devices (e.g., access node terminals) in the third coverage area 435 via the R3 antenna 430. Accordingly, antennas of transmitting devices (e.g., user terminals) may apply the RHCP polarization to transmit signals over the return link 3037, and antennas of receiving devices (e.g., access node terminals) may use RHCP polarization to receive the polarized signals over the return link 3037.

The example satellite communications system configuration 3000 of FIG. 30 also shows forward uplink interference 3047, which may represent interference between the uplink for forward link 2941 and the uplink for return link 3037. Because forward link 2941 and return link 3037 do not use orthogonal polarizations and the third coverage area 435 is within the illumination area of R1, the uplink of forward link 2941 may cause substantial interference to the uplink for return link 3037 (e.g., 22 dB worse than if the third coverage area 435 is outside the illumination area of R1). Beamforming of receive beams for return link 3037 may mitigate forward uplink interference 3047, however the received power from forward uplink interference 3047 at R1 may reduce the level of the signals for return link 3037 and thus reduce the ability to fully mitigate the effects on return link 3037.

Figure 31:
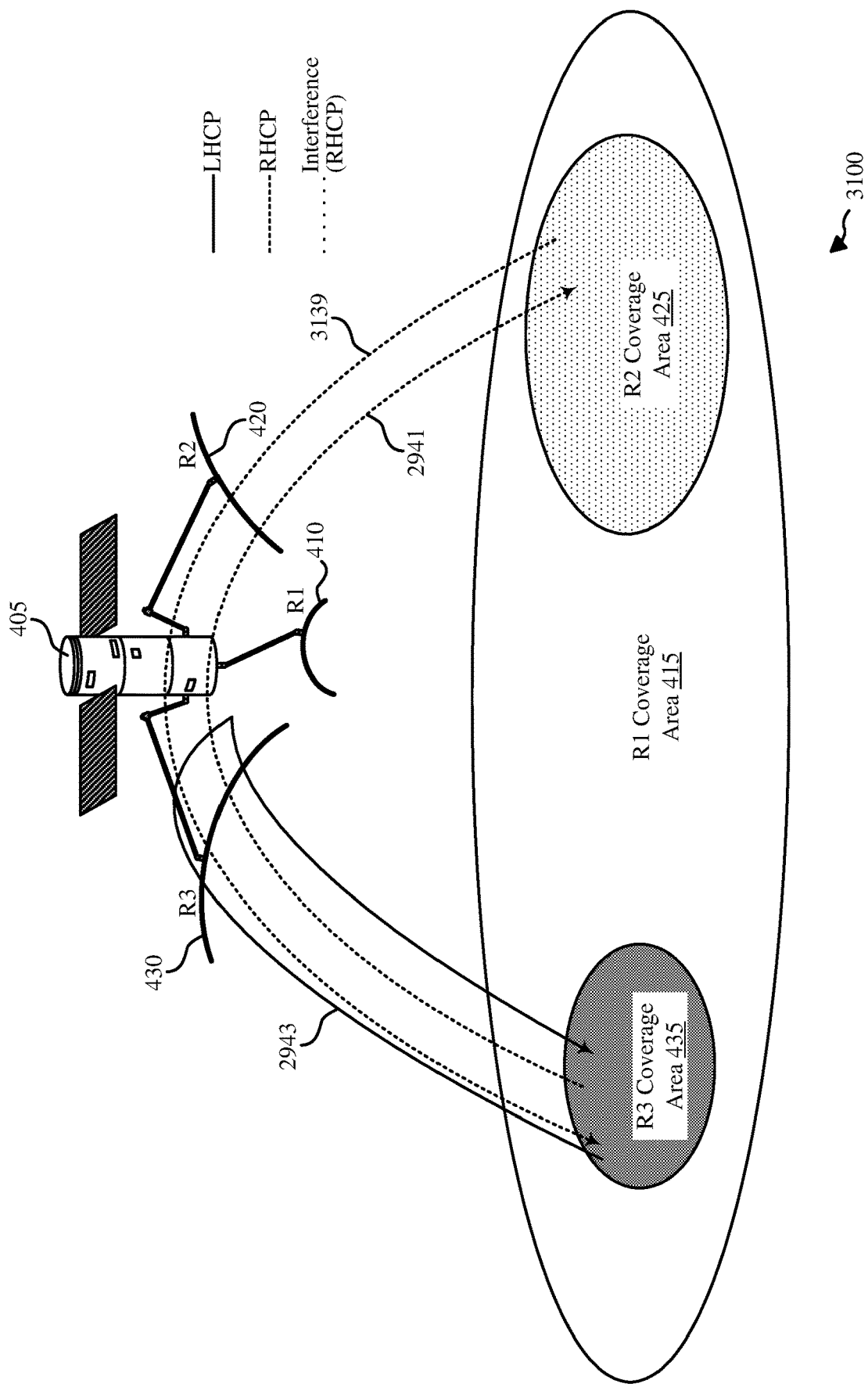

FIG. 31 illustrates a satellite communications system configuration 3100 that supports switching between operating modes of beamforming systems and satellites in accordance with aspects of the present disclosure. The example satellite communications system configuration 3100 of FIG. 31 illustrates example communication links and procedures for the communications satellite 405 to operate according to a twenty-seventh operating mode, for example, operating mode "H2," as referenced in the table of FIG. 3. The "H2" operating mode provides the second return link configuration 322 "2" in combination with the eighth forward link configuration 318 "H," as is described with reference to FIG. 29.

According to the twenty-seventh operating mode shown in FIG. 31 (e.g., operating mode "H2"), the communications satellite 405 may provide forward link communications services to devices (e.g., user terminals) located in the second coverage area 425 and to devices (e.g., access node terminals and/or user terminals) located in the third coverage area 435 that may each be served by other devices (e.g., additional access node terminals) located in the third coverage area 435 via forward links 2941 and 2943, respectively, as similarly described with reference to FIG. 29 (e.g., according to the eighth forward link configuration 318 "H").

Additionally, according to the twenty-seventh operating mode, the communications satellite 405 may relay return link signals between the second coverage area 425 and the third coverage area 435. Thus, return link communications services may be provided to devices (e.g., user terminals) located in the second coverage area 425 via access node terminals located in the third coverage area 435 (e.g., according to the second return link configuration 322 "2"). For example, to establish a return link 3139, the communications satellite 405 may receive return RHCP uplink signals from devices (e.g., user terminals) in the second coverage area 425 and relay corresponding RHCP return downlink signals to devices (e.g., access node terminals) in the third coverage area 435. Accordingly, antennas of transmitting devices (e.g., user terminals) may apply the RHCP polarization to transmit signals over the return link 3139, and antennas of receiving devices (e.g., access node terminals) may use RHCP polarization to receive the polarized signals over the return link 3139.

Figure 32:
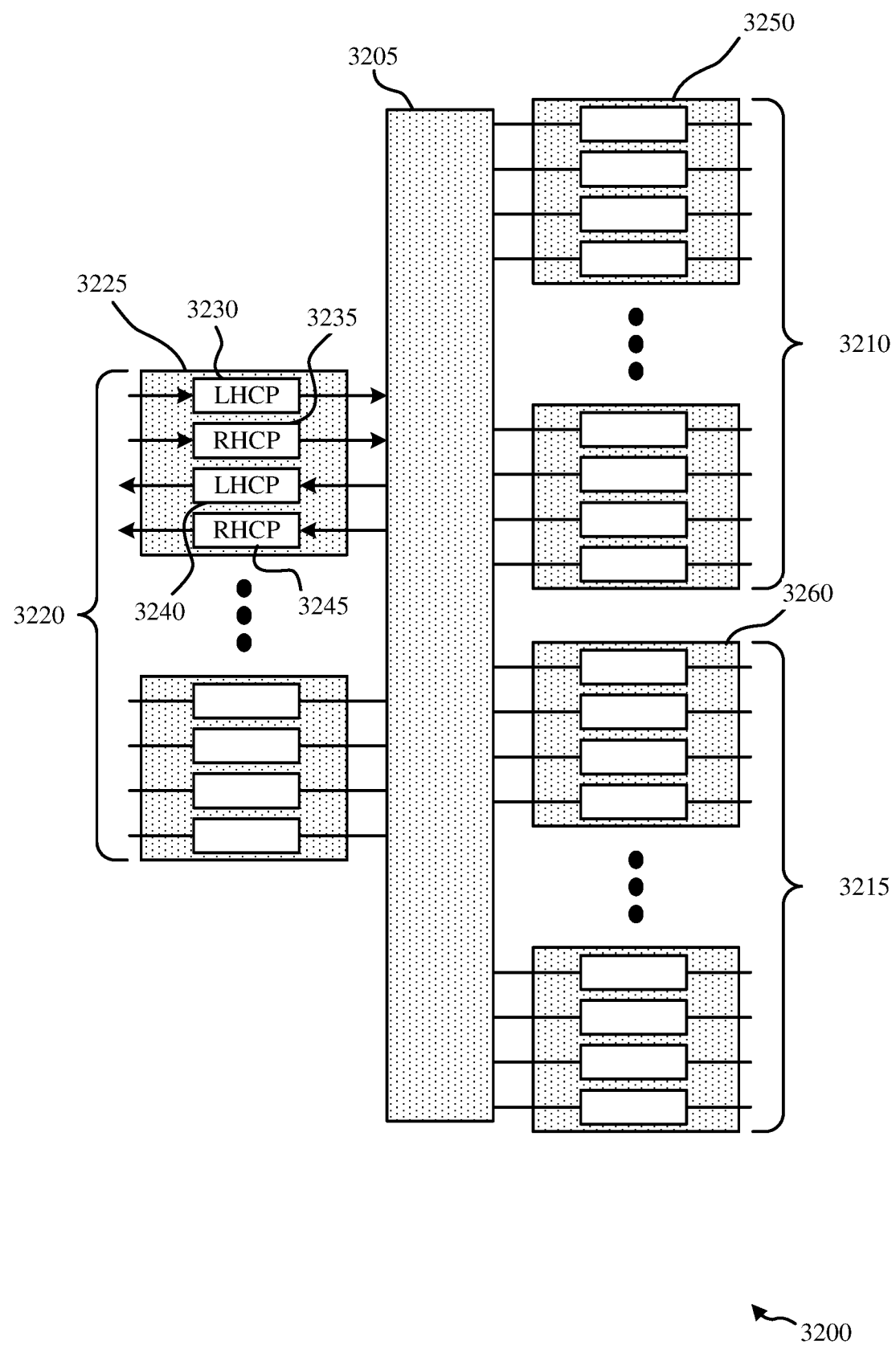
FIGS. 32-33 illustrates an example diagram of a circuit architecture that supports switching between operating modes of beamforming systems and satellites in accordance with aspects of the present disclosure.

FIG. 32 illustrates an example diagram of a circuit architecture 3200 that supports switching between operating modes of beamforming systems and satellites in accordance with aspects of the present disclosure. The circuit architecture 3200 includes an interconnect subsystem 3205 that connects a number of transceivers between corresponding antennas of an antenna assembly of a communications satellite. In some cases, the transceivers may alternatively be referred to as transmit/receive modules (TRMs) or transponders (or may be included in aspects of one or more respective transponders). In some examples, the circuit architecture 3200 may be implemented by aspects of the communications satellites and the satellite communications systems as described with reference to FIGS. 1 through 31.

As similarly described herein, communications satellites may include an antenna assembly operable to communicate signals of respective polarizations to devices (e.g., access node terminals and user terminals) within a number of respective coverage areas via a number of respective antennas. The circuit architecture 3200 shows a first set of transceivers 3210 that may be coupled with a first antenna (including, e.g., an R1 reflector) for a first coverage area (e.g., an R1 coverage area), a second set of transceivers 3215 that may be coupled with a second antenna (including, e.g., an R2 reflector) for a second coverage area (e.g., an R2 coverage area), and a third set of transceivers 3220 that may be coupled with a third antenna (including, e.g., an R3 reflector) for a third coverage area (e.g., an R3 coverage area). Each of the transceivers of the respective sets of transceivers may be coupled with a corresponding feed element of an array of feed elements for the respective antenna, where each antenna may include an array of numerous feed elements (e.g., any number from one to thousands or more of feed elements).

Each of the feed elements of the respective antennas may include a port associated with a first or a second respective polarization (e.g., LHCP or RHCP). For example, each antenna may include a first set of feed elements including a first set of ports for the first polarization (e.g., LHCP) and a second set of feed elements including a second set of ports for the second polarization (e.g., RHCP). Additionally or alternatively, the antenna may utilize dual polarization, in which case the feed elements may include a polarizer that may combine and divide signals between LHCP and RHCP polarizations (e.g., each feed element may include both LHCP and RHCP ports).

Each of the transceivers 3225 may include receive circuitry 3230, 3235 coupled (e.g., connected) with corresponding ones of the first set of ports and/or the second set of ports to receive signals that may have been received via the respective antenna. For example, as shown by the example circuit architecture 3200 of FIG. 32, a first transceiver 3225 of the third set of transceivers 3220 may include receive circuitry 3230 associated with a first polarization (e.g., LHCP) and receive circuitry 3235 associated with a second polarization (e.g., RHCP). The receive circuitry 3230 or 3235 may include a signal path (e.g., traces, wiring, etc.) and other circuitry components (e.g., amplifiers, mixers, etc.), which may be coupled with a feed element of an antenna to receive signals via the antenna. Likewise, the first transceiver 3225 may include transmit circuitry 3240 associated with the first polarization (e.g., LHCP) and second transmit circuitry 3245 associated with the second polarization (e.g., RHCP). The transmit circuitry 3240, 3245 may include a signal path (e.g., traces, wiring, etc.) and other circuitry components (e.g., amplifiers, mixers, etc.), which may be coupled with a feed element to transmit signals via the feed element. In some cases, the receive circuitry 3230, 3235 or transmit circuitry 3240, 3245 may perform upconversion or downconversion of signals. For example, signals may be received via receive circuitry 3230, 3235 over a first frequency range or band (e.g., a 30 GHz band) and transmitted via transmit circuitry 3240, 3245 over a second frequency range or band (e.g., a 20 GHz band). Thus, received signals may be downconverted in receive circuitry 3230, 3235 or transmit circuitry 3240, 3245 for transmission.

Each transceiver of the first set of transceivers 3210, the second set of transceivers 3215, and the third set of transceivers 3220 may include similar or analogous circuitry and circuitry components. For example, each transceiver 3250 of the first set of transceivers 3210 and each transceiver 3260 of the second set of transceivers 3215 may have similar components as the transceiver 3225. As indicated by the ellipses in FIG. 32, each set of transceivers may include a number of respective transceivers corresponding to each feed element of the respective antenna.

In some cases, each transceiver of the first set of transceivers 3210, the second set of transceivers 3215, and the third set of transceivers 3220 may be coupled with the reconfigurable interconnect subsystem 3205. For example, the receive components and the transmit components of each of the transceivers may be coupled with the interconnect subsystem 3205 via one or more respective signal paths. In some cases, transmit or receive circuitry for one or more of the sets of transceivers may be omitted, replaced with electrical load circuitry, or be otherwise terminated. For example, the first set of transceivers 3210 and/or the second set of transceivers 3215 may, in some cases, not support transmitting and/or receiving a particular polarization (e.g., uplink LHCP signals). Accordingly, the LHCP receive circuitry may be coupled with load circuitry, for example, rather than being connected with the interconnect subsystem 3205. Thus, although circuit architecture 3200 is illustrated as fully configurable across each polarization, link direction, and antenna, other implementations may use a partially configurable architecture.

In some cases, the interconnect subsystem 3205 may be coupled with a control system (not shown). The control system may, for example, be implemented at the communications service manager, as described with reference to FIG. 34. The control system may be operable (e.g. via signals received via a processor) to control the interconnect subsystem 3205 to couple the receive and transmit circuitry of the same or different sets of transceivers together. For example, the control system may send signals to the interconnect subsystem 3205 to couple various connections and uncouple other connections between different sets of transceivers to perform switching operations between different operating modes, as described herein.

The connections for each of the operating modes described herein are provided as follows. The connections are first provided below a first link direction (e.g., for forward link configurations 310 the letters "A" through "H," as described herein). The connections are then provided for the return link (e.g., for return link configurations corresponding to the numerals "0" through "3," as described herein). The forward link connections and the return link connections may be combined in any of the various combinations described herein. It is to be understood that these are only example implementations, and that other implementations may be exist by which the transceivers may be interconnected. Likewise, other operating modes may exist according to which other connections may be used.

For operating modes of a first forward link configuration 311 (e.g., for "A" forward links, e.g., of the "A0," "A1," "A2," and "A3" operating modes, as described with reference to FIGS. 4 through 7), receive circuitry 3230 of each of the transceivers of the third set of transceivers 3220 may be coupled via the interconnect subsystem 3205 with transmit circuitry 3240 of the transceivers of the first set of transceivers 3210. Accordingly, for the forward link, LHCP signals may be received at the receive circuitry 3230 of the third set of transceivers 3220, routed through the interconnect subsystem 3205, and transmitted via LHCP transmit circuitry 3240 of the first set of transceivers 3210.

For operating modes of a second forward link configuration 312 (e.g., for "B" forward links, e.g., of the "B0," "B1," and "B2" operating modes, as described with reference to FIGS. 12 through 14), receive circuitry 3230 and receive circuitry 3235 of each of the transceivers of the third set of transceivers 3220 may be coupled via the interconnect subsystem 3205 with transmit circuitry 3240 and transmit circuitry 3245 of the transceivers of the second set of transceivers 3215. Accordingly, for the forward link, LHCP signals and RHCP signals (e.g., dual-polarized signals) may be received at the receive circuitry 3230 and 3235 of the third set of transceivers 3220, routed through the interconnect subsystem 3205, and transmitted via LHCP and RHCP transmit circuitry 3240 and 3245 of the second set of transceivers 3215.

For operating modes of a third forward link configuration 313 (e.g., for "C" forward links, e.g., of the "C0," "C1," "C2," and "C3" operating modes, as described with reference to FIGS. 16 through 19), receive circuitry 3230 of each of the transceivers of the third set of transceivers 3220 may be coupled via the interconnect subsystem 3205 with transmit circuitry 3240 of the transceivers of the third set of transceivers 3220. Accordingly, for the forward link, LHCP signals may be received at the receive circuitry 3230 of the third set of transceivers 3220, routed through the interconnect subsystem 3205, and transmitted via LHCP transmit circuitry 3240 of the third set of transceivers 3215.

For operating modes of a fourth forward link configuration 314 (e.g., for "D" forward links, e.g., of the "D0," "D1," and "D2" operating modes, as described with reference to FIGS. 8 through 10), receive circuitry 3230 and receive circuitry 3235 of each of the transceivers of the third set of transceivers 3220 may be coupled via the interconnect subsystem 3205 with transmit circuitry 3240 and 3245 of the transceivers of the first set of transceivers 3210. Accordingly, for the forward link, LHCP signals and RHCP signals (e.g., dual-polarized signals) may be received at the receive circuitry 3230 and 3235 of the third set of transceivers 3220, routed through the interconnect subsystem 3205, and transmitted via LHCP and RHCP transmit circuitry 3240 and 3245 of the first set of transceivers 3210.

For operating modes of a fifth forward link configuration 315 (e.g., for "E" forward links, e.g., of the "E0," "E1," and "E2" operating modes, as described with reference to FIGS. 20 through 22), receive circuitry 3230 of each of the transceivers of the third set of transceivers 3220 may be coupled via the interconnect subsystem 3205 with transmit circuitry 3240 of the transceivers of the first set of transceivers 3210. In addition, receive circuitry 3235 of each of the transceivers of the third set of transceivers 3220 may be coupled via the interconnect subsystem 3205 with transmit circuitry 3245 of the transceivers of the second set of transceivers 3215. Accordingly, for the forward link, LHCP signals may be received at the receive circuitry 3230 of the third set of transceivers 3220, routed through the interconnect subsystem 3205, and transmitted via LHCP transmit circuitry 3240 of the first set of transceivers 3210. Similarly, RHCP signals may be received at the receive circuitry 3235 of the third set of transceivers 3220, routed through the interconnect subsystem 3205, and transmitted via RHCP transmit circuitry 3245 of the second set of transceivers 3215.

For operating modes of a sixth forward link configuration 316 (e.g., for "F" forward links, e.g., of the "F0," "F1," and "F2" operating modes, as described with reference to FIGS. 23 through 25), receive circuitry 3230 of each of the transceivers of the third set of transceivers 3220 may be coupled via the interconnect subsystem 3205 with transmit circuitry 3240 of the transceivers of the second set of transceivers 3215. In addition, receive circuitry 3235 of each of the transceivers of the third set of transceivers 3220 may be coupled via the interconnect subsystem 3205 with transmit circuitry 3245 of the transceivers of the first set of transceivers 3210. Accordingly, for the forward link, LHCP signals may be received at the receive circuitry 3230 of the third set of transceivers 3220, routed through the interconnect subsystem 3205, and transmitted via LHCP transmit circuitry 3240 of the second set of transceivers 3215. Similarly, RHCP signals may be received at the receive circuitry 3235 of the third set of transceivers 3220, routed through the interconnect subsystem 3205, and transmitted via RHCP transmit circuitry 3245 of the first set of transceivers 3210.

For operating modes of a seventh forward link configuration 317 (e.g., for "G" forward links, e.g., of the "G0," "G1," and "G2" operating modes, as described with reference to FIGS. 26 through 28), receive circuitry 3230 of each of the transceivers of the third set of transceivers 3220 may be coupled via the interconnect subsystem 3205 with transmit circuitry 3240 of the transceivers of the third set of transceivers 3220. In addition, receive circuitry 3235 of each of the transceivers of the third set of transceivers 3220 may be coupled via the interconnect subsystem 3205 with transmit circuitry 3245 of the transceivers of the first set of transceivers 3210. Accordingly, for the forward link, LHCP signals may be received at the receive circuitry 3230 of the third set of transceivers 3220, routed through the interconnect subsystem 3205, and transmitted via LHCP transmit circuitry 3240 of the third set of transceivers 3220. Similarly, RHCP signals may be received at the receive circuitry 3235 of the third set of transceivers 3220, routed through the interconnect subsystem 3205, and transmitted via RHCP transmit circuitry 3245 of the first set of transceivers 3210.

For operating modes of an eighth forward link configuration 318 (e.g., for "H" forward links, e.g., of the "H0," "H1," and "H2" operating modes, as described with reference to FIGS. 29 through 31), receive circuitry 3230 of each of the transceivers of the third set of transceivers 3220 may be coupled via the interconnect subsystem 3205 with transmit circuitry 3240 of the transceivers of the third set of transceivers 3210. In addition, receive circuitry 3235 of each of the transceivers of the third set of transceivers 3220 may be coupled via the interconnect subsystem 3205 with transmit circuitry 3245 of the transceivers of the second set of transceivers 3215. Accordingly, for the forward link, LHCP signals may be received at the receive circuitry 3230 of the third set of transceivers 3220, routed through the interconnect subsystem 3205, and transmitted via LHCP transmit circuitry 3240 of the third set of transceivers 3220. Similarly, RHCP signals may be received at the receive circuitry 3235 of the third set of transceivers 3220, routed through the interconnect subsystem 3205, and transmitted via RHCP transmit circuitry 3245 of the second set of transceivers 3215.

For operating modes employing the first return link configuration 321 (e.g., corresponding to return link configuration "1"), as described with reference to FIGS. 5, 9, 13, 17, 21, 24, 27, and 30), receive circuitry 3235 of each of the transceivers of the first set of transceivers 3210 may be coupled via the interconnect subsystem 3205 with transmit circuitry 3245 of the transceivers of the third set of transceivers 3210. Thus, for the return link, RHCP signals may be received via the receive circuitry 3235 of the transceivers of the first set of transceivers 3210, routed through the interconnect subsystem 3205, and transmitted via RHCP transmit circuitry 3245 of the third set of transceivers 3220.

For operating modes employing the second return link configuration 322 (e.g., corresponding to return link configuration "2"), as described with reference to FIGS. 6, 10, 14, 18, 22, 25, 28, and 31), receive circuitry 3235 of each of the transceivers of the second set of transceivers 3215 may be coupled via the interconnect subsystem 3205 with transmit circuitry 3245 of the transceivers of the third set of transceivers 3210. Thus, for the return link, RHCP signals may be received via the receive circuitry 3235 of the transceivers of the second set of transceivers 3215, routed through the interconnect subsystem 3205, and transmitted via RHCP transmit circuitry 3245 of the third set of transceivers 3220.

For operating modes employing the third return link configuration 323 (e.g., corresponding to return link configuration "3"), as described with reference to FIGS. 7, 15, and 19), receive circuitry 3235 of each of the transceivers of the third set of transceivers 3220 may be coupled via the interconnect subsystem 3205 with transmit circuitry 3245 of the transceivers of the third set of transceivers 3210. Thus, for the return link, RHCP signals may be received via the receive circuitry 3235 of the transceivers of the third set of transceivers 3220, routed through the interconnect subsystem 3205, and transmitted via RHCP transmit circuitry 3245 of the third set of transceivers 3220.

Figure 33:
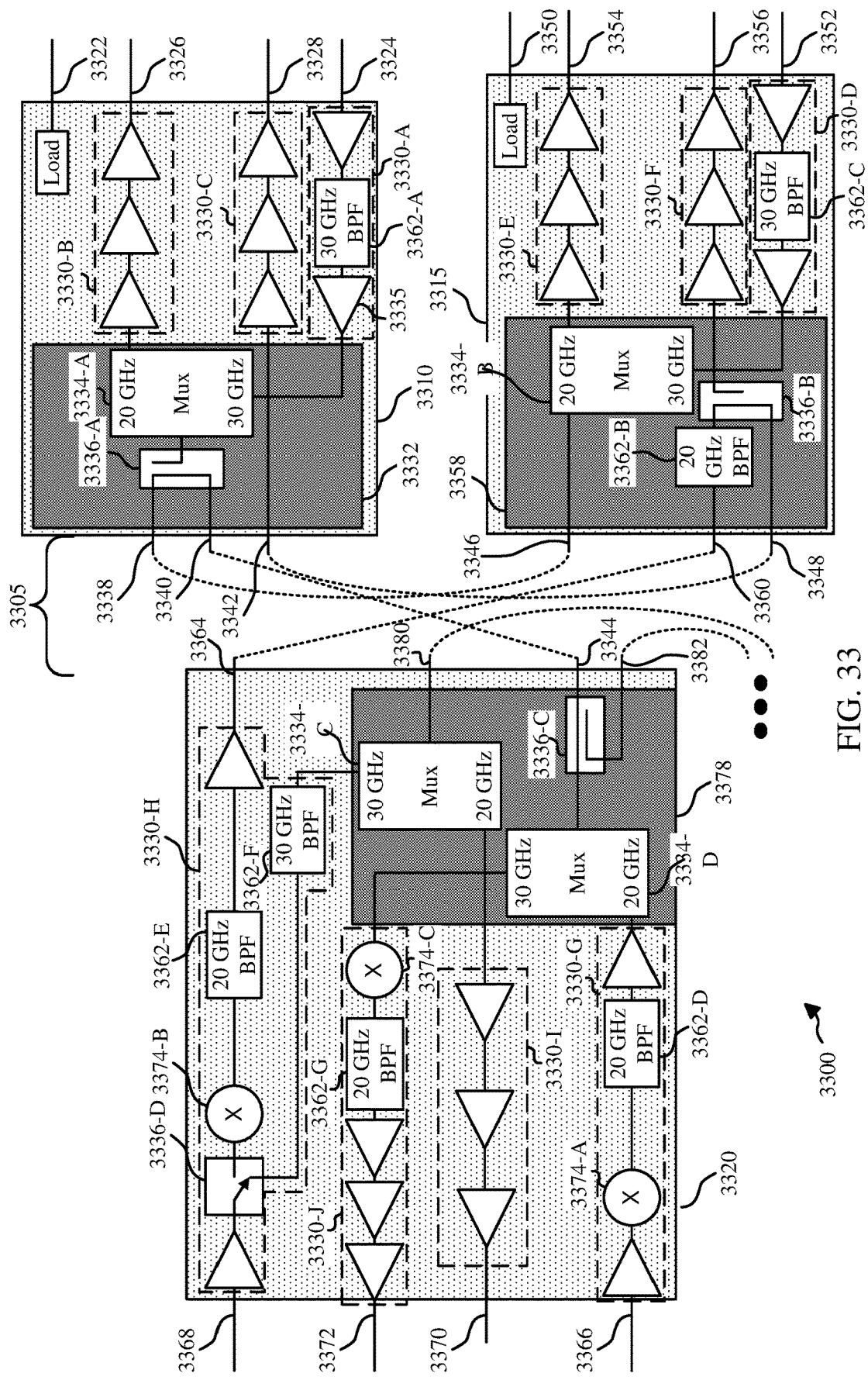

FIG. 33 illustrates an example diagram of a circuit architecture 3300 that supports switching between operating modes of beamforming systems and satellites in accordance with aspects of the present disclosure. In some examples, the circuit architecture 3300 may be implemented by aspects of the communications satellites and the satellite communications systems as described with reference to FIGS. 1 through 32. The circuit architecture 3300 may be one example implementation of the circuit architecture described with reference to FIG. 32. The circuit architecture 3300 may including an interconnect subsystem 3305 that is reconfigurable to connect one or more of a first transceiver 3310, a second transceiver 3315, and a third transceiver 3320 between corresponding antennas of an antenna assembly of a communications satellite. Although only a single first transceiver 3310, second transceiver 3315, and third transceiver 3320 are illustrated in FIG. 33, a circuit architecture for a satellite may have multiple transceivers associated with each antenna (e.g., one transceiver per feed). In some cases, the transceivers may alternatively be referred to as TRMs. Various quantities are described with reference to FIG. 33, such as particular frequencies, and numbers of particular components. These quantities are only examples, and components having other values may be similarly implemented.

As similarly described herein, communications satellites may include an antenna assembly operable to communicate signals of respective polarizations to devices (e.g., access node terminals and user terminals) within a number of respective coverage areas via a number of respective antennas. The circuit architecture 3300 shows a first transceiver 3310 that may be coupled with a first antenna (including, e.g., an R1 reflector) for a first coverage area (e.g., an R1 coverage area), a second transceiver 3315 that may be coupled with a second antenna (including, e.g., an R2 reflector) for a second coverage area (e.g., an R2 coverage area), and a third transceiver 3320 that may be coupled with a third antenna (including, e.g., an R3 reflector) for a third coverage area (e.g., an R3 coverage area). Each of the first transceiver 3310, the second transceiver 3315, and the third transceiver 3320 may be coupled with additional transceivers of respective sets of transceivers for the respective antennas, as similarly described with reference to FIG. 32. Each of the transceivers of the respective sets of transceivers may be coupled with a corresponding feed element of an array of feed elements for the respective antenna, where each antenna may include an array of numerous feed elements (e.g., any number from one to thousands or more of feed elements). The transceivers of the circuit architecture 3300 may receive signals at 30 GHz and transmit signals at 20 GHz. In this way, transmit and receive signals may be transmitted over at least partially overlapping sets of resources (e.g., using FDM). Other frequency pairings are also similarly contemplated.

Each of the feed elements of the respective antennas may include a port associated with a first or a second respective polarization (e.g., LHCP or RHCP). For example, each antenna may include a first set of feed elements including a first set of ports for the first polarization (e.g., LHCP) and a second set of feed elements including a second set of ports for the second polarization (e.g., RHCP). Alternatively, one or more antennas may have dual-polarization feed elements (e.g., each feed element having LHCP and RHCP ports). Each of the transceivers may include receive circuitry coupled (e.g., connected) with corresponding ones of the first set of ports and/or the second set of ports to receive signals that may have been received via the respective antenna.

For example, as shown by the example circuit architecture 3300 of FIG. 33, the first transceiver 3310 may include receive circuitry that includes a first receive signal path 3322 and a second receive signal path 3324 that may be coupled with a feed element of the R1 antenna to receive signals from devices located within the R1 coverage area using LHCP and RHCP polarizations, respectively. Likewise, each of the transceivers may include transmit circuitry coupled with corresponding ones of the first set of ports and/or the second set of ports to transmit signals via the respective antenna (e.g., to relay signals corresponding to respective received signals, in an end-to-end beamforming system). For example, as shown by the example circuit architecture 3300 of FIG. 33, the first transceiver 3310 may include transmit circuitry that includes a first transmit signal path 3326 and a second transmit signal path 3328 that may be coupled with the feed element of the R1 antenna to transmit signals to devices located within the R1 coverage area using LHCP and RHCP polarizations, respectively.

In the first transceiver 3310, the first receive signal path 3322 may be connected with electrical load circuitry or be otherwise terminated. For example, the first transceiver 3310 may not support receiving uplink LHCP signals, and thus signals received on the first receive signal path 3322 using LHCP may simply be dissipated via the load circuitry.

The second receive signal path 3324 may include a first amplifier stage 3330-*a*, which may include one or more amplifiers 3335 and/or one or more filters 3362. In the example circuit architecture 3300 of FIG. 33, the first amplifier stage 3330-*a* is shown to a first amplifier, a filter 3362-*a* (e.g., 30 GHz bandpass filter), and a second amplifier 3335. The first amplifier stage 3330-*a* illustrate only one example implementation, and any other comparable implementations are also contemplated. The amplifiers 3335 of the receive signal paths and transmit signal paths may amplify signals, and may include any suitable amplifiers including low noise amplifiers, high power amplifiers, fixed gain amplifiers, variable gain amplifiers, Doherty amplifiers (or Quasi-Doherty amplifiers), and the like. Only one of the illustrated amplifiers 3335 is labeled for clarity of the illustrated example.

Further in the first transceiver 3310, the first transmit signal path 3326 may include a second amplifier stage 3330-b, which may include one or more amplifiers. In the example circuit architecture 3300 of FIG. 33, the second amplifier stage 3330-b is shown to include three amplifiers, which is one example implementation, and any other comparable implementations are also contemplated.

Also in the first transceiver 3310, the second transmit signal path 3328 may include a third amplifier stage 3330-c. The third amplifier stage 3330-c may be the same as the second amplifier stage 3330-b, or may have different amplifiers 3335 (e.g., the same or different number of amplifiers 3335, having lower or higher gain). The amplifiers of the second transmit signal path 3328 may amplify signals to be transmitted from the first transceiver 3310 via RHCP feed elements of an antenna (e.g., R1 antenna).

The first transceiver 3310 may include multiplexing circuitry 3332 that may selectively couple, switch, or otherwise multiplex signals communicated between the first transceiver 3310 and the second transceiver 3315 or the third transceiver 3320. The multiplexing circuitry 3332 may be coupled with the receive and transmit paths of the first transceiver 3310 and may have multiple interconnection paths for connection to the second transceiver 3315 or the third transceiver 3320. In the example shown in FIG. 33, the multiplexing circuitry 3332 may be coupled with the second receive path 3324, the first transmit path 3326, and the second transmit path 3328. Also, as shown in the example circuit architecture 3300, the multiplexing circuitry 3332 may have three interconnection paths, a first interconnection path 3338, a second interconnection path 3340, and a third interconnection path 3342. Each of the interconnection paths may be capable of being connected via the multiplexing circuitry 3332 to one or more of the second receive path 3324, the first transmit path 3326, or the second transmit path 3328. In some cases, one or more of the interconnection paths may be capable of relaying signals between other transceivers (e.g., between the second transceiver 3315 and the third transceiver 3320). The multiplexing circuitry 3332 may include a combination of components such as multiplexers 3334, filters 3362, and couplers 3336. In the example shown, the multiplexing circuitry 3332 includes a multiplexer 3334-a and a coupler 3336-a. The multiplexer 3334-a may be coupled with the second receive path 3324 and the first transmit path 3326 and the coupler 3336-a. The multiplexer 3334-a may be operable to couple one or more of the second amplifier stage 3330-b and third amplifier stage 3330-c with the coupler 3336-a. The coupler 3336-a may be a dual-directional coupler with first and second mainline ports coupled with the first interconnection path 3338 and the second interconnection path 3340, respectively. The coupled port of the coupler 3336-a may be coupled to the multiplexer 3334-a. The third interconnection path 3342 may be coupled directly to the second transmit path 3328. For each of the transceivers 3320, the first interconnection path 3338 may be coupled with an interconnection path 3346 of one of the second transceivers 3315 (e.g., via the interconnect subsystem 3305), and the second interconnection path 3340 may be coupled with an interconnection path 3344 of one of the third transceivers 3320. The interconnection path 3346 may be coupled with an interconnection path 3348 of one of the second transceivers 3315 (e.g., which may be the same second transceiver 3315 or a different transceiver than for the first interconnection path 3338).

As also shown by the example circuit architecture 3300 of FIG. 33, the second transceiver 3315 may include receive circuitry that includes a first receive signal path 3350 and a second receive signal path 3352 that may be coupled with a feed element of the R2 antenna to receive signals from devices located within the R2 coverage area using LHCP and RHCP polarizations, respectively. The second transceiver 3315 may include transmit circuitry that includes a first transmit signal path 3354 and a second transmit signal path 3356 that may be coupled with the feed element of the R2 antenna to transmit signals to devices located within the R2 coverage area using LHCP and RHCP polarizations, respectively.

In the second transceiver 3315, the first receive signal path 3350 may be connected with electrical load circuitry or be otherwise terminated. For example, the second transceiver 3315 may not support receiving uplink LHCP signals, and thus signals received on the first receive signal path 3350 using LHCP may simply be dissipated via the load circuitry.

The second receive signal path 3352 may include a fourth amplifier stage 3330-d, which may include one or more amplifiers 3335 and/or one or more filters 3362. In the example implementation shown by the example circuit architecture 3300 of FIG. 33, the fourth amplifier stage 3330-d is shown to include a first amplifier 3335, a filter 3362-c (e.g., GHz bandpass filter), and a second amplifier 3335. The amplifier stage 3330-d illustrates only one example implementation, and any other comparable implementations are also contemplated. The amplifiers 3335 of receive signal path 3352 may amplify received signals to be relayed via the interconnect subsystem 3305 and transmitted via respective transceivers of the circuit architecture of FIG. 33.

Further in the second transceiver 3315, the first transmit signal path 3354 may include a fifth amplifier stage 3330-e which may include one or more amplifiers 3335. In the example implementation shown by the example circuit architecture 3300 of FIG. 33, the fifth amplifier stage 3330-e is shown to include three amplifiers, although this is only one example implementation, and any other comparable implementations are also contemplated. The amplifiers 3335 of transmit signal path 3354 may amplify signals to be transmitted from the second transceiver 3315.

The second transmit signal path 3356 of the second transceiver 3315 may include a sixth amplifier stage 3330-f which may include one or more amplifiers 3335. In the example implementation shown by the example circuit architecture 3300 of FIG. 33, the sixth amplifier stage 3330-f is shown to include three amplifiers, although this is only one example implementation, and any other comparable implementations are also contemplated. The amplifiers 3335 of transmit signal path 3356 may amplify signals to be transmitted from the second transceiver 3315.

The second transceiver 3315 may include multiplexing circuitry 3358 that may selectively couple, switch, or otherwise multiplex signals communicated between the second transceiver 3315 and the first transceiver 3310 or the third transceiver 3320. The multiplexing circuitry 3358 may be coupled with the receive and transmit paths of the second transceiver 3315 and may have multiple interconnection paths for connection to the first transceiver 3310 or the third transceiver 3320. In the example shown in FIG. 33, the multiplexing circuitry 3358 may be coupled with the second receive path 3352, the first transmit path 3354, and the second transmit path 3356. Also, as shown in the example circuit architecture 3300, the multiplexing circuitry 3358 may be coupled with three interconnection paths, a fourth interconnection path 3346, a fifth interconnection path 3360, and a sixth interconnection path 3348. One or more of the interconnection paths may be capable of being connected via the multiplexing circuitry 3358 to the second receive path 3352, the first transmit path 3354, or the second transmit path 3328. In some cases, one or more of the interconnection paths may be capable of relaying signals between other transceivers (e.g., between the first transceiver 3310 and the third transceiver 3320). The multiplexing circuitry 3358 may include a combination of components such as multiplexers, filters, and couplers. In the example shown, the multiplexing circuitry 3358 includes a multiplexer 3334-b, a coupler 3336-b, and a filter 3362-b (e.g., a 20 GHz bandpass filter). The multiplexer 3334-b may be coupled with the second receive path 3352 and the first transmit path 3354 and the fourth interconnection path 3346. The coupler 3336-b may be a dual-directional coupler with first and second mainline ports coupled with the fifth interconnection path 3360 (e.g., via filter 3362-b) and the sixth interconnection path 3348, respectively. The coupled port of the coupler 3336-b may be coupled to the second transmit path 3356. For each of the second transceivers 3315, the fourth interconnection path 3346 may be coupled with the first interconnection path 3338 of one of the first transceivers 3310 (e.g., via the interconnect subsystem 3305), the fifth interconnection path 3360 may be coupled with an interconnection path 3364 of one of the third transceivers 3320, and the sixth interconnection path 3348 may be coupled with the third interconnection path 3342 of one of the first transceivers 3310 (e.g., which may be the same second transceiver 3315 or a different transceiver than for the fourth interconnection path 3346).

As also shown by the example circuit architecture 3300 of FIG. 33, the third transceiver 3320 may include receive circuitry that includes a first receive signal path 3366 and a second receive signal path 3368 that may be coupled with a feed element of the R3 antenna to receive signals from devices located within the R3 coverage area using LHCP and RHCP polarizations, respectively. The third transceiver 3320 may include transmit circuitry that includes a first transmit signal path 3370 and a second transmit signal path 3372 that may be coupled with the feed element of the R3 antenna to transmit signals to devices located within the R3 coverage area using LHCP and RHCP polarizations, respectively.

In the third transceiver 3320, the first receive signal path 3366 may include a seventh amplifier stage 3330-g. The seventh amplifier stage 3330-g may include one or more amplifiers, filters, or frequency converters. In the example circuit architecture 3300 of FIG. 33, the seventh amplifier stage 3330-g is shown to include an amplifier, a filter, and a frequency converter 3374-a. The frequency converter 3374-a may, for example, convert a frequency for signals received via the first receive signal path 3366 (e.g., 30 GHz) to a frequency for transmission from a transmit path of the first transceiver 3310, second transceiver 3315, or third transceiver 3320 (e.g., 20 GHz). The components shown the seventh amplifier stage 3330-g illustrate only one example implementation, and any other comparable implementations are also contemplated.

The second receive signal path 3368 may include an eighth amplifier stage 3330-h. The eighth amplifier stage 3330-h may include one or more amplifiers 3335, frequency converters 3374, filters 3362, or couplers 3336. In the example implementation shown by the example circuit architecture 3300 of FIG. 33, the eighth amplifier stage 3330-i is shown to include a first amplifier 3335, a coupler 3336-d, a frequency converter 3374-b, a first filter 3362-e, a second filter 3362-f, and a second amplifier 3335. The frequency converter 3374-b may, for example, convert a frequency for signals received via the second receive signal path 3368 (e.g., 30 GHz) to a frequency for transmission from a transmit path of the first transceiver 3310, second transceiver 3315, or third transceiver 3320 (e.g., 20 GHz). The coupler 3336-d may be a directional coupler to provide a coupled signal prior to the frequency converter 3374-b for loopback to a different one of the third transceivers 3320 (e.g., via multiplexer 3334-c). In some examples, the function of coupler 3336-d may be provided using a switch in the place of the coupler. The components shown in the eighth amplifier stage 3330-h illustrate only one example implementation, and any other comparable implementations are also contemplated.

Further in the third transceiver 3320, the first transmit signal path 3370 may include a ninth amplifier stage 3330-i, which may include one or more amplifiers 3335. In the example circuit architecture 3300 of FIG. 33, the ninth amplifier stage 3330-i is shown to include three amplifiers, however this is only one example implementation, and any other comparable implementations are also contemplated.

Further in the third transceiver 3320, the second transmit signal path 3372 may include a tenth amplifier stage 3330-j, which may include one or more amplifiers 3335, filters 3362, and/or frequency converters 3374. In the example circuit architecture 3300 of FIG. 33, the tenth amplifier stage 3330-j is shown to include three amplifiers, a filter 3362-g (e.g., 20 GHz bandpass filter), and a frequency converter 3374-c. The frequency converter 3374-c may, for example, convert a frequency for signals for transmission via the second transmit signal path from a receive frequency (e.g., 30 GHz) to a frequency for transmission (e.g., 20 GHz) The components shown in the tenth amplifier stage 3330-j illustrate only one example implementation, and any other comparable implementations are also contemplated. The amplifiers of transmit signal path 3372 may amplify signals to be transmitted from the third transceiver 3320.

The frequency converters 3374 may include multiple frequency conversion components. For example, a frequency converter 3374 may include a first component to convert a source frequency (e.g., 30 GHz) to an intermediate frequency, and a second component to convert the intermediate frequency signal to a target frequency, such as 20 GHz (e.g., a frequency for transmission).

The third transceiver 3320 may include multiplexing circuitry 3378 that may selectively couple, switch, or otherwise multiplex signals communicated between the third transceiver 3320 and the first transceiver 3310 or the second transceiver 3315. The multiplexing circuitry 3378 may be coupled with the receive and transmit paths of the third transceiver 3320 and may have multiple interconnection paths for connection to the first transceiver 3310, the second transceiver 3315, or other third transceivers 3320. In the example shown in FIG. 33, the multiplexing circuitry 3378 may be coupled with the first receive path 3366, the second receive path 3368, the first transmit path 3370, and the second transmit path 3372. Also, as shown in the example circuit architecture 3300, the multiplexing circuitry 3378 may have four interconnection paths, a seventh interconnection path 3364, an eighth interconnection path 3380, a ninth interconnection path 3344, and a tenth interconnection path 3382. Each of the interconnection paths may be capable of being connected via the multiplexing circuitry 3378 to one or more of the first receive path 3366, the second receive path 3368, the first transmit path 3370, or the second transmit path 3372. In some cases, one or more of the interconnection paths may be capable of relaying signals between other transceivers (e.g., between the first transceiver 3310 and the second transceiver 3315). The multiplexing circuitry 3378 may include a combination of components such as multiplexers 3334, filters 3362, and couplers 3336. In the example shown, the multiplexing circuitry 3378 includes a multiplexer 3334-c, a multiplexer 3334-d, and a coupler 3336-c. The multiplexer 3334-c may be coupled with the second receive path 3368, the first transmit path 3370, and the eighth interconnection path 3380. The multiplexer 3334-c may be operable to multiplex signals from the second receive path 3368 to the eighth interconnection path 3380, or from the eighth interconnection path 3380 to the first transmit path 3370. The multiplexer 3334-d may be coupled with the first receive path 3366, the second transmit path 3372, and the coupler 3336-c. The multiplexer 3334-d may be operable to multiplex signals from the first receive path 3366 to the coupler 3336-c, or from the coupler 3336-c to the second transmit path 3372. The coupler 3336-c may be a dual-directional coupler with first and second mainline ports coupled with the ninth interconnection path 3344 and the multiplexer 3334-d, respectively. The coupled port of the coupler 3336-c may be coupled to the tenth interconnection path 3382. For each of the third transceivers 3320, the seventh interconnection path 3364 may be coupled with the fifth interconnection path 3360 of one of the second transceivers 3315 (e.g., via the interconnect subsystem 3305), and the ninth interconnection path 3344 may be coupled with the second interconnection path 3340 of one of the first transceivers 3310. The eighth interconnection path 3380 and the tenth interconnection path 3382 may be coupled with the eighth interconnection path 3380 and the tenth interconnection path 3382 of a different one of the third transceivers 3320.

As similarly described herein, the communications satellite may be configured to switch between one or more different operating modes. Each of the different operating modes may transmit and/or receive signals via different ports of the feed elements of each of the respective antennas described herein. With reference to the example circuit architecture 3300 as shown in FIG. 33, each of the different operating modes may use different signal paths of the circuit architecture 3300 to relay received signals from respective receive signal paths to corresponding transmit signal paths. Accordingly, the multiplexers 3334 and couplers 3336 may be reconfigurable to route (e.g., couple and/or decouple) connections between the first transceiver 3310, the second transceiver 3315, and/or the third transceiver 3320 (e.g., via the interconnect subsystem 3305) and to reconfigure components of the circuit architecture 3300 to facilitate these operating mode switches.

The components and couplings used for each of the forward link configurations are first described. The components and couplings used for each of the return link configurations 320 are then also described. It is to be understood that, for the example circuit architecture 3300 of FIG. 33, each of the forward link configurations may be used with any of the available return link configurations, for example, as shown in the table of FIG. 3. Similarly, however, the unavailable forward link configurations and return link configurations may also be created in other analogous implementations. The circuit architecture 3300 may be reconfigured from any of the operating modes to any of the other operating modes, as described herein (e.g., by coupling and/or decoupling the respective signal paths and/or by activating and/or deactivating the respective circuitry components described herein).

According to a first forward link configuration 311 (e.g., the forward link configuration "A," as described with reference to FIG. 4), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the second amplifier stages 3330-b of the first transceivers 3310 (e.g., using multiplexers 3334-d, couplers 3336-c, and multiplexers 3334-a), and transmit the corresponding LHCP forward downlink signal from the first transceivers 3310 via the first transmit signal paths 3326.

According to the second forward link configuration 312 (e.g., the forward link configuration "B," as described with reference to FIG. 12), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the fifth amplifier stages 3330-e of the second transceivers 3315 (e.g., using multiplexers 3334-d, couplers 3336-c, couplers 3336-a, and multiplexers 3334-b), and transmit the corresponding LHCP forward downlink signals from the second transceivers 3315 via the first transmit signal paths 3354. The first transmit signal paths 3354 may provide the amplified 20 GHz LHCP forward link signal to the feed elements of the R2 antenna to transmit the amplified 20 GHz LHCP forward link signals to devices located within the R2 coverage area.

Additionally, according to the second forward link configuration 312, the communications satellite may receive an RHCP forward uplink signal at the third transceivers 3320 via the second receive signal paths 3368, convert the signals from a first frequency range (e.g., 30 GHz) to a second frequency range (e.g., 20 GHz) at frequency converters 3374-b, route the RHCP forward link signals through the interconnect subsystem 3305 to the sixth amplifier stages 3330-f of the second transceivers 3315 (e.g., using multiplexers 3334-c and couplers 3336-b), and transmit the corresponding RHCP forward downlink signals from the second transceivers 3315 via the second transmit signal paths 3356. The second transmit signal paths 3356 may provide the amplified 20 GHz RHCP forward link signals to the feed elements of the R2 antenna to transmit the amplified 20 GHz RHCP forward link signals to devices located within the R2 coverage area.

According to the third forward link configuration 313 (e.g., the forward link configuration "C," as described with reference to FIG. 16), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the ninth amplifier stages 3330-i of other ones of the third transceivers 3320 (e.g., using multiplexers 3334-d, couplers 3336-c, and multiplexers 3334-c), and transmit the corresponding LHCP forward downlink signals from the third transceivers 3320 via the first transmit signal paths 3370. The first transmit signal paths 3370 may provide the amplified 20 GHz LHCP forward link signals to the feed elements of the R3 antenna to transmit the amplified 20 GHz LHCP forward link signals to devices located within the R3 coverage area.

According to the fourth forward link configuration 314 (e.g., the forward link configuration "D," as described with reference to FIG. 8), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the second amplifier stages 3330-b of the first transceivers 3310 (e.g., via the multiplexers 3334-d, couplers 3336-c, couplers 3336-a, and multiplexers 3334-a), and transmit the corresponding LHCP forward downlink signals from the first transceivers 3310 via the first transmit signal paths 3326. The first transmit signal paths 3326 may provide the amplified 20 GHz LHCP forward link signals to the feed elements of the R1 antenna to transmit the amplified 20 GHz LHCP forward link signals to devices located within the R1 coverage area.

Additionally, according to the fourth forward link configuration 314, the communications satellite may receive an RHCP forward uplink signal at the third transceiver 3320 via the second receive signal path 3368, convert the signals from a first frequency range (e.g., 30 GHz) to a second frequency range (e.g., 20 GHz) at frequency converters 3374-b, route the RHCP forward link signals through the interconnect subsystem 3305 to the third amplifier stages 3330-c of the first transceivers 3310 (e.g., using couplers 3336-b), and transmit the corresponding RHCP forward downlink signals from the first transceivers 3310 via the second transmit signal paths 3328. The second transmit signal paths 3328 may provide the amplified 20 GHz RHCP forward link signals to the feed elements of the R1 antenna to transmit the amplified 20 GHz RHCP forward link signals to devices located within the R1 coverage area.

According to the fifth forward link configuration 315 (e.g., the forward link configuration "E," as described with reference to FIG. 20), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the second amplifier stages 3330-b of the first transceivers 3310 (e.g., using multiplexer 3334-d, coupler 3336-c, coupler 3336-a, and multiplexer 3334-a), and transmit the corresponding LHCP forward downlink signals from the first transceivers 3310 via the first transmit signal paths 3326. The first transmit signal paths 3326 may provide the amplified 20 GHz LHCP forward link signals to the feed elements of the R1 antenna to transmit the amplified 20 GHz LHCP forward link signals to devices located within the R1 coverage area.

Additionally, according to the fifth forward link configuration 315, the communications satellite may receive an RHCP forward uplink signal at the third transceivers 3320 via the second receive signal paths 3368, convert the signals from a first frequency range (e.g., 30 GHz) to a second frequency range (e.g., 20 GHz) at frequency converters 3374-b, route the RHCP forward link signals through the interconnect subsystem 3305 to the sixth amplifier stages 3330-f of the second transceivers 3315 (e.g., using couplers 3336-b), and transmit the corresponding RHCP forward downlink signals from the second transceivers 3315 via the second transmit signal paths 3356. The second transmit signal paths 3356 may provide the amplified 20 GHz RHCP forward link signals to the feed elements of the R2 antenna to transmit the amplified 20 GHz RHCP forward link signals to devices located within the R2 coverage area.

According to the sixth forward link configuration 316 (e.g., the forward link configuration "F," as described with reference to FIG. 23), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-a, route the LHCP forward link signals through the interconnect subsystem 3305 to the fifth amplifier stages 3330-e of the second transceivers 3315 (e.g., using multiplexers 3334-d, couplers 3336-c, couplers 3336-a, and multiplexers 3334-b), and transmit the corresponding LHCP forward downlink signals from the second transceivers 3315 via the first transmit signal paths 3354. The first transmit signal paths 3354 may provide the amplified 20 GHz LHCP forward link signals to the feed elements of the R2 antenna to transmit the amplified 20 GHz LHCP forward link signals to devices located within the R2 coverage area.

Additionally, according to the sixth forward link configuration 316, the communications satellite may receive an RHCP forward uplink signal at the third transceivers 3320 via the second receive signal paths 3368, convert the signals from a first frequency range (e.g., 30 GHz) to a second frequency range (e.g., 20 GHz) at frequency converters 3374-b, route the RHCP forward link signal through the interconnect subsystem 3305 to the third amplifier stages 3330-c of the first transceivers 3310 (e.g., using couplers 3336-b to route the signals to the third interconnection paths 3342), and transmit the corresponding RHCP forward downlink signal from the first transceivers 3310 via the second transmit signal paths 3328. The second transmit signal paths 3328 may provide the amplified 20 GHz RHCP forward link signal to the feed elements of the R1 antenna to transmit the amplified 20 GHz RHCP forward link signals to devices located within the R1 coverage area.

According to the seventh forward link configuration 317 (e.g., the forward link configuration "G," as described with reference to FIG. 26), the communications satellite may receive an LHCP forward uplink signal at the third transceivers 3320 via the first receive signal path 3366, convert the signals from a first frequency range (e.g., 30 GHz) to a second frequency range (e.g., 20 GHz) at frequency converters 3374-a, route the LHCP forward link signals through the interconnect subsystem 3305 to the ninth amplifier stages 3330-i of other ones of the third transceivers 3320 (e.g., using multiplexers 3334-d, couplers 3336-c, and multiplexers 3334-c), and transmit the corresponding LHCP forward downlink signals from the third transceivers 3320 via the first transmit signal paths 3370. The first transmit signal paths 3370 may provide the amplified 20 GHz LHCP forward link signals to the feed elements of the R3 antenna to transmit the amplified 20 GHz LHCP forward link signals to devices located within the R3 coverage area.

Additionally, according to the seventh forward link configuration 317, the communications satellite may receive an RHCP forward uplink signal at the third transceiver 3320 via the second receive signal path 3368, convert the signals from a first frequency range (e.g., 30 GHz) to a second frequency range (e.g., 20 GHz) at frequency converters 3374-b, route the RHCP forward link signals through the interconnect subsystem 3305 to the third amplifier stages 3330-c of the first transceivers 3310 (e.g., using couplers 3336-*b* to route the signals to the third interconnection paths 3342), and transmit the corresponding RHCP forward downlink signals from the first transceivers 3310 via the second transmit signal paths 3328. The second transmit signal paths 3328 may provide the amplified 20 GHz RHCP forward link signals to the feed elements of the R1 antenna to transmit the amplified 20 GHz RHCP forward link signals to devices located within the R1 coverage area.

According to the eighth forward link configuration 318 (e.g., the forward link configuration "H," as described with reference to FIG. 29), the communications satellite may receive an LHCP forward uplink signal at the third transceivers 3320 via the first receive signal paths 3366, convert the signals from a first frequency range (e.g., 30 GHz) to a second frequency range (e.g., 20 GHz) at frequency converters 3374-*a*, route the LHCP forward link signals through the interconnect subsystem 3305 to the ninth amplifier stages 3330-*i* of other ones of the third transceivers 3320 (e.g., using multiplexers 3334-*d*, couplers 3336-*c*, and multiplexers 3334-*c*), and transmit the corresponding LHCP forward downlink signals from the third transceivers 3320 via the first transmit signal paths 3370. The first transmit signal paths 3370 may provide the amplified 20 GHz LHCP forward link signals to the feed elements of the R3 antenna to transmit the amplified 20 GHz LHCP forward link signals to devices located within the R3 coverage area.

Additionally, according to the eighth forward link configuration 318, the communications satellite may receive an RHCP forward uplink signal at the third transceiver 3320 via the second receive signal path 3368, convert the signals from a first frequency range (e.g., 30 GHz) to a second frequency range (e.g., 20 GHz) at frequency converters 3374-*b*, route the RHCP forward link signal through the interconnect subsystem 3305 to the sixth amplifier stages 3330-*f* of the second transceivers 3315 (e.g., using couplers 3336-*b*), and transmit the corresponding RHCP forward downlink signals from the second transceivers 3315 via the second transmit signal paths 3356. The second transmit signal paths 3356 may provide the amplified 20 GHz RHCP forward link signals to the feed elements of the R2 antenna to transmit the amplified 20 GHz RHCP forward link signals to devices located within the R2 coverage area.

In some cases, the circuit architecture 3300, including the interconnect subsystem 3305, may be configured (or, e.g., reconfigured) to implement an operating mode using a return link configuration 320, for example, a first return link configuration 321 (e.g., the return link configuration "1," as described herein). The configuration provided herein for the first return link configuration 321 may be combined with any of the above described forward link configurations with which the combination of the first return link configuration 321 is available for the respective forward link configuration. In some cases, return link signals may be multiplexed with forward link signals, for example, each passing through components of the circuit architecture 3300 (e.g., through wiring, traces, multiplexers 3334, etc.) concurrently (e.g., using frequency multiplexing).

According to the first return link configuration 321, the communications satellite may receive an RHCP return uplink signal at the first transceivers 3310 via the second receive signal paths 3324, route the RHCP return link signals through the interconnect subsystem 3305 to the tenth amplifier stages 3330-*j* (e.g., using multiplexers 3334-*a*, couplers 3336-*a*, couplers 3336-*c*, and multiplexers 3334-*d*), convert the signals from a first frequency range (e.g., 30 GHz) to a second frequency range (e.g., 20 GHz) at frequency converters 3374-*c*, and transmit the corresponding RHCP return downlink signals from the third transceivers 3320 via the second transmit signal paths 3372. The second transmit signal paths 3372 may provide the amplified 20 GHz RHCP return link signals to the feed elements of the R3 antenna to transmit the amplified 20 GHz RHCP return link signals to devices located within the R3 coverage area.

In some cases, the circuit architecture 3300, including the interconnect subsystem 3305, may be configured (or, e.g., reconfigured) to implement an operating mode using a second return link configuration 322 (e.g., the return link configuration "2," as described herein). The configuration provided herein for the second return link configuration 322 may be combined with any of the above described forward link configurations with which the combination of the second return link configuration 322 is available for the respective forward link configuration. In some cases, return link signals may be multiplexed with forward link signals, for example, each passing through components of the circuit architecture 3300 (e.g., through wiring, traces, multiplexers 3334, etc.) concurrently (e.g., using frequency multiplexing).

According to the second return link configuration 322, the communications satellite may receive an RHCP return uplink signal at the second transceivers 3315 via the second receive signal paths 3352, route the RHCP return link signals through the interconnect subsystem 3305 to the tenth amplifier stages 3330-*j* (e.g., using multiplexers 3334-*b*, couplers 3336-*a*, couplers 3336-*c*, and multiplexers 3334-*d*), convert the signals from a first frequency range (e.g., 30 GHz) to a second frequency range (e.g., 20 GHz) at frequency converters 3374-*c*, and transmit the corresponding RHCP return downlink signals from the third transceivers 3320 via the second transmit signal paths 3372. The second transmit signal paths 3372 may provide the amplified 20 GHz RHCP return link signals to the feed elements of the R3 antenna to transmit the amplified 20 GHz RHCP return link signals to devices located within the R3 coverage area.

In some cases, the circuit architecture 3300, including the interconnect subsystem 3305, may be configured (or, e.g., reconfigured) to implement an operating mode using a third return link configuration 323 (e.g., the return link configuration "3," as described herein). The configuration provided herein for the third return link configuration 323 may be combined with any of the above described forward link configurations with which the combination of the third return link configuration 323 is available for the respective forward link configuration. In some cases, return link signals may be multiplexed with forward link signals, for example, each passing through components of the circuit architecture 3300 (e.g., through wiring, traces, multiplexers 3334, etc.) concurrently (e.g., using frequency multiplexing).

According to the third return link configuration 323, the communications satellite may receive an RHCP return uplink signal at the third transceivers 3320 via the second receive signal paths 3368, route the RHCP return link signal through the interconnect subsystem 3305 to the tenth amplifier stages 3330-*j* (e.g., using multiplexers 3334-*c*, couplers 3336-*c*, and multiplexers 3334-*d*), convert the signals from a first frequency range (e.g., 30 GHz) to a second frequency range (e.g., 20 GHz) at frequency converters 3374-*c*, and transmit the corresponding RHCP return downlink signals from the third transceivers 3320 via the second transmit signal paths 3372. The second transmit signal paths 3372 may provide the amplified 20 GHz RHCP return link signals to the feed elements of the R3 antenna to transmit the amplified 20 GHz RHCP return link signal to devices located within the R3 coverage area.

Figure 34:
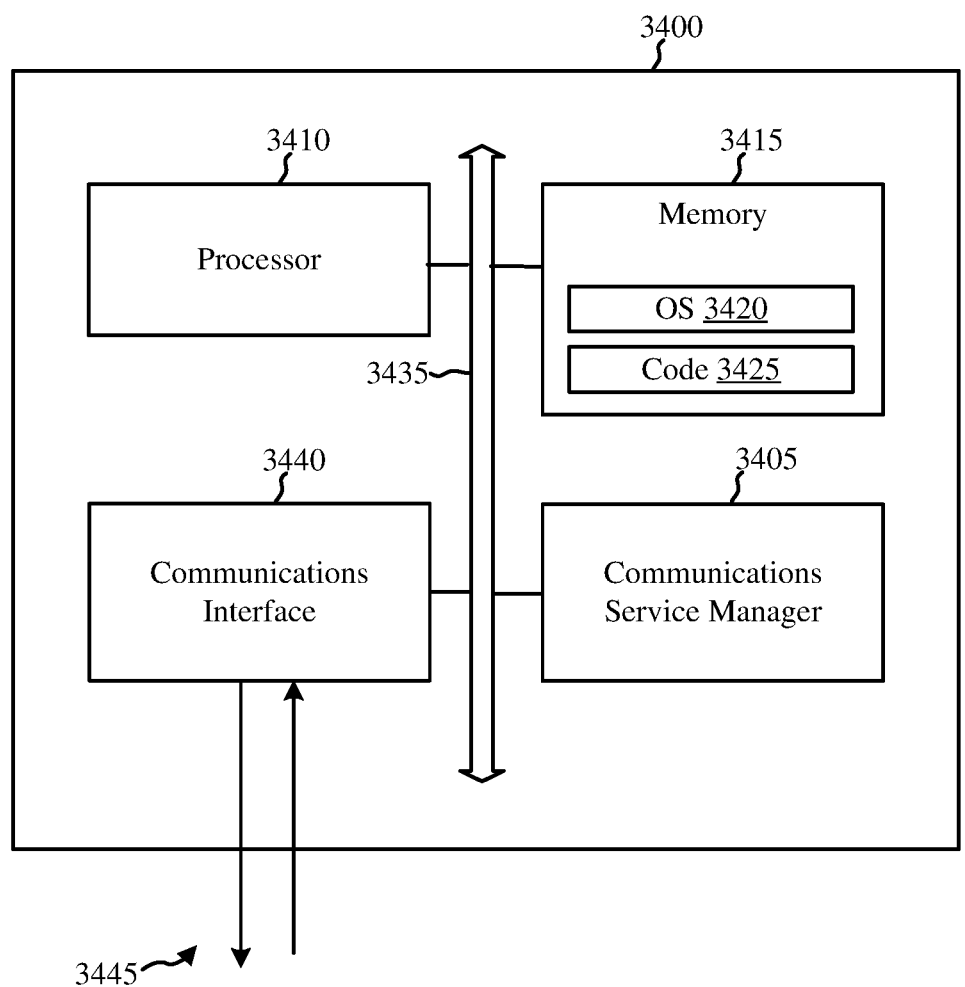
FIG. 34 shows a block diagram of a communications satellite that supports switching between operating modes of beamforming systems and satellites in accordance with aspects of the present disclosure.

FIG. 34 shows a block diagram of a controller 3400 that supports switching between operating modes of beamforming systems and satellites in accordance with aspects of the present disclosure. The controller 3400 may include a communications service manager 3405, a processor 3410, memory 3415, and a communications interface 3440. Each of these components may be in communication with each other, directly or indirectly, over one or more buses 3435. In some examples, the controller 3400 may be an example of a controller 175 and may be implemented by aspects of the satellite communications systems, as are described with reference to FIGS. 1 through 33. For example, aspects of the controller 3400 may be implemented, in the network device 170 or the communications satellite 105.

The memory 3415 may include random access memory (RAM) and/or read-only memory (ROM). The memory 3415 may store an operating system (OS) 3420 (e.g., built on a Linux or Windows kernel). The memory 3415 may also store computer-readable, computer-executable code 3425 including instructions that are configured to, when executed, cause the processor 3410 to perform various functions described herein related providing communications services according to different native antenna patterns. Alternatively, the code 3425 may not be directly executable by the processor 3410 but be configured to cause the controller 3400 (e.g., when compiled and executed) to perform one or more of the functions described herein.

The controller 3400 may include a communications service manager 3405, which may manage one or more aspects of a communications satellite switching between operating modes of beamforming systems and satellites, as described herein. Communications services may, for example, be provided via the communications interface 3440. In some examples the communications service manager 3405 may determine an operating mode for a communications satellite, signal to the satellite to configure an interconnect subsystem and antennas of an antenna assembly for the determined operating mode, and subsequently operate the communications satellite according to the operating mode (e.g., sending signals 3445 for the communications service via the communications interface 3440 according to the configured operating mode to provide communications services to terminals).

Figure 35:
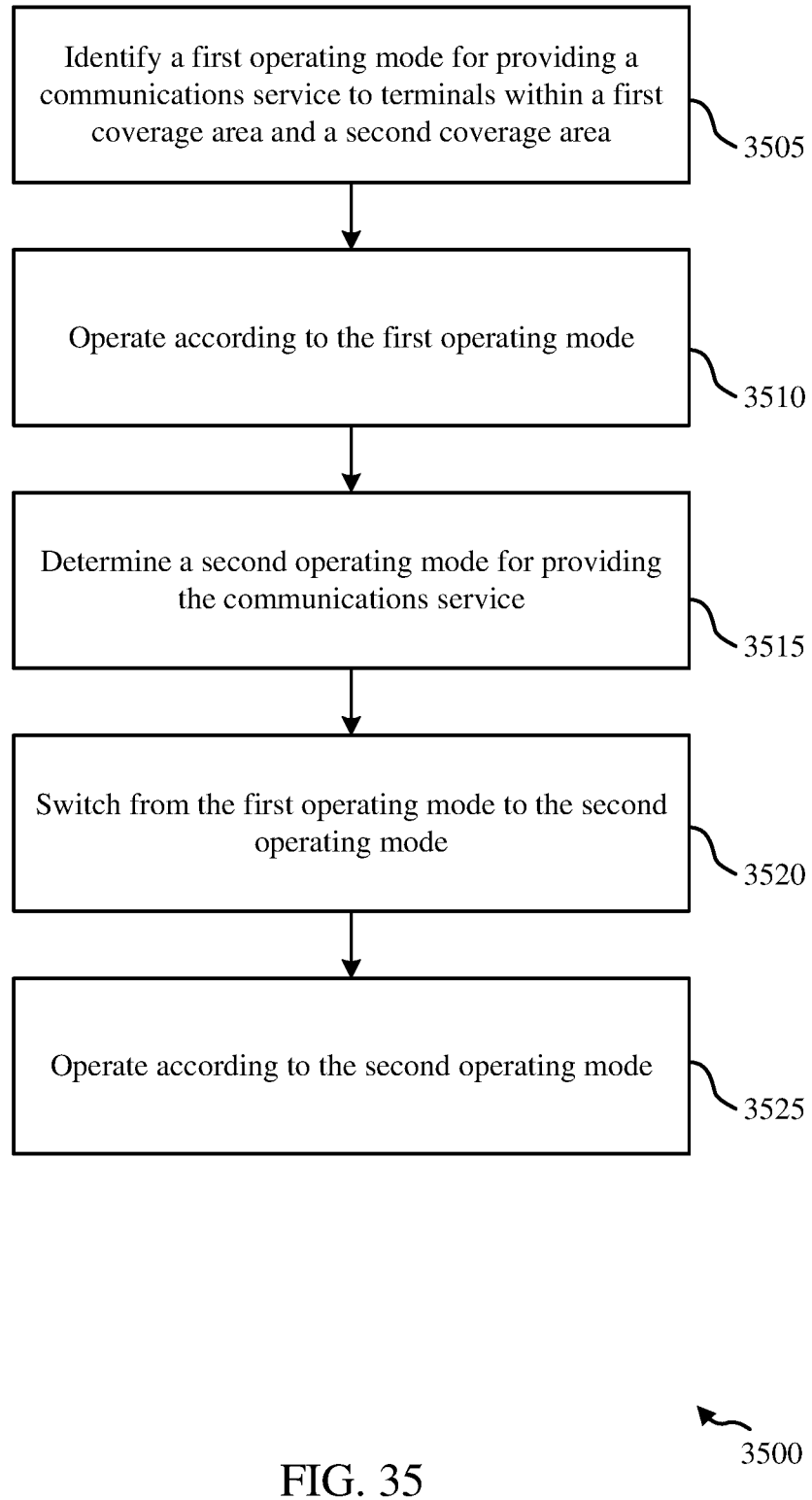
FIG. 35 shows a flowchart of an example method that supports switching between operating modes of beamforming systems and satellites in accordance with aspects of the present disclosure.

The controller 3400, including the communications service manager 3405, the processor 3410, the memory 3415, and/or the communications interface 3440 may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The controller 3400 may also be implemented as a combination of computing devices, e.g., a combination of a DSP and a microprocessor, multiple microprocessors, one or more microprocessors in conjunction with a DSP core, integrated memory, discrete memory, or any other such configuration FIG. 35 shows a flowchart of an example method 3500 that supports switching between operating modes of beamforming systems and satellites in accordance with aspects of the present disclosure. The operations of the method 3500 may be implemented by a controller for a communications satellite including multiple antennas or its components as described herein. In some examples, a controller may execute a set of instructions to control the functional elements of the controller to perform the functions described below. Additionally or alternatively, a controller may perform aspects of the functions described below using special-purpose hardware.

At 3505, the controller may identify a first operating mode from multiple operating modes for providing communications services to terminals within a service area that includes a first coverage area associated with a first antenna of the communications satellite and a second coverage area associated with a second antenna of the communications satellite, where the second coverage area may at least partially overlap with the first coverage area and include at least one gateway for providing the communications services via the communications satellite. In some cases, the first operating mode may correspond to a first configuration of respective polarizations with at least one of the multiple antennas for receiving signals of each of the respective polarizations and at least one of the plurality of antennas for transmitting signals of each of the respective polarizations.

At 3510, the communications satellite may be operated according to the first operating mode.

At 3515, the controller may determine a second operating mode of the multiple operating modes for providing the communications service, where the second operating mode corresponds to a second configuration of the respective polarizations with at least one of the multiple antennas for receiving signals of each of the respective polarizations and at least one of the multiple antennas for transmitting signals of each of the respective polarizations, and where the second configuration is different than the first configuration.

At 3520, the controller may command the communications satellite to switch the antennas of the antenna assembly (e.g., and interconnect subsystem) from the first operating mode to the second operating mode.

At 3525, the communications satellite may be operated according to the second operating mode. In some examples, one of the first operating mode or the second operating mode may be a mode employing a single polarization for a forward link (e.g., one of modes "A," "C,"), while the other of the first operating mode or the second operating mode may be a mode employing dual polarization for a forward link (e.g., one of modes "B," "D," "E," "F," "G," or "H"). In some examples, one of the first operating mode or the second operating mode may be a mode employing a single forward link coverage area (e.g., one of modes "A," "B," "C," or "D"), while the other of the first operating mode or the second operating mode may be a mode employing more than one forward link coverage area (e.g., one of modes "E," "F," "G," or "H"). In some examples, the first and second operating modes may have the same forward link configuration but may have different return link configurations. In some examples, the first and second operating modes may be part of a pattern of two or more operating modes (e.g., which may be repeated periodically or varied dynamically).

Thus, method 3525 may support switching between operating modes of beamforming systems and satellites in accordance with aspects of the present disclosure. It should be noted that method 3500 discusses exemplary implementations and that the operations of method 3500 may be rearranged or otherwise modified such that other implementations are possible. For example, certain described operations may be optional (e.g., those enclosed by boxes having dashed lines, those described as optional, etc.), where optional operations may be performed when certain criteria are met, performed based on a configuration, omitted intermittently, omitted entirely, etc.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, multiple microprocessors, microprocessors in conjunction with a DSP core, or any other such configuration.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. A method for communications via a communications satellite having an antenna assembly comprising a plurality of antennas, the method comprising:

identify a first operating mode from a plurality of operating modes for providing a communications service to terminals within a service area that comprises a first coverage area associated with a first antenna of the plurality of antennas and a second coverage area associated with a second antenna of the plurality of antennas, the second coverage area at least partially overlapping with the first coverage area and comprising at least one gateway for providing the communications service via the communications satellite, wherein the first operating mode corresponds to a first configuration of respective polarizations with at least one of the plurality of antennas for receiving signals of each of the respective polarizations and at least one of the plurality of antennas for transmitting signals of each of the respective polarizations;

operating the communications satellite according to the first operating mode;

determining a second operating mode of the plurality of operating modes for providing the communications service, wherein the second operating mode corresponds to a second configuration of the respective polarizations with at least one of the plurality of antennas for receiving signals of each of the respective polarizations and at least one of the plurality of antennas for transmitting signals of each of the respective polarizations, and wherein the second configuration is different than the first configuration;

switching the plurality of antennas of the antenna assembly from the first operating mode to the second operating mode; and operating the communications satellite according to the second operating mode.

2. The method of claim 1, wherein:

the first configuration associates each of the respective polarizations with the first antenna for receiving the each of the respective polarizations for a first link direction and the second antenna for transmitting the each of the respective polarizations for the first link direction; and the second configuration associates a single polarization of the respective polarizations with the first antenna for receiving the single polarization for the first link direction and the second antenna for transmitting the single polarization for the first link direction.

3. The method of claim 2, wherein:
for the first configuration, the second antenna transmits signals of the single polarization at a first transmit power; and
for the second configuration, the second antenna transmits signals of the single polarization at a second transmit power that is higher than the first transmit power.

4. The method of claim 1, wherein:
the first configuration comprises a first forward link configuration of a first one or more of the respective polarizations with one or more of the plurality of antennas for receiving signals of the first one or more of the respective polarizations and one or more of the plurality of antennas for transmitting signals of the first one or more of the respective polarizations; and
the second configuration comprises a second forward link configuration of a second one or more of the respective polarizations with one or more of the plurality of antennas for receiving signals of the second one or more of the respective polarizations and one or more of the plurality of antennas for transmitting signals of the second one or more of the respective polarizations, wherein the second forward link configuration is different from the first forward link configuration.

5. The method of claim 4, wherein the first configuration comprises a first return link configuration of a third one or more of the respective polarizations with one or more of the plurality of antennas for receiving signals of the third one or more of the respective polarizations and one or more of the plurality of antennas for transmitting signals of the third one or more of the respective polarizations, the method further comprising:
determining a third operating mode of the plurality of operating modes for providing the communications service, wherein the third operating mode corresponds to the first forward link configuration and a second return link configuration of a fourth one or more of the respective polarizations with one or more of the plurality of antennas for receiving signals of the fourth one or more of the respective polarizations and one or more of the plurality of antennas for transmitting signals of the fourth one or more of the respective polarizations;
switching the plurality of antennas of the antenna assembly to the third operating mode; and
operating the communications satellite according to the third operating mode.

6. The method of claim 4, further comprising:
determining a third operating mode of the plurality of operating modes for providing the communications service, wherein the third operating mode corresponds to a third configuration comprising a third forward link configuration of a third one or more of the respective polarizations with one or more of the plurality of antennas for receiving signals of the third one or more of the respective polarizations and one or more of the plurality of antennas for transmitting signals of the third one or more of the respective polarizations;
switching the plurality of antennas of the antenna assembly to the third operating mode; and
operating the communications satellite according to the third operating mode.

7. The method of claim 1, wherein:
the first configuration associates a first one or more of the respective polarizations with a first subset of the plurality of antennas for receiving and transmitting the first one or more of the respective polarizations; and
the second configuration associates a second one or more of the respective polarizations with a second subset of the plurality of antennas for receiving and transmitting the second one or more of the respective polarizations, wherein the second subset of the plurality of antennas is different from the first subset of the plurality of antennas.

8. The method of claim 7, wherein the first subset of the plurality of antennas corresponds to the first antenna and the second antenna and the second subset of the plurality of antennas corresponds to a third antenna and at least one of the first antenna or the second antenna, and wherein a third coverage area associated with the third antenna at least partially overlaps with at least one in the first coverage area or the second coverage area.

9. The method of claim 1, wherein each antenna of the plurality of antennas of the antenna assembly comprises a plurality of feed elements.

10. The method of claim 1, wherein the second configuration associates a single polarization of the respective polarizations with the first antenna for receiving the single polarization and for transmitting the single polarization.

11. The method of claim 1, wherein the first configuration comprises first signals of a first polarization of the respective polarizations transmitted by the first antenna and second signals of the first polarization transmitted by the second antenna.

12. The method of claim 11, wherein a beamforming configuration is applied for the first signals to reduce interference at one or more terminals receiving the second signals within the second coverage area.

13. The method of claim 1, wherein the first configuration comprises first signals of a first polarization of the respective polarizations received by the first antenna and second signals of the first polarization received by the second antenna.

14. The method of claim 1, further comprising:
determining a sequence of operating modes from the plurality of operating modes, the sequence defining respective operating modes for corresponding slots of a plurality of slots, wherein switching between the respective operating modes is performed according to the sequence of operating modes.

15. The method of claim 1, further comprising:
identifying a dynamic switching event for switching the plurality of antennas of the antenna assembly to the second operating mode;
determining an occurrence of the dynamic switching event based at least in part on a performance characteristic associated with one or more in the first coverage area or the second coverage area; and
switching the plurality of antennas of the antenna assembly to the second operating mode based at least in part on the occurrence of the dynamic switching event.

16. The method of claim 1, wherein one or more antennas of the plurality of antennas of the antenna assembly comprise reflectors.

17. A communications satellite for providing communications services to terminals within a service area, comprising:
an antenna assembly operable to communicate signals of respective polarizations, the antenna assembly comprising:

a first antenna comprising a first set of feed elements having a first set of ports associated with a first polarization and a second set of ports associated with a second polarization, the first antenna associated with a first coverage area of the service area;

a second antenna comprising a second set of feed elements having a third set of ports associated with the first polarization and a fourth set of ports associated with the second polarization, the second antenna associated with a second coverage area of the service area, wherein the second coverage area at least partially overlaps with the first coverage area;

a first transponder comprising first receive circuitry coupled with the first set of ports, first transmit circuitry coupled with the first set of ports, and second transmit circuitry coupled with the second set of ports; and a second transponder comprising second receive circuitry coupled with the third set of ports, third transmit circuitry coupled with the third set of ports, and third receive circuitry coupled with the fourth set of ports;

a reconfigurable interconnect subsystem coupled with the first receive circuitry, the first transmit circuitry, the second transmit circuitry, the second receive circuitry, the third receive circuitry, and the third transmit circuitry; and a control system operable to:

control the reconfigurable interconnect subsystem according to a first operating mode of a plurality of operating modes for providing the communications services to terminals within the service area, wherein, for the first operating mode, the control system controls the reconfigurable interconnect subsystem to couple the first receive circuitry with the third transmit circuitry, the third receive circuitry with the second transmit circuitry, and the second receive circuitry with the first transmit circuitry;

operate the communications satellite according to the first operating mode;

control the reconfigurable interconnect subsystem according to a second operating mode of the plurality of operating modes for providing the communications services to terminals within the service area, wherein, for the second operating mode, the control system controls the reconfigurable interconnect subsystem to couple the first receive circuitry with the third transmit circuitry and the third receive circuitry with the second transmit circuitry and to decouple the second receive circuitry from the first transmit circuitry; and operate the communications satellite according to the second operating mode.

18. The communications satellite of claim 17, wherein:

for the first operating mode, a first link direction is provided by first signals associated with the first polarization received at the second antenna from a gateway located within the second coverage area and second signals associated with the second polarization received at the second antenna from the gateway; and for the second operating mode, the first link direction is provided by third signals associated with the second polarization received at the second antenna from the gateway.

19. The communications satellite of claim 18, wherein:

for the first operating mode, the second antenna transmits the second signals via the second transponder at a first transmit power; and for the second operating mode, the second antenna transmits the third signals via the second transponder at a second transmit power that is higher than the first transmit power.

20. The communications satellite of claim 17, wherein the antenna assembly further comprises:

a third antenna comprising a third set of feed elements having a fifth set of ports associated with the first polarization, the third antenna associated with a third coverage area of the service area, wherein the third coverage area at least partially overlaps with the first coverage area; and a third transponder comprising fourth receive circuitry coupled with the fifth set of ports, wherein the reconfigurable interconnect subsystem is coupled with the fourth receive circuitry, and wherein the control system is operable to:

control the reconfigurable interconnect subsystem according to a third operating mode of the plurality of operating modes for providing the communications services to terminals within the service area, wherein, for the third operating mode, the control system controls the reconfigurable interconnect subsystem to couple the fourth receive circuitry with the third transmit circuitry and the third receive circuitry with the second transmit circuitry; and operate the communications satellite according to the third operating mode.

21. The communications satellite of claim 17, wherein the antenna assembly further comprises:

a third antenna comprising a third set of feed elements having a fifth set of ports associated with the first polarization, the third antenna associated with a third coverage area of the service area, wherein the third coverage area at least partially overlaps with the first coverage area; and a third transponder comprising fourth transmit circuitry coupled with the fifth set of ports, wherein the reconfigurable interconnect subsystem is coupled with the fourth transmit circuitry, and wherein the control system is operable to:

control the reconfigurable interconnect subsystem according to a third operating mode of the plurality of operating modes for providing the communications services to terminals within the service area, wherein, for the third operating mode, the control system controls the reconfigurable interconnect subsystem to couple the second receive circuitry with the fourth transmit circuitry and the third receive circuitry with the second transmit circuitry; and operate the communications satellite according to the third operating mode.

22. The communications satellite of claim 17, wherein the control system is operable to:

control the reconfigurable interconnect subsystem according to a third operating mode of the plurality of operating modes for providing the communications services to terminals within the service area, wherein, for the third operating mode, the control system controls the reconfigurable interconnect subsystem to couple the second receive circuitry with the third transmit circuitry; and operate the communications satellite according to the third operating mode.

23. The communications satellite of claim 17, wherein a beamforming configuration is applied for first signals transmitted from the first antenna to reduce interference at one or more terminals receiving second signals transmitted from the second antenna within the second coverage area.

24. The communications satellite of claim 17, wherein the control system is operable to:
- determine a sequence of operating modes from the plurality of operating modes, the sequence defining respective operating modes for corresponding slots of a plurality of slots; and
- control the reconfigurable interconnect subsystem according to the respective operating modes of the sequence of operating modes.

25. The communications satellite of claim 17, wherein the control system is operable to:
- identify a dynamic switching event for controlling the reconfigurable interconnect subsystem to switch to the second operating mode; and
- determine an occurrence of the dynamic switching event based at least in part on a performance characteristic associated with one or more in the first coverage area or the second coverage area, wherein controlling the reconfigurable interconnect subsystem according to the second operating mode is based at least in part on the occurrence of the dynamic switching event.

26. The communications satellite of claim 17, wherein the first antenna, the second antenna, or both, comprise reflectors for transmitting and receiving signals between the antenna assembly and one or more terminals within the service area.

* * * * *